(12) United States Patent
Hara et al.

(10) Patent No.: US 6,293,633 B1
(45) Date of Patent: Sep. 25, 2001

(54) BRAKING FORCE CONTROL APPARATUS

(75) Inventors: Masahiro Hara, Susono; Satoshi Shimizu, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/242,087

(22) PCT Filed: Jul. 18, 1997

(86) PCT No.: PCT/JP97/02509

§ 371 Date: Feb. 1, 1999

§ 102(e) Date: Feb. 1, 1999

(87) PCT Pub. No.: WO98/05539

PCT Pub. Date: Dec. 1, 1999

(30) Foreign Application Priority Data

Aug. 2, 1996 (JP) .................................................. 8/204819
Mar. 6, 1997 (JP) .................................................. 9/52078

(51) Int. Cl.⁷ ..................................................... B60T 8/34

(52) U.S. Cl. .................................... 303/113.2; 303/116.2

(58) Field of Search ............................. 303/113.2, 113.5, 303/116.2, 139, 900, 901

(56) References Cited

U.S. PATENT DOCUMENTS

| | | |
|---|---|---|
| 5,158,343 | 10/1992 | Reichelt et al. . |
| 5,261,730 | 11/1993 | Steiner et al. . |
| 5,342,120 * | 8/1994 | Zimmer et al. ................... 303/113.2 |
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,549,369 | 8/1996 | Rump et al. . |

(List continued on next page.)

FOREIGN PATENT DOCUMENTS

| | | |
|---|---|---|
| 0711695 | 5/1996 | (EP) . |
| 2282649 | 4/1995 | (GB) . |
| 2295209 | 5/1996 | (GB) . |
| 61-268560 | 11/1986 | (JP) . |
| 3-227766 | 10/1991 | (JP) . |
| 4-121260 | 4/1992 | (JP) . |
| 5-50908 | 3/1993 | (JP) . |
| 5-97022 | 4/1993 | (JP) . |
| 7-315187 | 12/1995 | (JP) . |
| 7-329766 | 12/1995 | (JP) . |
| 8-34326 | 2/1996 | (JP) . |
| 8-40229 | 2/1996 | (JP) . |
| 8-295224 | 11/1996 | (JP) . |
| 9-86372 | 3/1997 | (JP) . |
| WO96/06763 | 3/1996 | (WO) . |

*Primary Examiner*—Christopher P. Schwartz
(74) *Attorney, Agent, or Firm*—Kenyon & Kenyon

(57) ABSTRACT

In a braking force control apparatus for realizing both of a BA control for generating a great braking force when an emergency braking operation is executed and an ABS control for restricting a slip ratio of a wheel, an interference between the BA control and the ABS control is prevented. It is determined whether or not the ABS control is executed with respect to at least one of front wheels (step 104) when it is determined that the BA control is started. In the case that the ABS control is executed with respect to at least one of the front wheels, it is determined that a large amount of hydraulic pressure is fed to a wheel cylinder of a rear wheel at the same time when the BA control is started, thereby starting a BA slope restricting control for restricting an inlet thereof (step 108). In the case that the ABS control is not executed in the front wheel, a normal BA control is started (step 106).

5 Claims, 25 Drawing Sheets

U.S. PATENT DOCUMENTS

| | | |
|---|---|---|
| 5,556,173 | 9/1996 | Steiner et al. . |
| 5,560,690 * | 10/1996 | Hattori et al. .................... 303/116.2 |
| 5,564,797 | 10/1996 | Steiner et al. . |
| 5,567,021 | 10/1996 | Gaillard . |
| 5,584,542 | 12/1996 | Klarer et al. . |
| 5,586,814 * | 12/1996 | Steiner ............................. 303/116.2 |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,772,290 | 6/1998 | Heibel et al. . |
| 5,826,950 * | 10/1998 | Jonner et al. ..................... 303/113.2 |
| 5,882,091 * | 3/1999 | Toda et al. ....................... 303/113.2 |
| 5,927,824 * | 7/1999 | Pahl et al. ........................ 303/113.2 |
| 6,079,799 * | 6/2000 | Sawada et al. ..................... 303/146 |
| 6,095,622 * | 8/2000 | Oishi et al. ..................... 303/113.5f |

* cited by examiner

FF: X PIPING VEHICLE    HELD ASSIST PRESSURE STATE (BA CONTROL)

FF: X PIPING VEHICLE REDUCED ASSIST PRESSURE STATE (BA CONTROL OR BA + ABS CONTROL)

BRAKING FORCE CONTROL APPARATUS

TECHNICAL FIELD

The present invention relates to a braking force control apparatus, and more particularly to a braking force control apparatus preferable for an apparatus for controlling a braking force generated by a control apparatus for an automobile.

BACKGROUND ART

There is disclosed a braking force control apparatus having a brake assist function and an antilock brake function in Japanese Patent Unexamined Publication No. 4-121260. The brake assist function (hereinafter, refer to as an ABS function) is provided in order to generate a braking hydraulic pressure greater than that at a normal time when an emergency braking operation is executed by a driver of a vehicle. The antilock brake function (hereinafter, refer to as an ABS function) is provided in order to control a wheel cylinder pressure $P_{W/C}$ in each wheel so that no excess slip ratio is generated in each wheel during an execution of the braking operation.

A conventional braking force control apparatus for realizing the ABS function is provided with a master cylinder for generating a braking hydraulic pressure in accordance with a brake pedaling force and a hydraulic pressure circuit for controlling a conductive state between the master cylinder and each wheel and a conductive state between a reservoir tank and each wheel. The hydraulic pressure circuit is controlled such as to communicate a wheel cylinder which is required to be increased the wheel cylinder pressure $P_{W/C}$ with the master cylinder and communicate a wheel cylinder which is required to be reduced the wheel cylinder pressure $P_{W/C}$ with the reservoir tank. In accordance with the control mentioned above, it is possible to properly control the wheel cylinder pressure $P_{W/C}$ of each wheel in a range lower than the braking hydraulic pressure generated by the master cylinder.

A conventional braking force control apparatus for realizing the BA function is provided with a high pressure source for generating a predetermined hydraulic pressure without relation to the brake pedaling force and a hydraulic pressure control valve for properly controlling a hydraulic pressure generated by the high pressure source in a pressure reduction manner so as to be supplied to the wheel cylinder in each wheel. The hydraulic pressure control valve supplies the braking hydraulic pressure increased at a predetermined number of force rate with respect to the brake pedaling force to each wheel in the case that the emergency braking operation is not executed by a driver. Further, the hydraulic pressure control valve supplied a brake fluid having a maximum hydraulic pressure generated by the high pressure source to the wheel cylinder in each wheel.

In accordance with the processing mentioned above, in the case that the normal braking operation is executed by a driver, it is possible to supply the wheel cylinder pressure $P_{W/C}$ in accordance with the brake pedaling force to the wheel cylinder in each wheel. Further, in the case that the emergency braking operation is executed by a driver, it is possible to supply the wheel cylinder pressure $P_{W/C}$ higher than that at the normal time to the wheel cylinder in each wheel. As mentioned above, in accordance with the conventional braking force control apparatus, it is possible to properly realize the function as the normal brake and the BA function.

As the braking force control apparatus for realizing both of the BA function and the ABS function, for example, there is considered an apparatus capable of selectively supplying the braking hydraulic pressure generated by the master cylinder and the braking hydraulic pressure generated by the high pressure source. In the braking force control apparatus as mentioned above, the ABS function can be realized by controlling the hydraulic pressure circuit in accordance with the method mentioned above while supplying the hydraulic pressure generated by the master cylinder to the hydraulic pressure circuit. Further, the BA function is realized by supplying the braking hydraulic pressure generated from the high pressure source to the wheel cylinder in each wheel via the hydraulic pressure circuit in a state of shutting off the master cylinder and the hydraulic pressure circuit. Hereinafter, in the braking force control apparatus mentioned above, a control for realizing the BA function and a control for realizing the ABS function will be respectively referred to as a BA control and an ABS control.

In the braking force control apparatus for realizing both of the BA function and the ABS function, when the BA control is started, there is a case that an excess slip ratio is generated in any one of the wheels. In this case, when the ABS control is executed with respect to the wheel, it is possible to simultaneously realize the BA function and the ABS function. The function mentioned above can be realized by controlling the hydraulic pressure circuit so that the wheel cylinder of the wheel in which the excess slip ratio is generated is properly connected to a side of the reservoir tank while supplying the braking hydraulic pressure generated from the high pressure source to the hydraulic pressure circuit. Hereinafter, the function mentioned above is referred to as a BA+ABS function, and a control for realizing the BA+ABS function is referred to as a BA+ABS control.

In accordance with the BA+ABS control mentioned above, after the emergency braking operation is executed by a driver, it is possible to increase a wheel cylinder pressure $P_{W/C}$ in the other wheels in response to the requirement of the BA control while increasing and reducing the wheel cylinder pressure $P_{W/C}$ of the wheel in which the excess slip ratio is generated in response to the requirement of the ABS control.

However, during the execution of the BA+ABS control, an interference is generated between the BA control and the ABS control. That is, during the execution of the BA+ABS control, an environment different from the case that the BA control is executed alone and the case that the ABS control is executed alone is formed. Accordingly, at a time of executing the BA+ABS control, there is generated the case of not properly controlling the wheel cylinder pressure PWlC when the BA control and the ABS control are executed in the same manner as that in the case they are executed alone.

That is, during the execution of the BA+ABS control, it is necessary to detach the wheel cylinder of a subject wheel for the ABS control (hereinafter, refer to as an ABS subject wheel) from the high pressure source except a little time at which an increase of the wheel cylinder pressure $P_{W/C}$ is required with respect to the wheel. On the other hand, the high pressure source is given a capacity sufficient for increasing the wheel cylinder pressures $P_{W/C}$ of all of four wheels in accordance with a proper increased pressure slope after the BA control is started. Accordingly, during the execution of the BA+ABS control, a change rate of the wheel cylinder pressure $P_{W/C}$ with respect to a non-subject wheel for the ABS control (hereinafter, refer to as an ABS non-subject wheel) becomes a steep increased pressure slope in comparison with the case that the BA control is executed alone.

Further, in the case that the ABS control is executed alone, the master cylinder pressure $P_{W/C}$ is supplied to the wheel cylinder of the ABS subject wheel. On the other hand, during the execution of the BA+ABS control, the hydraulic pressure generated by the high pressure source is supplied to the wheel cylinder of the ABS subject wheel. The high pressure source generates a hydraulic pressure higher than the hydraulic pressure normally generated as the master cylinder pressure $P_{M/C}$. Accordingly, during the execution of the BA+ABS control, a change rate of the wheel cylinder pressure $P_{W/C}$ of the ABS subject wheel easily becomes a steep increased pressure slope in comparison with the case that the ABS control is executed alone.

The wheel cylinder pressure $P_{W/C}$ of the ABS subject wheel is reduced at a time when the excess slip ratio is generated in the wheel, and thereafter, is increased at a relatively slow degree. At a time of this pressure increase, if the wheel cylinder pressure $P_{W/C}$ is increased in accordance with the steep increased pressure slope, it is necessary to reduce the wheel cylinder pressure $P_{W/C}$ immediately after the pressure increase of the wheel cylinder pressure $P_{W/C}$ is started. Accordingly, if the wheel cylinder pressure $P_{W/C}$ is increased in accordance with the steep increased pressure slope as mentioned above during the execution of the BA+ABS control, a hunting under a control is easily generated with respect to the ABS subject wheel.

As mentioned above, in the case of intending to realize the BA+ABS function by the method mentioned above, there is a problem that the BA control and the ABS control are interfered with each other, so that the hunting under the control is easily generated in the ABS subject wheel and the excess increased pressure slope is generated in the ABS non-subject wheel (the subject wheel for the BA control). In this point, the method mentioned above is not always an optimum method in view of realizing the BA+ABS function.

DISCLOSURE OF INVENTION

A general object of the present invention is to provide an improved and useful braking force control apparatus which solves the problems mentioned above.

A more particular object of the present invention is to provide a braking force control apparatus which can prevent an interference between a BA control and an ABS control so as to properly realize both of the BA+ABS functions.

In order to achieve the object mentioned above, in accordance with an aspect of the present invention, there is provided a braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

hydraulic pressure inlet restricting means (steps 104 and 108) for restricting an inlet of the braking hydraulic pressure to the wheel cylinder in which the braking hydraulic pressure control is not executed among the wheel cylinders in the case that the braking hydraulic pressure control is executed in any one of the plurality of wheel cylinders at a time of starting the brake assist control.

In the invention mentioned above, in the case that the braking hydraulic pressure reducing control is executed with respect to any one of the wheel cylinders, the braking hydraulic pressure is prevented from flowing into the wheel cylinder. Accordingly, when the brake assist control is started under the circumstance, there is generated a case that the braking hydraulic pressure to be supplied to the shut-off wheel cylinder in the hydraulic pressure inlet passage is distributed to the other wheel cylinders. The hydraulic pressure inlet restricting means prevents the braking hydraulic pressure from being excessively introduced to the other wheel cylinder under the above circumstance.

Accordingly, in accordance with the invention mentioned above, even when the brake assist control is started in a state in which the hydraulic pressure inlet passage in any one of the wheel cylinders is shut off, it is possible to prevent the braking hydraulic pressure from being excessively introduced to the wheel cylinder in which the hydraulic pressure inlet passage is not shut off. Therefore, in accordance with the braking force control apparatus of the present invention, it is possible to maintain an excellent controllability even under the condition mentioned above.

Further, in accordance with other aspect of the present invention, there is provided a braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

pressure reducing tendency changing means (step 118) for increasing a reduced pressure amount of the pressure reducing control in the wheel cylinder in which the braking hydraulic pressure control is not executed among the wheel cylinders in the case that the braking hydraulic pressure control is executed in any one of the plurality of wheel cylinders at a time of executing the brake assist control.

In the invention mentioned above, in the case that the hydraulic pressure inlet passage is shut off with respect to any one of the wheel cylinders, the braking hydraulic pressure is prevented from flowing into the wheel cylinder. Accordingly, when the brake assist control is started under the condition mentioned above, a steep increase of the hydraulic pressure is easily generated in the other wheel cylinders in comparison with the case that the hydraulic pressure inlet passage of all of the wheel cylinders are in the conductive state. In accordance with the present invention, the wheel cylinder pressure of one of the wheel cylinders in which the braking hydraulic pressure control is not executed is largely reduced in comparison with the normal time after the pressure reducing control is started. Accordingly, the wheel cylinder pressure of one of the wheel cylinders in which the braking hydraulic pressure control does not unnecessarily become a high pressure even under the condition that the hydraulic pressure inlet passage of any one of the wheel cylinders is shut off.

Therefore, in accordance with the invention mentioned above, even when the brake assist control is started in a state in which the hydraulic pressure inlet passage of any one of the wheel cylinders is shut off, it is possible to prevent the braking hydraulic pressure from being excessively introduced to the wheel cylinder in which the hydraulic pressure inlet passage is not shut off. Thus, in accordance with the braking force control apparatus of the present invention, it is possible to maintain an excellent controllability even under the condition mentioned above.

Additionally, in accordance with another aspect of the present invention, there is provided a braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source in the case that a slip amount of the wheel is over a predetermined threshold, comprising:

threshold changing means for setting the threshold with respect to the wheel cylinder in which the braking hydraulic pressure control is not executed among the plurality of wheel cylinders smaller than that at a normal time in the case that the braking hydraulic pressure control is executed in any one of the wheel cylinders at a time of executing the brake assist control.

In the present invention, when the brake assist control is started in a state in which the hydraulic pressure inlet passage is shut off with respect to any one of the wheel cylinders, the wheel cylinder pressure of the other wheel cylinders easily becomes an excessively higher pressure in comparison with the normal time. The threshold changing means changes the threshold so that the pressure reducing control is easily started with respect to the other wheel cylinders in the case that the condition mentioned above is generated. Accordingly, the wheel cylinder pressure of the other wheel cylinder does not become an unnecessarily high pressure in spite of suddenly increasing in comparison with the normal time.

Therefore, in accordance with the invention mentioned above, even when the brake assist control is started in a state in which the hydraulic pressure inlet passage of any one of the wheel cylinders is shut off, it is possible to prevent the braking hydraulic pressure from being excessively introduced to the wheel cylinder in which the hydraulic pressure inlet passage is not shut off. Thus, in accordance with the braking force control apparatus of the present invention, it is possible to maintain an excellent controllability under the condition mentioned above.

Further, in accordance with another aspect of the present invention, there is provided a braking force control apparatus for executing a brake assist control for generating a braking hydraulic pressure greater than that at a normal time when an emergency braking operation is executed by a driver and an antilock brake control for controlling a braking hydraulic pressure of a wheel cylinder in each wheel to a pressure which does not generate an excess slip ratio in each wheel, comprising:

operation hydraulic pressure generating means for generating a braking hydraulic pressure in correspondence to a braking operation amount;

assist pressure generating means for generating a predetermined braking hydraulic pressure;

a high pressure passage communicated with both of the operation hydraulic pressure generating means and the assist pressure generating means;

an operation hydraulic pressure cut mechanism capable of setting the operation hydraulic pressure generating means and the high pressure passage in the shut-off state;

a low pressure passage for communicating a predetermined low pressure source with the wheel cylinder in each wheel;

a conductive state control mechanism for controlling a conductive state between the wheel cylinder in each wheel and the high pressure passage and a conductive state between the wheel cylinder in each wheel and the low pressure passage;

BA control means for shutting off the operation hydraulic pressure cut mechanism in the case that an emergency braking operation is executed by a driver and supplying a predetermined braking hydraulic pressure from the assist pressure generating means to the high pressure passage;

ABS control means for controlling the wheel cylinder pressure in each wheel so that no excess slip ratio is generated in each wheel by controlling the conductive state control mechanism in accordance with a predetermined control pattern; and ABS control pattern selecting means for setting the control pattern to a normal pattern in the case that an antilock brake control is executed alone and setting the control pattern to an increased pressure amount restricting pattern for restricting an increased pressure amount of the wheel cylinder pressure in the case that the antilock brake control and the brake assist control are simultaneously executed.

In the invention mentioned above, in the case the excess slip ratio is generated in any one of the wheels without an execution of the emergency braking operation by a driver, the antilock brake control (hereinafter, refer to as an ABS control) is solely started. In this case, the wheel cylinder pressure in each wheel is increased in the case that the wheel cylinder and the operation hydraulic pressure generating means are made in the conductive state. The normal pattern of the ABS control is set such that a proper increased pressure amount is generated in the wheel cylinder pressure in the case that an increase of the wheel cylinder pressure is intended under the condition mentioned above.

When the emergency braking operation is executed by a driver before the ABS control is started, a brake assist control (hereinafter, refer to as a BA control) is started. During an execution of the BA control, the operation hydraulic pressure generating means is separated from the high pressure passage by the operation hydraulic pressure cut mechanism and the assist pressure generating means supplies a predetermined braking hydraulic pressure to the high pressure passage. In this case, the wheel cylinder pressure in each wheel is quickly increased caused by a closure of the operation hydraulic pressure cut mechanism by the assist pressure generating means corresponding to a hydraulic pressure source.

In the case that the slip ratio in each wheel becomes excess together with starting of the BA control, thereafter, it is necessary to simultaneously execute the BA control and the ABS control, that is, execute the BA+ABS control.

In the case that the BA control is started prior to an execution of the ABS control, the ABS control is executed under a condition that the high braking hydraulic pressure generated by the assist pressure generating means is introduced to the high pressure passage. In accordance with the present invention, under the condition mentioned above, the ABS control is executed by the increased pressure amount restricting pattern. Accordingly, in spite that the braking hydraulic pressure higher than that at the normal time is introduced to the high pressure passage, an excess increased pressure amount is not generated in the wheel cylinder pressure in the ABS subject wheel.

Therefore, in accordance with the invention mentioned above, it is possible to prevent the excess increased pressure amount from being applied to the wheel cylinder pressure in the ABS subject wheel, that is, a condition in which a hunting of the ABS control is easily generated from being formed in the case that the ABS control and the BA control are simultaneously executed.

Further, in accordance with the other aspect of the present invention, there is provided a braking force control apparatus for executing a brake assist control for generating a braking hydraulic pressure greater than that at a normal time when an emergency braking operation is executed by a driver and an antilock brake control for controlling a braking hydraulic pressure of a wheel cylinder in each wheel to a pressure which does not generate an excess slip ratio in each wheel, comprising:

operation hydraulic pressure generating means for generating a braking hydraulic pressure in correspondence to a braking operation amount;

assist pressure generating means for generating a predetermined braking hydraulic pressure;

a high pressure passage communicated with both of the operation hydraulic pressure generating means and the assist pressure generating means;

an operation hydraulic pressure cut mechanism capable of setting the operation hydraulic pressure generating means and the high pressure passage in the shut-off state;

a low pressure passage communicated with a predetermined low pressure source;

a conductive state control mechanism for controlling a conductive state between the wheel cylinder in each wheel and the high pressure passage and a conductive state between the wheel cylinder in each wheel and the low pressure passage;

BA control means for shutting off the operation hydraulic pressure cut mechanism in the case that an emergency braking operation is executed by a driver and supplying a predetermined braking hydraulic pressure from the assist pressure generating means to the wheel cylinders of a plurality of wheels via the high pressure passage;

ABS control means for controlling the wheel cylinder pressure in each wheel so that no excess slip ratio is generated in each wheel by controlling the conductive state control mechanism in accordance with a predetermined control pattern; and BA increased pressure slope restricting means for controlling the conductive state control mechanism provided in correspondence to the non-subject wheel so that an increased pressure slope of the wheel cylinder pressure of the non-subject wheel for the antilock brake control is restricted in the case that the brake assist control and the antilock brake control are simultaneously executed.

In the invention mentioned above, when the emergency braking operation is executed by a driver, the BA control is started. During an execution of the BA control, the wheel cylinder pressure in each wheel is increased by the assist pressure generating means corresponding to the hydraulic pressure source. The assist pressure generating means is given a capacity for generating a proper increased pressure slope in the wheel cylinder pressure $P_{W/C}$ in all of the wheel cylinders communicated via the high pressure passage.

When an excess slip ratio is detected with respect to any one of the wheels after the BA control is started, the BA+ABS control is started. The wheel cylinder of the ABS subject wheel is shut off from the high pressure passage except a little time at which an increase of the wheel cylinder pressure in the wheel is required in accordance with the ABS control. Thus, during an execution of the BA+ABS control, almost all amount of the brake fluid discharged from the assist pressure generating means is supplied to the wheel cylinder of the ABS non-subject wheel. In the present invention, when the condition mentioned above is formed, the conductive state control mechanism is controlled so that the increased pressure slope of the ABS non-subject wheel is restricted. Accordingly, in spite that the capacity of the assist pressure generating means is excess, the increase pressure slope of the wheel cylinder pressure of the ABS non-subject wheel is restricted to the same proper slope as that in the case that the BA control is executed alone.

Therefore, in accordance with the invention mentioned above, it is possible to prevent the excess increased pressure slope from generating in the wheel cylinder pressure in the ABS non-subject wheel in the case that the BA control is simultaneously executed with the ABS control.

Further, in accordance with the other aspect of the present invention, there is provided a braking force control apparatus for executing a brake assist control for generating a braking hydraulic pressure greater than that at a normal time when an emergency braking operation is executed by a driver and an antilock brake control for controlling a braking hydraulic pressure of a wheel cylinder in each wheel to a pressure which does not generate an excess slip ratio in each wheel, comprising:

operation hydraulic pressure generating means for generating a predetermined braking hydraulic pressure:

a first low pressure source;

a low pressure passage for communicating the wheel cylinder with a second low pressure source;

assist pressure generating means connected to the first low pressure source and the low pressure passage and generating a predetermined braking hydraulic pressure by pressurizing and feeding a brake fluid sucked from the first low pressure source and the low pressure passage;

a high pressure passage communicated with both of the operation hydraulic pressure generating means and the assist pressure generating means;

an operation hydraulic pressure cut mechanism capable of setting the operation hydraulic pressure generating means and the high pressure passage in the shut-off state;

a conductive state control mechanism for controlling a conductive state between the wheel cylinder in each wheel and the high pressure passage and a conductive state between the wheel cylinder in each wheel and the low pressure passage;

BA control means for shutting off the operation hydraulic pressure cut mechanism in the case that an emergency braking operation is executed by a driver and supplying a predetermined braking hydraulic pressure from the assist pressure generating means to the high pressure passage;

ABS control means for controlling the wheel cylinder pressure in each wheel so that no excess slip ratio is generated in each wheel by controlling the conductive state control mechanism in accordance with a predetermined control pattern; and low pressure source cutting means for setting the first low pressure source and the assist pressure generating means to the shut-off state in the case that brake assist control and the antilock brake control are simultaneously executed.

In the invention mentioned above, when the emergency braking operation is executed by a driver, the BA control is started. During an execution of the BA control, the wheel cylinder pressure in each wheel is increased by the assist pressure generating means corresponding to the hydraulic pressure source. The assist pressure generating means sucks the brake fluid from the first low pressure source so as to supply a braking hydraulic pressure to the high pressure passage in the case that the BA control is executed alone. In this case, a large amount of brake fluid is supplied to the high pressure passage.

When an excess slip ratio is detected with respect to any one of the wheels after the BA control is started, the BA+ABS control is started. The ABS control is started in accordance that the wheel cylinder pressure of the ABS subject wheel is reduced, that is, the brake fluid is discharged to the low pressure passage from the wheel cylinder of the ABS subject wheel. Accordingly, when the BA+ABS control is started, the brake fluid immediately flows into the second low pressure source.

In the present invention, when the BA+ABS control is started, the assist pressure generating means and the first low pressure source are made in the shut-off state. Accordingly, the brake fluid pressurized and fed by the assist pressure generating means is thereafter limited only to the brake fluid stored in the second low pressure source. Therefore, the high braking hydraulic pressure is not improperly generated in the high pressure passage during an execution of the BA+ABS control. Under a condition that the high braking hydraulic pressure is not improperly generated in the high pressure passage, no excess increased pressure amount is generated in the wheel cylinder pressure in the ABS subject wheel, no excess increased pressure slope is generated in the wheel cylinder pressure $P_{W/C}$ in the ABS non-subject wheel, and the brake fluid does not inversely flows into the operation hydraulic pressure generating means to an excess amount.

Accordingly, in the case that the BA control and the ABS control are simultaneously executed, it is possible to prevent the high braking hydraulic pressure from improperly generating in the high pressure passage.

Further, in the braking force control apparatus in accordance with the invention mentioned above, the structure may be made such as to comprise high pressure passage releasing means for setting the operation hydraulic pressure cut mechanism to a conductive state in the case that the brake assist control and the antilock brake control are simultaneously executed and a reducing of the wheel cylinder pressure is intended in the subject wheel for the antilock brake control.

In the case that the BA+ABS control is executed, the assist pressure generating means pressurizes and feeds only the brake fluid stored in the second low pressure source as mentioned above. The brake fluid is discharged to the second low pressure source at every time when a reducing of the wheel cylinder pressure in the ABS subject wheel is intended. Accordingly, the assist pressure generating means pressurizes and feeds a large amount of brake fluid to the high pressure passage in synchronous with a period when a reducing of the wheel cylinder pressure is intended in the ABS subject wheel.

The high pressure passage is set to a conductive state with the operation hydraulic pressure generating means only at a period when a large amount of brake fluid is pressurized and fed by the assist pressure generating means. When the conducive state between the high pressure passage and the operation hydraulic pressure generating means is controlled in the manner mentioned above, the braking hydraulic pressure within the high pressure passage is controlled to a proper pressure higher than the braking hydraulic pressure generated by the operation hydraulic pressure generating means. Therefore, in accordance with the present invention, it is possible to increase the wheel cylinder pressure in the ABS non-subject wheel in accordance with a proper increased pressure slope without generating a hunting under the control in the ABS subject wheel.

Therefore, It is possible to prevent the hunting under the control from generating in the ABS subject wheel and prevent the excess increased pressure slope from generating in the wheel cylinder pressure in the ABS non-subject wheel in the case that the BA control and the ABS control are simultaneously executed.

Further, in accordance with the other aspect of the present invention, there is provided a braking force control apparatus for executing a brake assist control for generating a braking hydraulic pressure greater than that at a normal time when an emergency braking operation is executed by a driver and an antilock brake control for controlling a braking hydraulic pressure of a wheel cylinder in each wheel to a pressure which does not generate an excess slip ratio in each wheel, comprising:

operation hydraulic pressure generating means for generating a braking hydraulic pressure in correspondence to a braking operation amount;

assist pressure generating means for generating a predetermined braking hydraulic pressure;

a high pressure passage communicated with both of the operation hydraulic pressure generating means and the assist pressure generating means;

an operation hydraulic pressure cut mechanism capable of setting the operation hydraulic pressure generating means and the high pressure passage in the shut-off state;

a low pressure passage communicated with a predetermined low pressure source;

a conductive state control mechanism for controlling a conductive state between the wheel cylinder in each wheel and the high pressure passage and a conductive state between the wheel cylinder in each wheel and the low pressure passage;

BA control means for shutting off the operation hydraulic pressure cut mechanism in the case that an emergency braking operation is executed by a driver and supplying a predetermined braking hydraulic pressure from the assist pressure generating means to the high pressure passage;

ABS control means for controlling the wheel cylinder pressure in each wheel so that no excess slip ratio is generated in each wheel by controlling the conductive state control mechanism in accordance with a predetermined control pattern; and high pressure passage releasing means for setting the operation hydraulic pressure cut mechanism to a conductive state in the case that brake assist control and the antilock brake control are simultaneously executed.

In the invention mentioned above, during an execution of the BA+ABS control, since the wheel cylinder of the ABS subject wheel becomes in a state of being substantially separated from the high pressure passage, the discharge capacity of the assist pressure generating means becomes excessive. At this time, in accordance with the present invention, the high pressure passage and the operation hydraulic pressure generating means are made in the conductive state. When the high pressure passage and the operation hydraulic pressure generating means are made in the conductive state, it is possible that the brake fluid discharged by the assist pressure generating means flows into the operation hydraulic pressure generating means. Accordingly, even when the discharging capacity of the assist pressure generating means is excessive, the high braking hydraulic pressure is not improperly generated in the high pressure passage.

Therefore, in the case that the BA control and the ABS control are simultaneously executed, it is possible to prevent the high braking hydraulic pressure from improperly generating in the high pressure passage.

Additionally, in accordance with other aspect of the present invention, there is provided a braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

hydraulic pressure inlet restricting means for restricting an inlet of the braking hydraulic pressure to the wheel cylinder in which the braking hydraulic pressure control is not executed among the wheel cylinders in the case that the braking hydraulic pressure control is executed in any one of the plurality of wheel cylinders at a time of executing the brake assist control.

In accordance with the invention mentioned above, even when the brake assist control is started in a state in which the hydraulic pressure inlet passage in any one of the wheel cylinders Is shut off, it is possible to prevent the braking hydraulic pressure from being excessively introduced to the wheel cylinder in which the hydraulic pressure inlet passage is not shut off. Therefore, in accordance with the braking force control apparatus of the present invention, it is possible to maintain an excellent controllability even under the condition mentioned above.

Additionally, in accordance with other aspect of the present invention, there is provided a braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure Inlet passage which communicates a wheel cylinder to be controlled and the high pressure source, comprising:

hydraulic pressure inlet restriction means for restricting an inlet of the braking hydraulic pressure to the wheel cylinder in which the pressure reducing control is not executed among the wheel cylinders in the case that the pressure reducing control is executed in any one of the plurality of wheel cylinders at a time of executing the brake assist control.

According to the invention mentioned above, in the case that the pressure reducing control is executed with respect to any one of the wheel cylinders when the brake assist control is executed, the braking hydraulic pressure is prevented from flowing into the wheel cylinder. Accordingly, when the pressure reducing control is started under the circumstance, there is generated a case that the braking hydraulic pressure to be supplied to the shut-off wheel cylinder in the hydraulic pressure inlet passage is distributed to the other wheel cylinders. The hydraulic pressure inlet restricting means prevents the braking hydraulic pressure from being excessively introduced to the other wheel cylinder under the above circumstance.

Accordingly, in accordance with the invention mentioned above, even when the pressure reducing control is executed in a state in which the hydraulic pressure inlet passage in any one of the wheel cylinders is shut off, it is possible to prevent the braking hydraulic pressure from being excessively introduced to the wheel cylinder in which the hydraulic pressure inlet passage is not shut off. Therefore, in accordance with the braking force control apparatus of the present invention, it is possible to maintain an excellent controllability even under the condition mentioned above.

The other objects, features and advantages of the present invention will be further clear by reading the following detailed description with reference to the accompanying drawings.

BEST MODE FOR CARRYING OUT THE INVENTION

Figure 1:
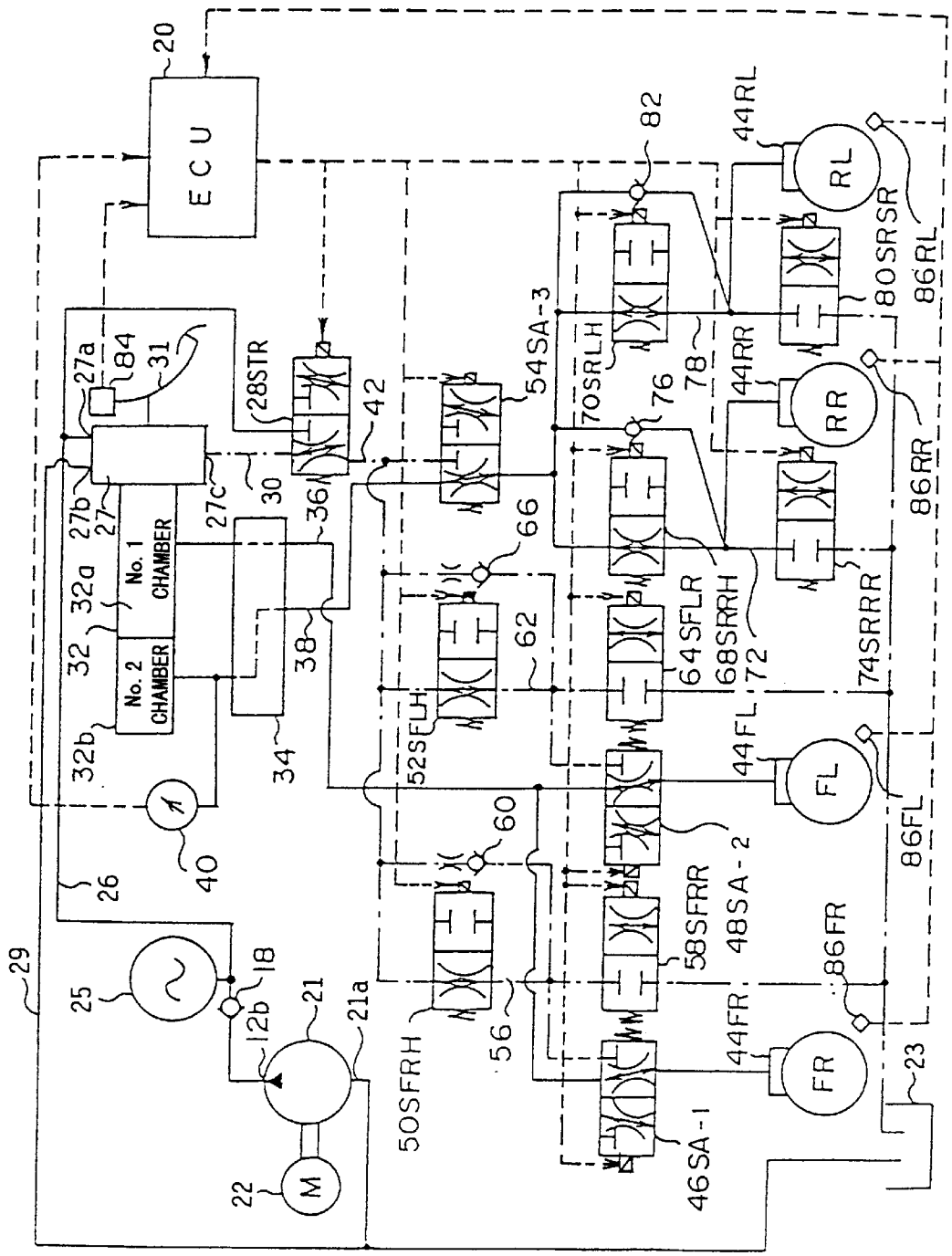
FIG. 1 is a system configuration diagram of a braking force control apparatus in accordance with a first to third embodiments of the present invention.

FIG. 1 is a system configuration diagram of a braking force control apparatus in accordance with a first embodiment of the present invention. The braking force control apparatus shown in FIG. 1 is controlled by an electronic control unit 20 (hereinafter, refer to as an ECU 20). The braking force control apparatus is provided with a pump 21. The pump 21 is provided with a motor 22 as a power source. An inlet port 21a of the pump 21 is communicated with a reservoir tank 23. Further, an accumulator 25 is communicated with an outlet port 21b of the pump 21 via a check valve 24. The pump 21 delivers a brake fluid within the reservoir tank 23 from the outlet port 21b with a pressure so that a predetermined hydraulic pressure is always accumulated in the accumulator 25.

The accumulator 25 is communicated with a high pressure port 27a of a regulator 27 and a regulator switching solenoid 28 (hereinafter, refer to as an STR 28) via a high pressure passage 26. The regulator 27 is provided with a low pressure port 27b communicated with the reservoir tank 23 via a low pressure passage 29 and a controlled hydraulic pressure port 27c communicated with the STR 28 via a controlled hydraulic pressure passage 30. The STR 28 corresponds to a two-positional solenoid valve for selectively setting one of the controlled hydraulic pressure passage 30 and the high pressure passage 26 in the conductive state, and is structured such as to normally set the controlled hydraulic pressure passage 30 in the conductive state and the high pressure passage 26 in the shut-off state. Here, the two-positional solenoid valve means a solenoid valve which can switch to two states.

As well as a brake pedal 31 is connected to the regulator 27, a master cylinder 32 Is fixed to the regulator 27. The regulator 27 is provided with a hydraulic chamber formed therein. The hydraulic chamber is always communicated with the controlled hydraulic pressure port 27c, and is selectively communicated with the high pressure port 27a or the low pressure port 27b in accordance with an operation state of the brake pedal 31. The regulator 27 is structured such that an internal pressure of the hydraulic chamber is adjusted to a hydraulic pressure in accordance with a brake pedaling force $F_P$ acting on the brake pedal 31. Accordingly, a hydraulic pressure in accordance with the brake pedaling force $F_P$ is always generated in the controlled hydraulic pressure port 27c of the regulator 27. Hereinafter, the hydraulic pressure is referred to as a regulator pressure $P_{RE}$.

The brake pedaling force $F_P$ acting on the brake pedal 31 is mechanically transmitted to the master cylinder 32 via the regulator 27. Further, a force in accordance with the hydraulic pressure in the hydraulic chamber of the regulator 27, that is, the regulator pressure $P_{RE}$ is transmitted to the master cylinder 32. Hereinafter, the force is referred to as a brake assist force $F_A$. Accordingly. when the brake pedal 31 is stepped down, a resultant of force of the brake pedaling force $F_P$ and the brake assist force $F_A$ is transmitted to the master cylinder 32.

The master cylinder 32 is provided with a first hydraulic chamber 32a and a second hydraulic chamber 32b therein. A master cylinder pressure $P_{M/C}$ in accordance with the resultant of force of the brake pedaling force $F_p$ and the brake assist force $F_A$ is generated in the first hydraulic chamber 32a and the second hydraulic chamber 32b. The master cylinder pressure $P_{M/C}$ generated in the first hydraulic chamber 32a and the master cylinder pressure $P_{M/C}$ generated in the second hydraulic chamber 32b are both communicated with a proportioning valve 34 (hereinafter, refer to as a P-valve 34).

A first hydraulic pressure passage 36 and a second hydraulic pressure passage 38 are communicated with the P-valve 34. The P-valve 34 supplies the master cylinder pressure $P_{M/C}$ as it is to the first hydraulic pressure passage 36 and the second hydraulic pressure passage 38 in a region in which the master cylinder pressure $P_{M/C}$ is less than a predetermined value. Further, the P-valve 34 supplies the master cylinder pressure $P_{M/C}$ as it is to the first hydraulic pressure passage 36 and supplies a hydraulic pressure obtained by reducing the master cylinder pressure $P_{M/C}$ at a predetermined ratio to the second hydraulic pressure passage 38, in a region in which the master cylinder pressure $P_{M/C}$ is more than a predetermined value.

A hydraulic sensor 40 for outputting an electric signal which is in proportion to the mater cylinder pressure $P_{M/C}$ is additionally provided in the second hydraulic pressure passage 38. An output signal of the hydraulic sensor 40 is supplied to the ECU 20. The ECU 20 detects the master cylinder pressure $P_{M/C}$ generated in the master cylinder 32 on the basis of the output signal of the hydraulic sensor 40.

A third hydraulic pressure passage 42 is communicated with the STR 28 mentioned above. The third hydraulic pressure passage 42 is made in the conductive state with respect to either the controlled hydraulic pressure passage 30 or the high pressure passage 26. In accordance with the present embodiment, a braking hydraulic pressure is supplied to wheel cylinders 44FL and 44FR arranged in front left and right wheels FL and FR from the first hydraulic pressure passage 36 communicated with the P-valve 34 or from the third hydraulic pressure passage 42 communicated with the STR 28. Further, a braking hydraulic pressure is supplied to wheel cylinders 44RL and 44RR arranged in rear left and right wheels RL and RR from the second hydraulic pressure passage 38 communicated with the P-valve 34 or the third hydraulic pressure passage 42 communicated with the STR 28.

A first assist solenoid 46 (hereinafter, refer to as an $SA_{-1}$ 46) and a second assist solenoid 48 (hereinafter, refer to as an $SA_{-2}$ 48) are communicated with the first hydraulic pressure passage 36. On the other hand, a front right wheel holding solenoid 50 (hereinafter, refer to as an SFRH 50), a front left wheel holding solenoid 52 (hereinafter, refer to as an SFLH 52) and a third assist solenoid 54 (hereinafter, refer to as an $SA_{-3}$ 54) are communicated with the third hydraulic pressure passage 42. Here, in the present specification, the solenoid means a solenoid valve.

The SFRH 50 is a two-positional solenoid valve for maintaining a valve in an open state in a normal state. The SFRH 50 is communicated with the $SA_{-1}$ 46 and a front right wheel pressure reducing solenoid valve 58 (hereinafter, refer to as an SFRR 58) via a pressure adjusting hydraulic pressure passage 56. A check valve 60 enabling a fluid flow only in a direction from the side of the pressure adjusting hydraulic pressure passage 56 to the side of the third hydraulic pressure passage 42 is provided between the third hydraulic pressure passage 42 and the pressure adjusting hydraulic pressure passage 56 in a parallel manner.

The $SA_{-1}$ 46 is a two-positional solenoid valve which causes either the first hydraulic pressure passage 36 or the pressure adjusting hydraulic pressure passage 56 to selectively communicate with the wheel cylinder 44FR, and in the normal state (OFF-state), the $SA_{-1}$ 46 causes the first hydraulic pressure passage 36 to communicate with the wheel cylinder 44FR. On the other hand, the SFRR 58 is a two-positional solenoid valve which sets the pressure adjusting hydraulic pressure passage 56 and the reservoir tank 23 in the conductive state or in the shut-off state. The SFRR 58 sets the pressure adjusting hydraulic pressure passage 56 and the reservoir tank 23 in the shut-off state in the normal state (off-state).

The SFLH 52 is a two-positional solenoid valve for maintaining a valve in an open state in the normal state. The SFLH 52 is communicated with the $SA_{-2}$ 48 and a front left wheel pressure reducing solenoid 64 (hereinafter, referred to as an SFLR 64) via an adjusting pressure hydraulic pressure passage 62. A check valve 66 enabling a fluid flow only in a direction from the side of the pressure adjusting hydraulic pressure passage 62 to the side of the third hydraulic pressure passage 42 is provided between the third hydraulic pressure passage 42 and the pressure adjusting hydraulic pressure passage 62 in a parallel manner.

The $SA_{-2}$ 48 is a two-positional solenoid valve which causes either the first hydraulic pressure passage 36 or the pressure adjusting hydraulic pressure passage 62 to selectively communicate with the wheel cylinder 44FL, and in the normal state (the off-state), the $SA_{-2}$ 48 causes the first hydraulic pressure passage 36 to communicate with the wheel cylinder 44FL. On the other hand, the SFLR 64 is a two-positional solenoid valve which sets the pressure adjusting hydraulic pressure passage 62 and the reservoir tank 23 in the conductive state or in the shut-off state. The SFLR 64 sets the pressure adjusting hydraulic pressure passage 62 and the reservoir tank 23 in the shut-off state in the normal state (off-state).

The second hydraulic pressure passage 38 is communicated with the $SA_{-3}$ 54 mentioned above. The downstream side of the $SA_{-3}$ 54 is communicated with a rear right wheel holding solenoid 68 (hereinafter, referred to as an SRRH 68) and a rear left wheel holding solenoid 70 (hereinafter, referred to as an SRLH 70). The SRRH 68 is provided in correspondence to the wheel cylinder 44RR for the rear right wheel RR. The SRLH 70 is provided in correspondence to the wheel cylinder 44RL for the rear left wheel RL. The $SA_{-3}$ 54 is a two-positional solenoid valve which causes either the second hydraulic pressure passage 38 or the third hydraulic pressure passage 42 to selectively communicate with the SRRH 68 and the SRLH 70, in the normal state (the off-state), the $SA_{-3}$ 54 causes the second hydraulic pressure passage 38 to communicate with the SRRH 68 and the SRLR 70.

The downstream side of the SRRH 68 is communicated with the wheel cylinder 44RR and a rear right wheel pressure reducing solenoid 74 (hereinafter, referred to as an SRRR 74) via a pressure adjusting hydraulic pressure passage 72. The SRRR 74 is a two-positional solenoid valve which sets the pressure adjusting hydraulic pressure passage 72 and the reservoir tank 23 in the conductive state or the shut-off state, and in the normal state (off-state). the SRRR 74 sets the pressure adjusting hydraulic pressure passage 72 and the reservoir tank 23 in the shut-off state. In addition, a check valve 76 enabling a fluid flow only in a direction from the side of the pressure adjusting hydraulic pressure passage 72 to the side of the $SA_{-3}$ 54 is provided between the $SA_{-3}$ 54 and the pressure adjusting hydraulic pressure passage 72 in a parallel manner.

Similarly, the downstream side of the SRLH 70 is communicated with the wheel cylinder 44RL and a rear left wheel pressure reducing solenoid 80 (hereinafter, referred to as an SRLR 80) via a pressure adjusting hydraulic pressure passage 78. The SRLR 80 is a two-positional solenoid valve which sets the pressure adjusting hydraulic pressure passage 78 and the reservoir tank 23 in the conductive state or the shut-off state, and in the normal state (off-state), the SRLR 80 sets the pressure adjusting hydraulic pressure passage 78 and the reservoir tank 23 in the shut-off state. In addition, a check valve 82 enabling a fluid flow only in a direction from the side of the pressure adjusting hydraulic pressure passage 78 to the side of the $SA_{-3}$ 54 is provided between the $SA_{-3}$ 54 and the pressure adjusting hydraulic pressure passage 78 in a parallel manner.

In the system of the present embodiment, a brake switch 84 is provide in the vicinity of the brake pedal 31. The brake switch 84 is a switch which generates an ON output while the brake pedal 31 is being pressed. The output signal from the brake switch 84 is supplied to the ECU 20. The ECU 20 determines, on the basis of the output signal from the brake switch 84, whether or not a driver of executes a braking operation.

In addition, in the system of the present embodiment, wheel speed sensors 86FL, 86FR, 86RL and 86RR (hereinafter, designated by 86 as a whole) are respectively provided in the vicinity of the front left and right wheels FL and FR and the rear left and right wheels RL and RR, each of the sensors generating a pulse signal every time corresponding wheel rotates by a predetermined angle. The output signals from the wheel speed sensor 86 are supplied to the ECU 20. The ECU 20 detects revolution speeds of each wheel FL, FR, RL and RR on the basis of the output signals from the wheel speed sensors 86**.

The ECU 20 supplies, if necessary, driving signals to the above-mentioned STR 28, $SA_{-1}$ 46, $SA_{-2}$ 48, $SA_{-3}$ 54, SFRH 50, SFLH 52, SFRR 58, SFLR 64, SRRH 68, SRLH 70, SRRR 74 and SFLR 80 on the basis of the output signals from the hydraulic sensor 40, the wheel speed sensor 86** and the brake switch 84.

A description will now be given of an operation of the braking force control apparatus of the present embodiment. When the vehicle is in a stable state, the braking force control apparatus of the present embodiment executes the normal control for generating a braking force corresponding to the brake pedaling force $F_P$ acting on the brake pedal 31. The normal control is realized, as shown in FIG. 1, by setting all of the STR 28, $SA_{-1}$ 46, $SA_{-2}$ 48, $SA_{-3}$ 54, SFRH 50, SFLH 52, SFRR 58, SFLR 64, SRRH 68, SRLH 70, SRRR 74 and SRIR 80 in the OFF-state.

That is, in the state shown in FIG. 1, the wheel cylinders 44FR and 44FL are caused to communicate with the first hydraulic pressure passage 36, and the wheel cylinders 44RR and 44RL are caused to communicate with the second hydraulic pressure passage 38, respectively. In this case, the brake fluid flows between the master cylinder 32 and the wheel cylinders 44FR, 44FL, 44RL and 44RR (hereinafter, designated by 44** as a whole), so that a braking force in accordance with the brake pedaling force $F_P$ is generated in each wheel FL, FR, RL and RR.

In the present embodiment, when a possibility that any one of the wheels is going to be in a lock state is detected, it is determined that a execution condition for executing an antilock brake control (hereinafter, referred to as an ABS control) with respect to the wheel is established, and thereafter the ABS control is started. The ECU 20 calculates the wheel speeds $Vw_{FL}$, $Vw_{FR}$, $Vw_{RL}$ and $Vw_{RR}$ (hereinafter, designated by Vw as a whole) of each wheel on the basis of the output signals from the wheel speed sensor 86, and further the ECU 20 further calculates an assumed value $V_{SO}$ of a vehicle speed (hereinafter, referred to as an assumed vehicle speed $V_{SO}$) on the basis of the wheel speed Vw** with a known method. When the vehicle is in a braking state, a slip ratio S of each wheel is calculated in accordance with the following equation. When S is greater than a predetermined value, it is determined that there is a possibility that the wheel is going to be in a lock state.

$$S=(V_{SO}-Vw^{**}) \cdot 100/V_{SO} \quad (1)$$

When the ECU 20 determines that the execution condition for executing the ABS control with respect to the front right wheel FR is established, the ECU 20 outputs the driving signals to the $AS_{-1}$ 46. Further, when the ECU 20 determines that the execution condition in which the ABS control should be executed with respect to the front left wheel FL is established, the ECU 20 outputs the driving signals to the $AS_{-2}$ 48. In addition, when the ECU 20 determines that the execution condition in which the ABS control should be executed with respect to either the rear left wheel RL or the rear right wheel RR is established, the ECU 20 outputs the driving signals to the $AS_{-3}$ 54.

When the $SA_{-1}$ 46 is turned on, the wheel cylinder 44FR is shut off from the first hydraulic pressure passage 36 and communicated with the pressure adjusting hydraulic pressure passage 56. Further, when the $SA_{-2}$ 48 is turned on, the wheel cylinder 44FL is shut off from the first hydraulic pressure passage 36 and communicated with the pressure adjusting hydraulic pressure passage 62. Still further, when the $SA_{-3}$ 54 is turned on, the SRRH 68 and the SRLH 70 are shut off from the second hydraulic pressure passage 38 and communicated with the third hydraulic pressure passage 42.

When the $SA_{-1}$ 46, $SA_{-2}$ 48 and $SA_{-3}$ 54 are turned on, as mentioned above, the wheel cylinders 44 are respectively communicated with the corresponding holding solenoids SFRH 50, SFLH 52, SRRH 68 and SRLH 70 (hereinafter, referred to as a holding solenoids SH as a whole) and the corresponding pressure reducing solenoids SFRR 58, SFLR 64, SRRR 74 and SRLR 80 (hereinafter, referred to as pressure reducing solenoids SR as a whole). A state is formed in which a regulator pressure $P_{RE}$ is introduced to the holding solenoids SH via the third hydraulic pressure passage 42 and the STR 28.

Under the above condition, the holding solenoids SH are in the opened valve state and the pressure reducing solenoids SR are in a closed valve state, so that the wheel cylinder pressure $P_{W/C}$ of the wheel cylinder 44 are increased to the regulator pressure $P_{RE}$ as an upper limit. Hereinafter, this state is referred to as 1̂ a pressure increasing mode. In addition, under the above condition, when the holding solenoids SH are in the closed valve state and the pressure reducing solenoids SR are in the closed valve state, the wheel cylinder pressure $P_{W/C}$ of the corresponding wheel cylinders 44 are maintained without being increased or reduced. Hereinafter, this state is referred to as 2̂ a holding mode. Further, under the above condition, when the holding solenoids SH are in the closed valve state and the pressure reducing solenoids SR are in the opened valve state, the wheel cylinder pressure $P_{W/C}$ of the corresponding wheel cylinders 44** are reduced. Hereinafter, this state is referred to as 3̂ a pressure reducing mode.

Figure 2:
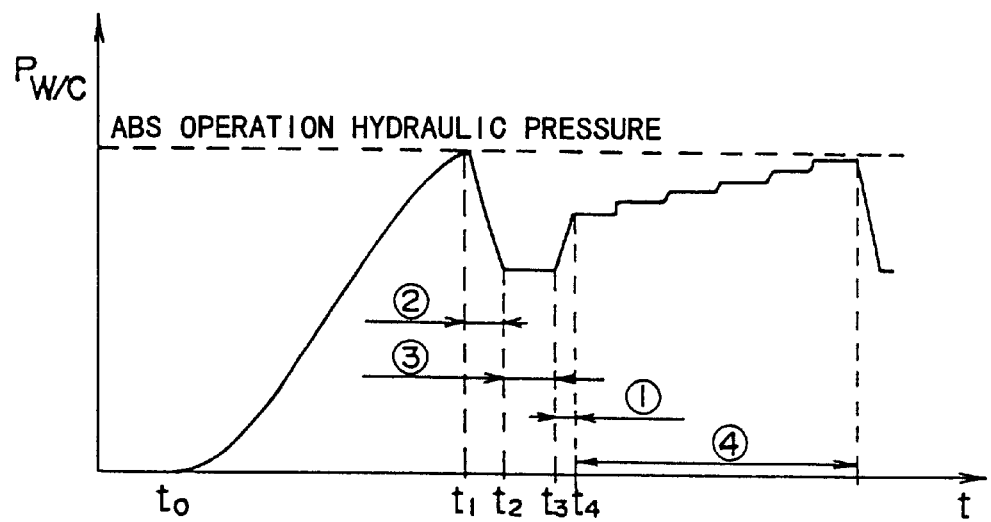
FIG. 2 is a graph showing a change of a wheel cylinder pressure $P_{W/C}$ realized at a time when the braking force control apparatus shown in FIG. 1 executes an ABS control.

The ECU 20 executes processings in 1̂ the pressure increasing mode mentioned above, 2̂ the holding mode and 3̂ the pressure reducing mode so that the slip ratio S of each wheel is controlled within an appropriate value range, that is, so that each wheel is not shifted to a lock state. FIG. 2 shows an elapsing change of the wheel cylinder pressure $P_{W/C}$ realized when the ECU 20 executes the ABS control by combining these modes.

FIG. 2 shows a case that the braking operation is started at a time $t_0$ and an execution condition for executing the ABS control is established at a time t1. After the time $t_0$, the wheel cylinder pressure $P_{W/C}$ increases and the slip ratio S of the wheel reaches a predetermined value at the time $t_1$, then the ABS control is started. Here, in the following description, the wheel cylinder pressure $P_{W/C}$ when the slip ratio S of the wheel reaches the predetermined value is referred to as an ABS operation hydraulic pressure.

When the execution condition for executing the ABS control is established, at first, the pressure reducing mode 2̂ is realized so as to reducing the wheel cylinder pressure $P_{W/C}$ from the ABS operation hydraulic pressure. A time that the pressure reducing mode is maintained after the execution condition for executing the ABS control is established (hereinafter, refer to as a first pressure reducing time) is determined in accordance with a slip condition of the wheel when the execution condition for executing the ABS control is established. In particular, in the case that the slip ratio of the wheel gradually increases, the first pressure reducing time is set in a relatively short time, and on the other hand, in the case that the slip ratio of the wheel steeply increases, the first pressure reducing time is set in a relatively long time.

FIG. 2 shows a case that the first pressure reducing mode is maintained to the time $t_2$. When a time the first pressure reducing mode should be maintained has passed, ③ the holding mode is then realized. Thereafter, when a predetermined time the holding mode should be maintained has passed, ① the pressure increasing mode is started at a time $t_3$. Then, after the pressure increasing mode is maintained for a predetermined time, a pressure gradual increasing mode (hereinafter, designated by ④, is started at a time $t_4$. The pressure gradual increasing mode is a mode realized in accordance that ① the pressure increasing mode and ③ the holding mode are alternately executed. Thereafter, when the wheel cylinder pressure $P_{W/C}$ again reaches the ABS operation pressure, the subsequent control mentioned above, that is, the processing for successively realizing ② the pressure reducing mode→③ the holding mode→① the pressure increasing mode→④ the pressure gradual increasing mode is again executed.

During an execution of the ABS control, at almost all of a period that ② the pressure reducing mode is executed, a period that ③ the holding mode is executed and a period that ④ the pressure gradual increasing mode is executed, the wheel cylinders 44 which is a subject of the ABS control are in the shut-off state from the hydraulic pressure source (the master cylinder 32 and the regulator 27) by the corresponding holding solenoids SH. As mentioned above, the wheel cylinder which is a subject of the ABS control is in a state substantially separated from the hydraulic pressure source during the period of an execution of the ABS control.

After a depression of the brake pedal 31 is released by a driver during an execution of the ABS control, the wheel cylinder pressure $P_{W/C}$ is required to be immediately reduced. In the system of the present embodiment, the check valves 60, 66, 76 and 82 enabling a fluid flow in a direction from the side of the wheel cylinders 44 to the side of the third hydraulic pressure passage 42 are provided in hydraulic pressure passages corresponding to each wheel cylinders 44. Thus, in accordance with the system of the present embodiment, after the depression of the brake pedal 31 is released, the wheel cylinder pressure $P_{W/C}$ of all of the wheel cylinders 44** can be immediately reduced.

In the system of the present embodiment, in the case that the ABS control Is being executed, the wheel cylinder pressure $P_{W/C}$ is increased by the brake fluid being supplied from the regulator 27 to the wheel cylinders 44, that is, by being supplied the brake fluid from the pump 21 to the wheel cylinders 44. Further, the wheel cylinder pressure $P_{W/C}$ is reduced by being flowed the brake fluid in the wheel cylinders 44** into the reservoir tank 23. When the increase in the wheel cylinder pressure $P_{W/C}$ is executed by using the master cylinder 32 as a fluid pressure source, in the case that the pressure increasing mode and the pressure reducing mode are repeatedly executed, the brake fluid in the master cylinder 32 gradually reduces and a so-called bottoming of the master cylinder may occur.

To the contrary, if the pump 21 is used as a hydraulic pressure source so as to increase the wheel cylinder pressure $P_{W/C}$, as in the system of the present embodiment, such a bottoming can be prevented. Thus, in the system of the present embodiment, a stable operational state can be maintained even in the case that the ABS control is continued for a long time.

In the system of the present embodiment, the ABS control is started in the case that a possibility for shifting to the lock state is detected in any one of the wheels. Accordingly, in order to start the ABS control, as a precondition, a braking operation having a level at which a large slip ratio S is generated in any one of the wheels Is required to be executed.

In the case that a driver is highly skilled he/she can increase the brake pedaling force $F_P$ immediately and maintain the increased brake pedaling force $F_P$ for a long time after a situation in which an emergency braking is required occurs. If such a brake pedaling force $F_P$ is applied to the brake pedal 31, a sufficiently high braking hydraulic pressure can be supplied from the master cylinder 32 to each wheel cylinder 44** so as to start the ABS control.

In the case that a driver is unskilled, however, the brake pedaling force $F_P$ may not be increased to a sufficient value after a situation where an emergency braking is required occurs. In the case that the brake pedaling force $F_P$ applied to the brake pedal 31 is not increased to the sufficient level after an emergency braking is required, the wheel cylinder pressures $P_{W/C}$ in each wheel cylinder 44** may not be increased sufficiently, there is a possibility that the ABS control is not started.

Thus, in the case that a driver is unskilled, in spite that the vehicle has an excellent braking performance, the performance may not be exhibited well even at a time of the emergency braking operation. Accordingly, in the system of the present embodiment, a control for forcibly increasing the wheel cylinder pressure $P_{W/C}$ is executed in the case that the brake pedal 31 is intended to be operated as an emergency braking and the brake pedaling force $F_P$ is not increased sufficiently. Hereinafter, this control will hereinafter be referred to as a brake assist control (a BA control).

In the system of the present embodiment, when a brake pedaling force $F_P$ is applied to the brake pedal 31, a master cylinder pressure $P_{M/C}$ corresponding to the applied brake pedaling force $F_P$ is generated in the master cylinder 32. In the case that a normal braking operation is executed, the master cylinder pressure $P_{M/C}$ is changed more gradually than the case that a braking operation is intended to be operated as an emergency braking. Further, the master cylinder pressures $P_{M/C}$ generated in accordance with the normal braking operation has a convergent value lower than that of the master cylinder pressure $P_{M/C}$ generated in accordance with a braking operation which is intended to be operated as the emergency braking.

Therefore, in the case that the master cylinder pressure $P_{M/C}$ detected by the hydraulic pressure sensor 40 after a braking operation is started is increased at a ratio greater than a predetermined ratio and to a sufficient value, it can be determined that the braking operation which is intended to be operated as an emergency braking is executed. In addition, in the case that the master cylinder pressure $P_{M/C}$ after a braking operation is started shows a change rate smaller than a predetermined value and a convergent value of the master cylinder pressure $P_{M/C}$ does not reach the predetermined value, it can be determined that the braking operation which is intended to be operated as a normal braking is executed.

In the present embodiment, an execution of the BA control is started in the case that the master cylinder pressure $P_{M/C}$ which is a detected value of the hydraulic pressure sensor 40 (hereinafter, the detected value will be referred to as an $SP_{M/C}$) and the change rate $\Delta SP_{M/C}$ thereof meet predetermined conditions for an emergency braking and the detected value $SP_{M/C}$ is not increased sufficiently (hereinafter, these conditions will be referred to as an execution condition of the BA control as a whole).

A description will now be given of an operation of the system of the present embodiment in accordance with an execution of the BA control then the braking operation which satisfies conditions for the emergency braking is executed, it is determined that an execution condition for executing the BA control is established in the ECU 20. After the ECU 20 determines that the condition for executing the BA control is established, the ECU 20 determines whether or not a state in which the accumulator 25 is more advantageous than the master cylinder pressure $P_{M/C}$ as a hydraulic pressure source for steeply increasing the wheel cylinder pressure $P_{W/C}$ is formed. As a result, when the state in which the accumulator 25 is more advantageous as a hydraulic pressure source is formed, it is determined that a start timing for the BA control has come in the ECU 20.

When the ECU 20 determines that the start timing for the BA control has come, the ECU 20 outputs driving signals to STR 28, $SA_{-1}$ 46, $SA_{-2}$ 48 and $SA_{-3}$ 54. When the STR 28 receives the above driving signal to be turned on, the third hydraulic pressure passage 42 is directly connected with the high pressure passage 26. In this case, the accumulator pressure $P_{ACC}$ is introduced into the third hydraulic pressure passage 42. Further, when the $SA_{-1}$46 and the $SA_{-2}$ 48 receive the above driving signals to be turned on, the wheel cylinders 44FR and 44FL are communicated with the pressure adjusting hydraulic pressure passages 56 and 62, respectively. Further, when the $SA_{-3}$ 54 receives the above driving signal to be turned on, the upstream sides of SRRH 68 and SRLH 70 are communicated with the third hydraulic pressure passage 42. In this case, all of the wheel cylinders 44 are communicated with the respective holding solenoids SH and the respective pressure reducing solenoids SR as well as a state in which the accumulator pressure $P_{ACC}$ is introduced into upstream of all of the holding solenoids SH is formed.

In the case that the other braking force control such as the ABS control is not executed at a time when it is determined that the start timing for the BA control has come, all of the holding solenoids SH and all of the pressure reducing solenoids SR are maintained in the OFF-state. Accordingly, as mentioned above, the accumulator pressure $P_{ACC}$ is introduced to the upstream of the holding solenoids SH, thereafter the introduced hydraulic pressure is directly supplied to the wheel cylinders 44. As a result, the wheel cylinder pressure $P_{W/C}$ in all of the wheel cylinders 44** are increased toward the accumulator pressure $P_{ACC}$.

Thus, in the system of the present embodiment, the wheel cylinder pressure $P_{W/C}$ of all the wheel cylinders 44** can be immediately increased without relation to the magnitude of the brake pedaling force $F_P$ in the xase that an emergency braking operation is executed. Accordingly, in the system of the present embodiment, a large braking force can be generated immediately after a situation in which an emergency braking is required occurs even when a driver is unskilled.

In the case that the BA control Is started by executing an emergency braking operation as mentioned above, it is required to terminate the BA control at a time when the depression of the brake pedal 31 is released. In the system of the present embodiment, the STR 28, $SA_{-1}$ 46, $SA_{-2}$ 48 and $SA_{-3}$ 54 are maintained in the ON-state during the execution of the ABS control as mentioned above. When the STR 28, $SA_{-1}$ 46, $SA_{-2}$ 48 and $SA_{-3}$ 54 are in the ON-state, all the hydraulic chambers in the regulator 27 and the first and second hydraulic chambers 32a, 32b provided in the master cylinder 32 are substantially closed.

Under the above situation, the value of the master cylinder pressure $P_{M/C}$ corresponds to the brake pedaling force $F_p$. Accordingly, the ECU 20 can easily determine whether or not the depression of the brake pedal 31 is released by monitoring the output signal from the master cylinder pressure $P_{M/C}$ detected by the hydraulic pressure sensor 40. When the release of the depression of the brake pedal 31 is detected, the ECU 20 stops the supply of driving signals to the STR 28, $SA_{-1}$ 46, $SA_{-2}$ 48 and $SA_{-3}$ 54 so as to realize the execution state in which the normal control is executed. As mentioned above, in accordance with the system of the present embodiment, the BA control can be securely terminated together with the completion of the braking operation.

After the supply of the accumulator pressures $P_{ACC}$ to the wheel cylinders 44** is started as mentioned above, the slip ratio S of each wheel FL, FR, RL, RR is steeply increased so that the execution condition for the ABS control is established. When the execution condition for the ABS control is established, the ECU 20 may suitably execute the ABS control constituted by combining 1 the above pressure increasing mode, 2 the holding mode and 3 the pressure reducing mode so that the slip ratio S in all of the wheels is converged within a proper range, that is, so that each wheel is not shifted to the lock state.

Here, in the case that the ABS control is executed after the BA control is started, the wheel cylinder pressure $P_{W/C}$ is increased by being supplied the brake fluid from the pump 21 and the accumulator 25 to the wheel cylinders 44, and it is reduced by being flowed the brake fluid in the wheel cylinders 44 into the reservoir tank 23. Acoordingly, a so-called bottoming of the master cylinder 32 can be prevented even if the pressure increasing mode and the pressure reducing mode are repeatedly executed.

Figure 3:
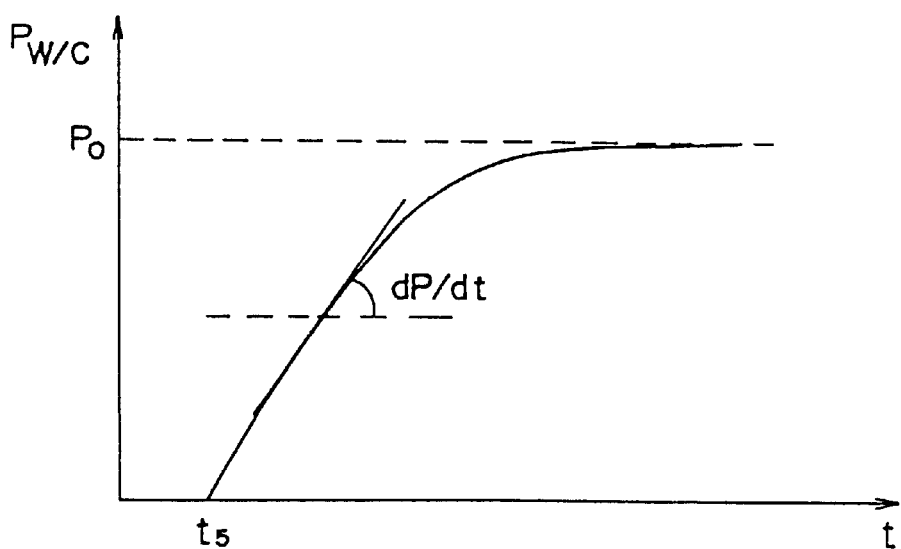
FIG. 3 is a graph showing an increased pressure characteristic realized in the case of connecting a hydraulic pressure source to a wheel cylinder provided in the braking force control apparatus shown in FIG. 1.

Next, a description will be given of an increased pressure slope of the wheel cylinder pressure $P_{W/C}$ realized by an execution of the BA control. FIG. 3 shows an increased pressure curve of a wheel cylinder pressure $P_{W/C}$ realized in the case of communicating the hydraulic pressure source accumulating the pressure $P_0$ with the wheel cylinder 44 at a time $t_5$. As shown in FIG. 3, the wheel cylinder pressure $P_{W/C}$ of the wheel cylinder 44 converges to the pressure $P_0$ while slowing the increasing rate after rapidly increasing after the time $t_5$. At this time, the increased pressure slope dP/dt of the wheel cylinder pressure $P_{W/C}$ in the rapid increasing section becomes greater as the pressure $P_0$ is higher, and becomes greater as the hydraulic pressure accumulating amount in the hydraulic pressure source is higher, that is, as the hydraulic pressure supply capacity of the hydraulic pressure source is higher.

Figure 4:
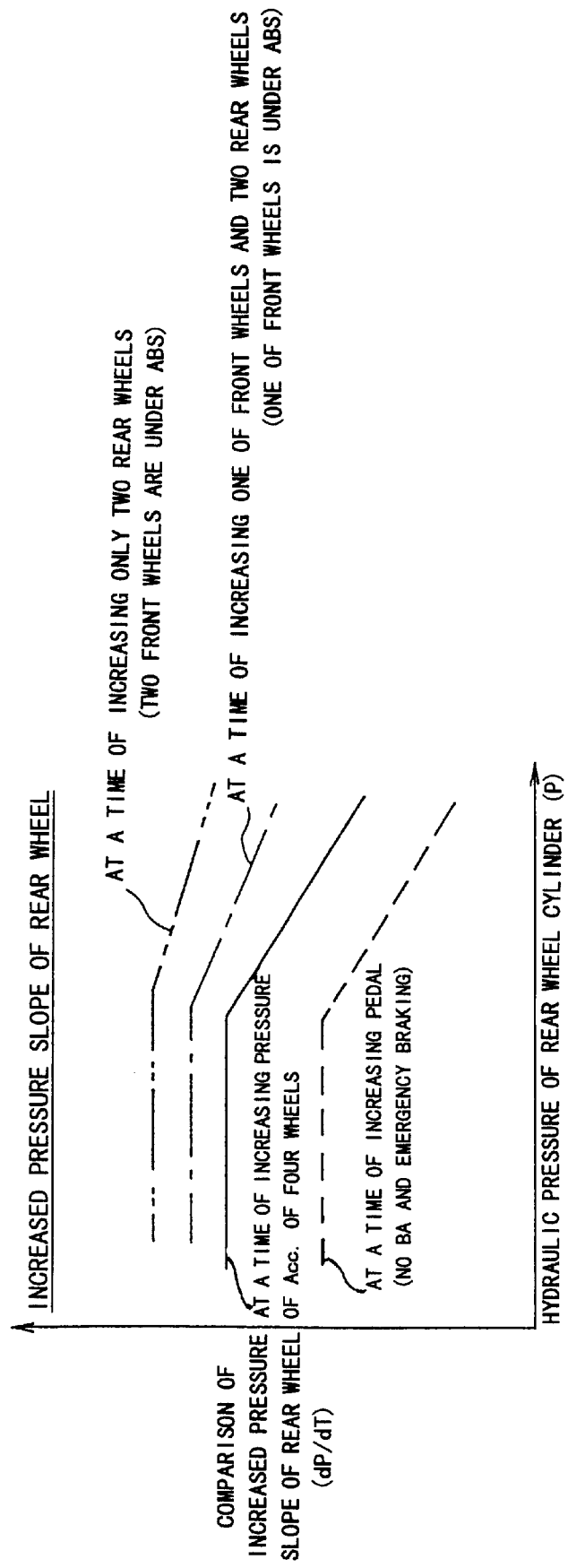
FIG. 4 is a graph showing an increased pressure slope which a wheel cylinder in a rear wheel provided in the braking force control apparatus shown in FIG. 1 shows under various kinds of conditions.

FIG. 4 shows an increased pressure slope dB/dt of the wheel cylinder pressure $P_{W/C}$ realized in the wheel cylinders 44RL and 44RR of the rear left and right wheels RL and RR. A polygonal line shown by a broken line in FIG. 4 expresses an increased pressure slope dB/dt realized when the rapid braking operation is executed at a time of the normal control. Further, a polygonal line shown by a solid line in FIG. 4, a polygonal line shown by a single-dot chain line and a polygonal line shown by a two-dot chain line express an increased pressure slope dB/dt realized in the case that the BA control is started under a situation in which the ABS control has been executed with respect to none of the wheel cylinders 44**, an increased pressure slope dB/dt realized in the case that the BA control is started under a situation in which the ABS control is being executed with respect to one of the front wheels and an increased pressure slope db/dt realized in the case that the BA control is started under a situation in which the ABS control is being executed with respect to two front wheels.

Here, among the polygonal lines shown in FIG. 4, a region in which a slope is substantially "0" corresponds to a region in which the wheel cylinder pressure $P_{W/C}$ is rapidly increased after the increase of the wheel cylinder pressure $P_{W/C}$ is started. Further, among the polygonal lines shown in FIG. 4, a region having a negative slope shows a region in which the wheel cylinder pressure $P_{W/C}$ is going to converge closer to the hydraulic pressure of the hydraulic pressure source.

As shown in FIG. 4, the wheel cylinder pressure $P_{W/C}$ of the rear wheel shows a greater increased pressure slope dB/dt at time of the BA control than at a time of the normal control. Further, at a time of the BA control, prior to a start of the BA control, a greater increased pressure slope dB/dt is shown in the case that the ABS control is started with respect to one of the front wheels than in the case that the ABS control is executed with respect to none of the wheel cylinders 44**. Further, prior to the start of the BA control, a greater increased pressure slope dB/dt is shown in the case that the ABS control is executed with respect to the two front wheels than in the case that the ABS control is executed with respect to one of the front wheels.

As mentioned above, the wheel cylinder 44** as a subject of a control for the ABS control is substantially maintained in a state of being separated from the hydraulic pressure source. Accordingly, in the case that the ABS control has been started with respect to one of the front wheels at a time when the BA control is started, the accumulator pressure $P_{ACC}$ does not reach the wheel cylinder of the wheel after the BA control is started. In this case, the brake fluid flowing out from the accumulator 25 after the BA control is started is supplied only to the wheel cylinders 44RL and 44RR of the rear left and right wheels RL and RR and the wheel cylinder 44FL or 44FR of one of the front wheels. Hereinafter, this case will be referred to as a three-wheels pressure increasing case.

In addition, in the case that the ABS control has been started with respect to the two front wheels at a time when the BA control is started, the accumulator pressure $P_{ACC}$ does not reach the wheel cylinders of the two front wheels. In this case, the brake fluid flowing out from the accumulator 25 after the BA control is started is supplied only to the wheel cylinders 44RL and 44RR of the rear left and right wheels RL and RR. Hereinafter, this case will be referred to as a two-wheels pressure increasing case.

A brake fluid sufficient for rapidly increasing the wheel cylinders 44 of the four wheels after the BA control is started is accumulated in the accumulator 25. Accordingly, in the three-wheels pressure increasing case, a steeper pressure increase occurs in the wheel cylinders 44 in the rear left and right wheels RL and RR in comparison with the case that the brake fluid can flow into all of the wheel cylinders 44 (hereinafter, this case will be referred to as a four-wheels pressure increase case). Similarly, in the two-wheels pressure increasing case, a much steeper pressure increase occurs in the wheel cylinders 44 in the rear left and right wheels RL and RR the supply of the brake fluid than that in the three-wheels pressure increasing case.

Figure 5:
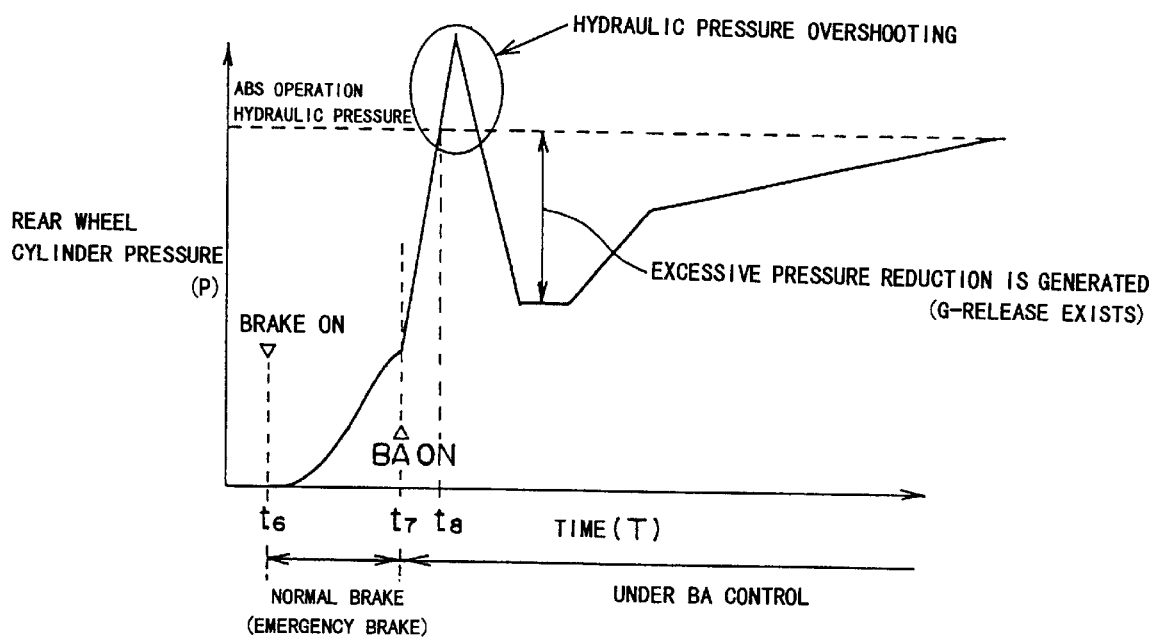
FIG. 5 is a graph for explaining an overshoot of the wheel cylinder pressure realized in the braking force control apparatus shown in FIG. 1.

FIG. 5 shows a change of a wheel cylinder pressure $P_{W/C}$ realized by an execution of the two-wheels pressure increase or the three-wheels pressure increase in the wheel cylinder 44RL of the rear wheel (in the same manner with respect to the 44RR). A change of the wheel cylinder pressure $P_{W/C}$ shown in FIG. 5 is realized in the case that the braking operation is started at a time $t_6$, the BA control in accordance with the two-wheels pressure increase or the three-wheels pressure increase is started at a time $t_7$, and it is determined that an execution condition for the ABS control is established with respect to the wheel cylinder 44RL at a time $t_8$.

As mentioned above, in the case that the two-wheels pressure increase or the three-wheels pressure increase is executed by the BA control, a steeper increase of the wheel cylinder pressure $P_{W/C}$ is generated in the wheel cylinder 44RL than that in the case that the four-wheels pressure increase is executed. Accordingly, in such a case, a phenomenon that the wheel cylinder pressure $P_{W/C}$ is largely over the ABS braking hydraulic pressure after it is determined that the execution condition for the ABS control is established at the time $t_8$, that is, an overshoot of the wheel cylinder pressure $P_{W/C}$ is generated.

As mentioned above, in the case that the steep increase of the slip ratio is caused when the execution condition for the ABS control is established, the ECU 10 sets a first pressure reducing time to a relatively long time. Accordingly, when the overshoot of the wheel cylinder pressure $P_{W/C}$ as shown in FIG. 5 is generated, the ECU 20 executes a pressure reducing mode for a relatively long time immediately after the ABS control is started.

When the pressure reducing mode is maintained for a long time in the manner mentioned above, there may be a case that the wheel cylinder pressure $P_{W/C}$ of the wheel cylinder 44RL is reduced to an excessively small pressure, so that the braking force generated by the rear wheel RL becomes an improperly small value. As mentioned above, in the system shown in FIG. 1, in tha case that the ABS control has been already started in one of the front wheels or the two front wheels at a time when the BA control is started, there may be a case that a phenomenon that the braking force generated in the rear wheels RL and RR is temporarily excessively small (hereinafter, this phenomenon is referred to as a G-releasing phenomenon) after the ABS control is started with respect to the rear wheels RL and RR subsequent to the BA control is generated.

The braking force control apparatus of the present embodiment is characterized by preventing the G-releasing phenomenon from generating at a time when the BS control is started. The G-releasing phenomenon mentioned above can be also generated in the case that the ABS control is being executed with respect to the rear wheels RL and RR at a time when the BA control is started. That is, in the case that the ABS control has been executed with respect to one of the rear wheels or two rear wheels prior to a start of the BA control, an overshoot of the wheel cylinder pressure $P_{W/C}$ is generated in the wheel cylinders 44FL and 44FR of the front wheels FL and FR at the same time when the BA control is started. As mentioned above, the wheel cylinder pressure $P_{W/C}$ of the front wheels FL and FR indicates the overshoot, the wheel cylinder pressure $P_{W/C}$ of the front wheels FL and FR is largely reduced by the ABS control thereafter started.

However, a capacity greater than that of the wheel cylinders 44RL and 44RR of the rear wheels RL and RR is given to the wheel cylinders 44FL and 44FR of the front wheels FL and FR. Accordingly, even if the ABS control of the rear wheels RL and RR has been executed prior to the BA control, the wheel cylinder pressure $P_{W/C}$ of the front wheels FL and FR do not overshoot too greatly after the BA control is started. In the case that an overshooting amount of the wheel cylinder pressure $P_{W/C}$ is not too great, the wheel cylinder pressure $P_{W/C}$ of the front wheels FL and FR is not improperly reduced by the ABS control which is started thereafter, that is, a great G-releasing is not generated. Accordingly, in accordance with the present embodiment, a processing for preventing the G-releasing is executed only in the case that the ABS control has been started with respect to the front wheels FL and FR prior to an execution of the BA control.

Figure 6:
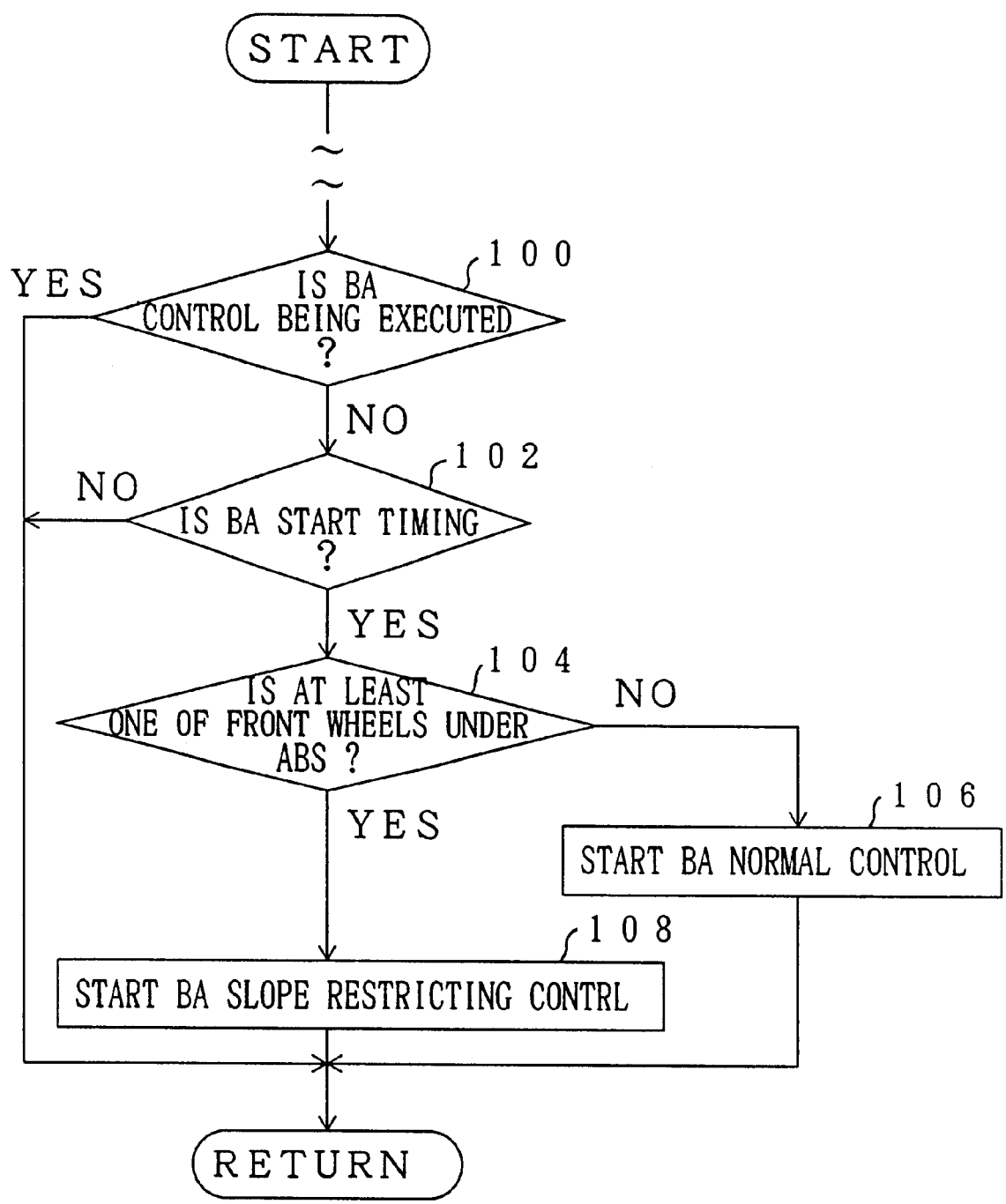
FIG. 6 is a flow chart of a control routine executed in the braking force control apparatus in accordance with the first embodiment of the present invention.

FIG. 6 shows a flow chart of a control routine executed by the ECU 20 for realizing the function mentioned above. The routine shown in FIG. 6 is a fixed interrupt routine which is activated every predetermined time. When the present routine is started, a processing in step 100 is executed.

In step 100, it is determined whether or not the BA control is being executed. When the STR 28 is in the ON-state, the ECU 20 determines that the BA control is being executed. The present routine is a routine for preventing the overshoot from generating in the wheel cylinder pressure $P_{W/C}$ of the rear wheels RL and RR at a time of the start of the BA control. Accordingly, in the case that the BA control has been already started, there is no advantage for advancing the processing of the present routine. Therefore, in the case that the determination mentioned above is made, the current routine is terminated without any further processings. On the other hand, in the case that it is determined that the BA control is not being executed in the present step, that is, the STR 28 is in the OFF-state, a processing in step 102 is then executed.

In step 102, it is determined whether or not the start timing for the BA control has come. As a result, in the case that it is determined that the start timing for the BA control has not come yet, the current routine is terminated without any further processings. On the other hand, in the case that it is determined that the start timing for the BA control has come, a processing in step 104 is then executed.

In step 104, it is determined whether or not the ABS control is executed with respect to at least one of two front wheels. In particular, it is determined whether or not at least one of the $SA_{-1}$ 46 and the $SA_{-2}$ 48 is turned on. In the case that the condition mentioned above is not established, it is possible to determine that an improperly rapid pressure increase is not generated in the wheel cylinder pressure $P_{W/C}$ of the rear wheels RL and RR even when the BA control is started. In this case, the current routine is terminated after the normal BA control is next started in step 106.

On the other hand, in step 104 mentioned above, in the case that it is determined that the ABS control is executed with respect to at least one wheel of the two front wheels, it can be determined that a possibility that the wheel cylinder pressure $P_{W/C}$ of the rear wheels RL and RR is rapidly increased so as to improperly overshoot after the BA control is started. Accordingly, in the case that the determination mentioned above is made. a processing in step 108 is then executed for preventing an overshoot of the wheel cylinder pressure $P_{W/C}$ in the rear wheels RL and RR.

In step 108, a BA slope restricting control is started. The BA slope restricting control can be realized by turning on and off the SRRH 60 and SRLH 70 communicated with the wheel cylinder 44RL and RR of the rear wheels RL and RR at a predetermined period in addition to a processing to be executed for realizing the normal BA control. The processing for realizing the normal BA control is executed, the wheel cylinders 44RL and 44RR of the rear wheels RL and RR and the accumulator 25 are in the conductive state. Under the situation mentioned above, when the SRRH 60 and the SRLH 70 are periodically turned on and off, the accumulator 25 and the wheel cylinders 44RL and 44RR are intermittently in the shut-off state so that an amount of the brake fluid flowing into the wheel cylinders 44RL and 44RR is restricted. Accordingly, in accordance with the BA slope dB/dt restricting control, an improperly rapid increase of the wheel cylinder pressure $P_{W/C}$ of the rear wheels RL and RR can be prevented. When the processing in step 108 is terminated, the current routine is terminated.

Figure 7:
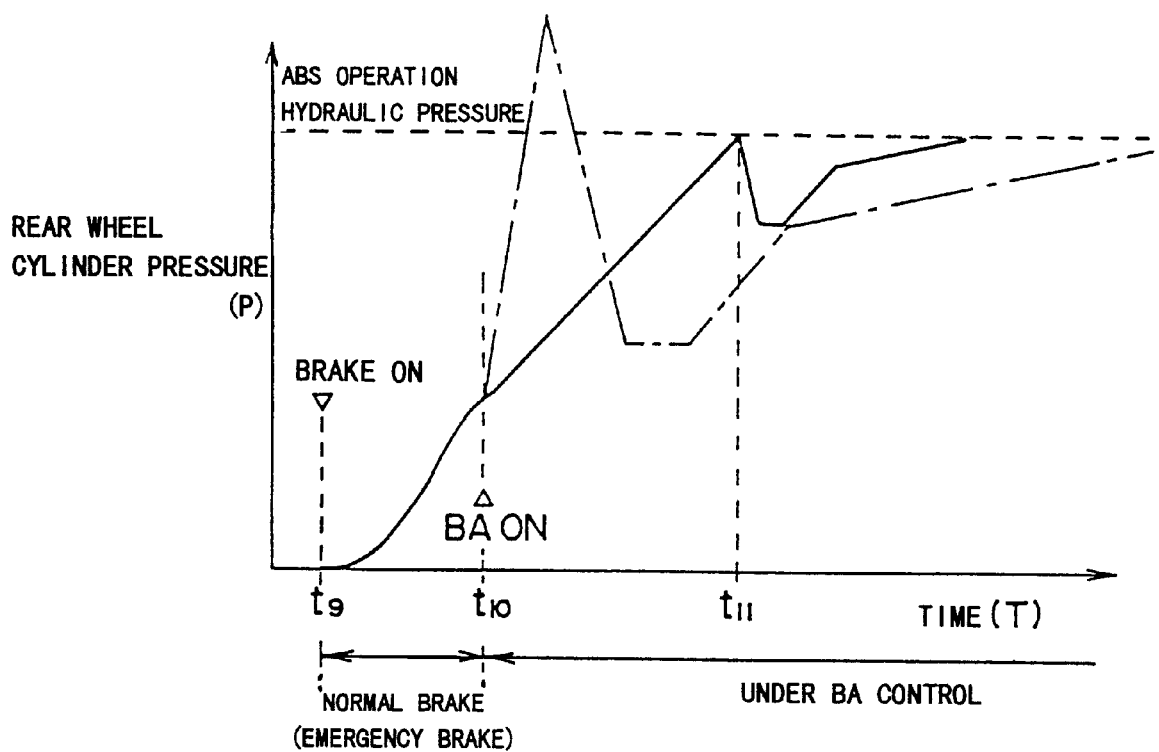
FIG. 7 is a graph showing a change of the wheel cylinder pressure realized at a time when the control routine shown in FIG. 6 is executed in the braking force control apparatus in accordance with the first embodiment of the present invention.

FIG. 7 shows a change of a wheel cylinder pressure $P_{W/C}$ realized in the wheel cylinder 44RL of the rear wheel (in the same manner with respect to the 44RR) by an execution of the processing mentioned above. The change of the wheel cylinder pressure $P_{W/C}$ shown by a single-dot chain line in FIG. 7 shows a change of a wheel cylinder pressure $P_{W/C}$ realized in the case that the BA slope restricting control is not executed in the same manner as a characteristic view shown in FIG. 5 mentioned above.

The change shown by a solid line in FIG. 7 can be realized in the case that the braking operation is started at a time $t_9$, the BA slope restricting control is started at $t_{10}$ after the ABS control is started with respect to at least one of the front wheels, and it is determined that the execution condition for the ABS control is established with respect to the wheel cylinder 44RL at a time $t_{11}$.

As mentioned above, in accordance with the BA slope restricting control, even if the ABS control has been started with respect to one or two of the front wheels at a time when the execution condition for the BA control is established, it is possible to gradually increase the wheel cylinder pressure $P_{W/C}$ of the rear wheels RL and RR. Accordingly, in the case that the BA slope restricting control is executed, an overshoot greatly more than the ABS operation hydraulic pressure is not generated in the wheel cylinder pressure $P_{W/C}$ of the rear wheels RL and RR. Further, when the overshoot is not generated in the wheel cylinder pressure $P_{W/C}$ the wheel cylinder pressure $P_{W/C}$ is not excessively reduced after the ABS control Is started with respect to the rear wheels RL and RR. Thus, in accordance with the braking force control apparatus of the present embodiment, in the case that the execution condition for the BA control is established after the ABS control is started with respect to one or two of the front wheels, it is possible to prevent the G-releasing from generating. Therefore, in accordance with the braking force control apparatus of the present embodiment, it is possible to always maintain a preferable controllability.

Then, in the embodiment mentioned above, the braking force control executed prior to the start of the BA control is limited to the ABS control, however, the present invention is not limited to this. That is, the present invention can be applied to the case in which the other braking hydraulic pressure reducing control for controlling the wheel cylinder pressure $P_{W/C}$ in a state of shutting off the hydraulic pressure inlet passage of the wheel cylinder is used in place of the ABS control.

Further, in the embodiment mentioned above, it is structured such that the BA slope restricting control is executed "with respect to the rear wheels RL and RR" in the case that the ABS control is executed "with respect to the front wheels FL and FR", however, the present invention is not limited to this. That is, the structure can be made such that the BA slope restricting control is executed with respect to the other wheel cylinders in the case that the braking hydraulic pressure reducing control such as the ABS control is executed with respect to any one of the wheel cylinders.

Here, in the embodiment mentioned above, the pressure adjusting hydraulic pressure passages 56 and 62 and the ABS control respectively correspond to "a hydraulic pressure inlet passage" and "a braking hydraulic pressure reducing control", and the conduction detecting means is realized by the execution of the processing in step 104 mentioned above by the ECU 20 and the hydraulic pressure inlet restricting means is realized by the execution of the processing in step 108 mentioned above by the ECU 20, respectively.

Next, a description will be given of a second embodiment in accordance with the present invention with reference to FIGS. 8 and 9. The braking force control apparatus of the present embodiment can be realized by executing a routine shown in FIG. 8 in place of the routine shown in FIG. 6 by the ECU 20 in the system shown in FIG. 1 mentioned above.

The braking force control apparatus in accordance with the first embodiment mentioned above restricts the overshoot of the wheel cylinder pressure $P_{W/C}$ by reducing an increasing rate of the wheel cylinder pressure $P_{W/C}$ caused by the start of the BA control in the case that the ABS control is executed with respect to at least one of the front wheels prior to an establishment of the execution condition for the BA control. However, the BA control is a control executed for the purpose of quickly raising the wheel cylinder pressure $P_{W/C}$ when an operation for requiring the emergency braking is executed. In this point, the method used in the first embodiment mentioned above is contrary to the primary purpose of the BA control.

The present embodiment is characterized by preventing the wheel cylinder pressure $P_{W/C}$ from overshooting without reducing the increasing rate of the wheel cylinder pressure $P_{W/C}$ caused by the start of the BA control in the case that the ABS control has been started with respect to at least one of the front wheels prior to an establishment of the execution condition for the BA control.

Figure 8:
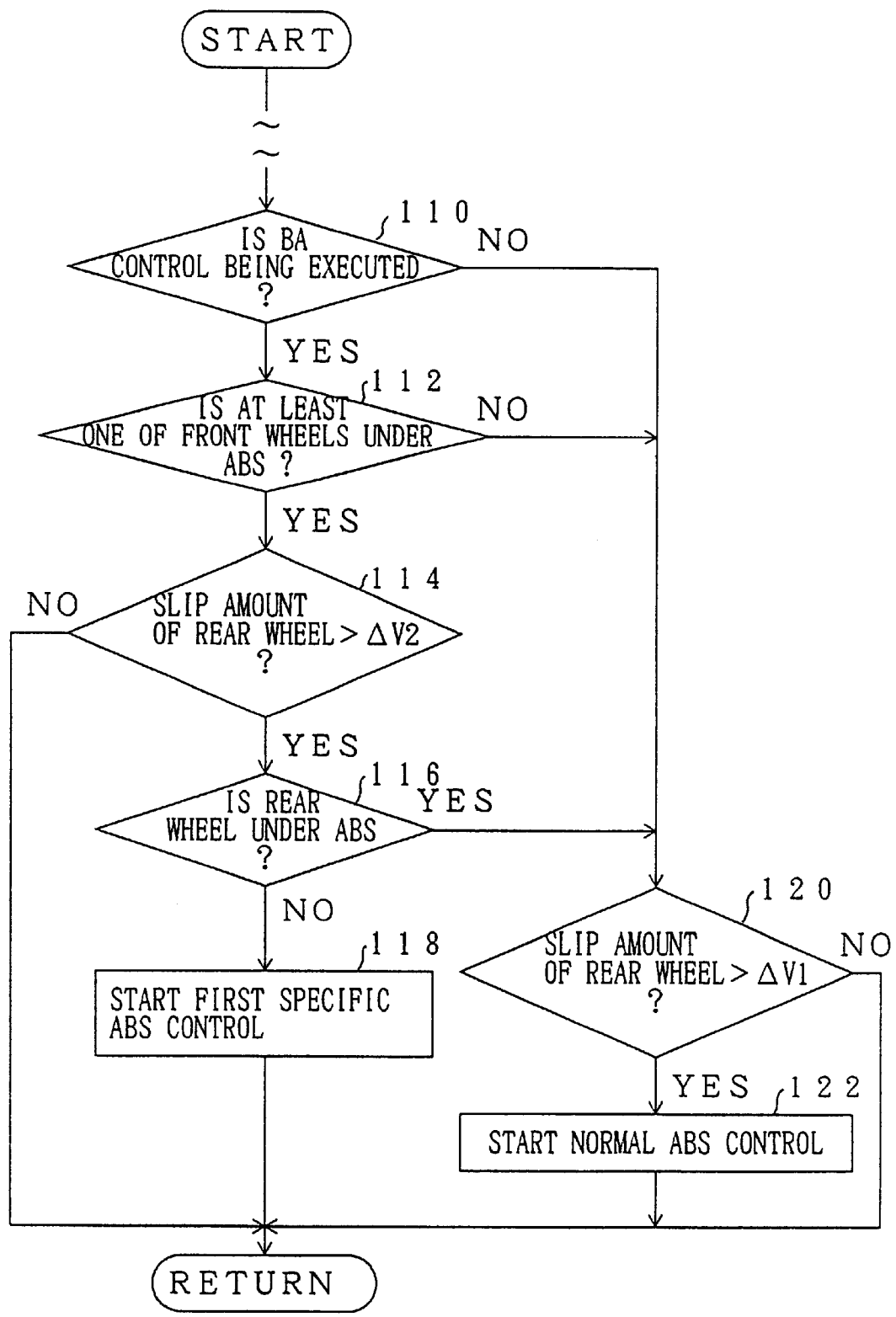
FIG. 8 is a flow chart of a control routine executed in the braking force control apparatus in accordance with the second embodiment of the present invention.

FIG. 8 shows a flow chart of an embodiment of a routine executed by the ECU 20 for realizing the function mentioned above. The present routine is a routine executed for determining a timing of starting the ABS control with respect to the rear wheels RL and RR. The present routine is a fixed interrupt routine which is activated every predetermined time. When the routine is started, a processing in step 110 is executed.

In step 110, It is determined whether or not the BA control is being executed. In particular, it is determined whether or not the STR 28 is the On-state. As a result, in the case that it is determined that the STR 28 is in the OFF-state, it is determined that the BA control is not executed. In this case, a processing in step 120 is then executed.

In step 120, it is determined whether or not a slip amount of the rear wheels RL and RR is greater than a predetermined value $\Delta V_1$. The $\Delta V_1$ is a slip amount immediately before the wheels become in a lock state. As a result of the determination mentioned above, in the case that it Is determined that the slip amount of the rear wheels RL and RR is more than $\Delta V_1$, it is determined that the ABS control should be started with respect to the rear wheels RL and RR. In this case, a processing in step 122 is then executed. On the other hand, in the case that it is determined that the slip amount of the rear wheels RL and RR is equal to or less than $\Delta V_1$ in step 120, it is determined that it is not necessary to start the ABS control, and the current processing is terminated accordingly.

In step 122, a processing for starting the normal ABS control is executed. When the processing in step 122 is executed, thereafter, the ABS control mentioned above, that is, a processing of repeating $\hat{2}$ the pressure reducing mode→$\hat{3}$ the holding mode→$\hat{1}$ the pressure increasing mode→$\hat{4}$ the pressure gradual increasing mode is started. When the processing in step 122 is terminated, the current routine is terminated.

In step 110 mentioned above, in the case that it is determined that the BA control is being executed, that is, the STR 28 is in the ON-state, a processing in step 112 is then executed. In step 112, it is determined whether or not the ABS control is executed with respect to at least one of the two front wheels, that is, at least one of the $SA_{-1}$ 46 and the $SA_{-2}$ 48 is turned on. As a result, in the case that the condition mentioned above is not established, it is possible to determine that a rapid pressure increase different from that at the normal time is not generated in the wheel cylinder pressure $P_{W/C}$ of the rear wheels RL and RR together with an execution of the BA control. In this case, a processing in step 120 is then executed for determining an execution of the ABS control in the normal condition.

On the other hand, in step 112 mentioned above, in the case that it is determined that the ABS control is executed with respect to at least one of the two front wheels, it can be determined that a steeper pressure increase than that in the normal time is generated in the wheel cylinder pressure $P_{W/C}$ of the rear wheels RL and RR together with an execution of the BA control.

In step 114, it is determined whether or not a slip amount of the rear wheels RL and RR is greater than a predetermined value $\Delta V_2$. The $\Delta V_2$ is a value smaller than the threshold value $\Delta V_1$ used in step 120 mentioned above, that is, a value smaller than the slip amount at which the wheels are shifted to the lock state. As a result of the determination mentioned above, in the case that it is determined that the slip amount of the rear wheels RR and RL is equal or less than $\Delta V_2$, it can be determined that the wheel cylinder pressure $P_{W/C}$ of the rear wheels RL and RR is sufficiently smaller than the ABS operation hydraulic pressure. In this case, the current routine is terminated without any further processings thereafter.

On the other hand, in the case that it is determined that the slip amount of the rear wheels RL and RR is more than $\Delta V_2$ in step 114 mentioned above, it can be determined that the wheel cylinder pressure $P_{W/C}$ of the rear wheels RL and RR is increased in the vicinity of the ABS operation hydraulic pressure. In this case, a processing in step 116 is then executed.

In step 116, it is determined whether or not the ABS control has been already started with respect to the rear wheels RL and RR. In the case that it is determined that the ABS control with respect to the rear wheels RL and RR has not been yet started, it can be determined that a pressure increasing characteristic of the wheel cylinder pressure $P_{W/C}$ in the rear wheels RL and RR depends on the BA control, that is, the wheel cylinder pressure $P_{W/C}$ is steeply increased. In this case, a processing in step 118 is then executed.

On the other hand, in the case that it is determined in step 116 mentioned above that the ABS control with respect to the rear wheels RL and RR has been already started, it can be determined that the pressure increase characteristic of the wheel cylinder pressure $P_{W/C}$ of the rear wheels RL and RR depends on the ABS control, that is, the wheel cylinder pressure $P_{W/C}$ is not rapidly increased. In this case, thereafter, in order to continue the normal ABS control, the processing in step 120 is then executed.

In step 118, a processing for starting a first specific ABS control is executed. The first specific ABS control is a control for setting the execution time of the pressure reducing mode $\hat{2}$ executed immediately after the ABS control is started longer than the execution time of the pressure reducing mode $\hat{2}$ executed during the normal ABS control. In accordance with the first specific ABS control, it Is possible to greatly reduce the wheel cylinder pressure $P_{W/C}$ of the rear wheel RL and RR in comparison with the normal ABS control. When the processing in step 118 is terminated, the current routine is terminated.

In accordance with the processing mentioned above, even in the case that the ABS control is started with respect to at least one of the front wheels prior to the start of the BA control, it is possible to rapidly increase the wheel cylinder pressure $P_{W/C}$ of the rear wheels RL and RR until the slip amount of the rear wheels RL and RR becomes more than $\Delta V_2$ after the BA control is started. Further, when the rapidly increased wheel cylinder pressure $P_{W/C}$ is increased in the vicinity of the ABS operation hydraulic pressure, it is possible to start the reduction of the wheel cylinder pressure $P_{W/C}$ of the rear wheels RL and RR by the first specific ABS control. Further, in accordance with the first specific ABS control, since 2̂ the pressure reducing mode is maintained for a long time, it is possible to properly reduced the rapidly increased wheel cylinder pressure $P_{W/C}$ Thus, in accordance with the braking force control apparatus of the present embodiment, it is possible to securely prevent the wheel cylinder pressure $P_{W/C}$ of the rear wheels RL and RR from overshooting after the BA control is started.

Figure 9:
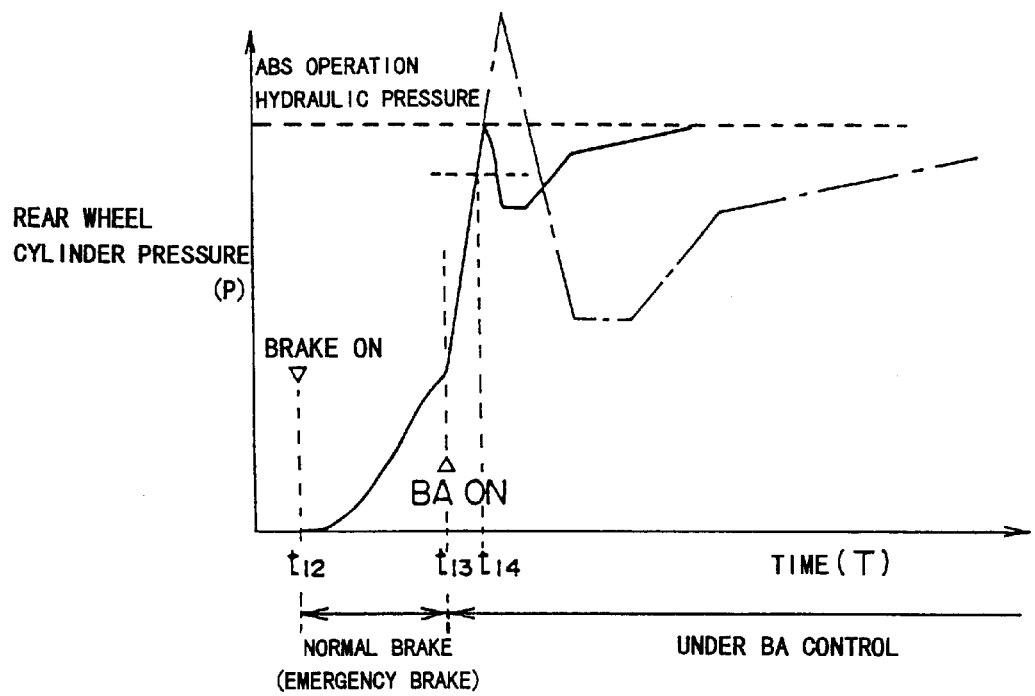
FIG. 9 is a graph showing a change of the wheel cylinder pressure realized at a time when the control routine shown in FIG. 8 is executed in the braking force control apparatus in accordance with the second embodiment of the present invention.

FIG. 9 shows a change of the wheel cylinder pressure $P_{W/C}$ realized in the wheel cylinder 44RL of the rear wheels (in the same manner with respect to 44RR) by an execution of the processing mentioned above. A change of the wheel cylinder pressure $P_{W/C}$ shown by a single-dot chain line in FIG. 9 shows a change of a wheel cylinder pressure $P_{W/C}$ realized in the case that the normal ABS control is started after the normal BA control is started in the same manner as the characteristic diagram shown in FIG. 5.

The change shown by a solid line in FIG. 9 can be realized in the case that the braking operation is started at a time $t_{12}$, the BA control is started at $t_{13}$ after the ABS control Is started with respect to at least one of the front wheels, and it is determined that the execution condition for the first specific ABS control is established with respect to the wheel cylinder 44RL at a time $t_{14}$ that is, the slip amount of the rear wheel RL is more than $\Delta V_2$.

When the BA control is started in a state in which the ABS control is started with respect to at least one of the front wheels, thereafter, the wheel cylinder pressure $P_{W/C}$ of the rear wheel RL is steeply increased. On the other hand, in accordance with the first specific ABS control, it is possible to reduce the wheel cylinder pressure $P_{W/C}$ of the wheel cylinder 44RL early and greatly in comparison with the case of the normal ABS control. Accordingly, in the braking force control apparatus of the present embodiment, the overshoot greatly more than the ABS operation hydraulic pressure is not generated in the wheel cylinder pressure $P_{W/C}$ of the rear wheels RL and RR. Thus, in accordance with the braking force control apparatus of the present embodiment, in the case that the execution condition for the BA control is established after the ABS control is started with respect to one or two of the front wheels, an excellent controllability can be maintained.

Then, in the embodiment mentioned above, the braking force control executed prior to the start of the BA control is limited to the ABS control, however, the present invention is not limited to this. That is, the present invention can be applied to the case in which the other braking hydraulic pressure control for at first reducing the wheel cylinder pressure $P_{W/C}$ in a state in which the hydraulic pressure inlet passage of the wheel cylinder is shut off and then executing a desired hydraulic pressure control is used in place of the ABS control.

Further, in the embodiment mentioned above, it is structured such that the first specific ABS control is executed "with respect to the rear wheels RL and RR" in the case that the ABS control is executed "with respect to the front wheels FL and FR", however, the present invention is not limited to this. That is, it is possible to apply to the case that the first specific ABS control is executed with respect to the other wheel cylinders in the case that the braking hydraulic pressure control such as the ABS control is executed with respect to any one of the wheel cylinders.

Here, in the embodiment mentioned above, the slip amount of the wheel corresponds to "a characteristic value with respect to a slip state of the wheel", the pressure adjusting hydraulic pressure passages 56 and 62 correspond to "a hydraulic pressure inlet passage", the ABS control corresponds to "a braking hydraulic pressure control" and the control for realizing the pressure reducing mode for the first time during the ABS control corresponds to "a pressure reducing control", respectively, and "the conduction detecting means" is realized by the execution of the processing in step 112 mentioned above by the ECU 20 and "the threshold changing means" and the "the pressure reducing tendency changing means" are realized by the execution of the processing in step 118 mentioned above by the ECU 20, respectively.

Next, a description will be given of a third embodiment in accordance with the present invention with reference to FIGS. 10 and 11. The braking force control apparatus of the present embodiment can be realized by executing a control routine shown in FIG. 11 in addition to the routine shown in FIG. 6 or 8, or in place of the routine shown in FIG. 6 or 8 by the ECU 20 in the system shown in FIG. 1 mentioned above.

The increased pressure slope of the wheel cylinder pressure $P_{W/C}$ together with an execution of the ABS control is determined by a differential pressure between a hydraulic pressure of the hydraulic pressure source supplying a hydraulic pressure to the wheel cylinders 44 (that is, a regulator pressure $P_{RE}$ or an accumulator pressure $P_{ACC}$) and the wheel cylinder pressure $P_{W/C}$ an effective diameter of the hydraulic pressure passage or the solenoid valve, the valve opening time of the holding solenoids SH and the like. In the system in which the BA control is not executed, there is no case that the characteristics of the hydraulic pressure source or the hydraulic pressure passage change. In the system mentioned above, the contents of the ABS control is tuned on the assumption that the characteristics thereof are fixed.

However, in the system in which the BA control is executed, the hydraulic pressure source or the hydraulic pressure passage is changed in accordance with an execution of the BA control. Accordingly, in the system mentioned above, different increased pressure slopes are respectively given to the wheel cylinder pressure $P_{W/C}$ in the case that the ABS control is executed alone and the case that the ABS control is executed together with the BA control. When the increased pressure slope of the wheel cylinder pressure $P_{W/C}$ together with the ABS control changes, a change is generated in the control characteristic for the ABS control, so that the same braking characteristic can not be always obtained.

In the system in which the BA control is executed, when the contents of the ABS control is switched in accordance that whether or not the BA control is executed, it is possible to obtain the same increased pressure slope during an execution of the ABS control regardless to whether or not the BA control is being executed. The braking force control apparatus of the present embodiment is characterized in that the function mentioned above is realized by changing the setting condition for the ABS control.

Figure 10:
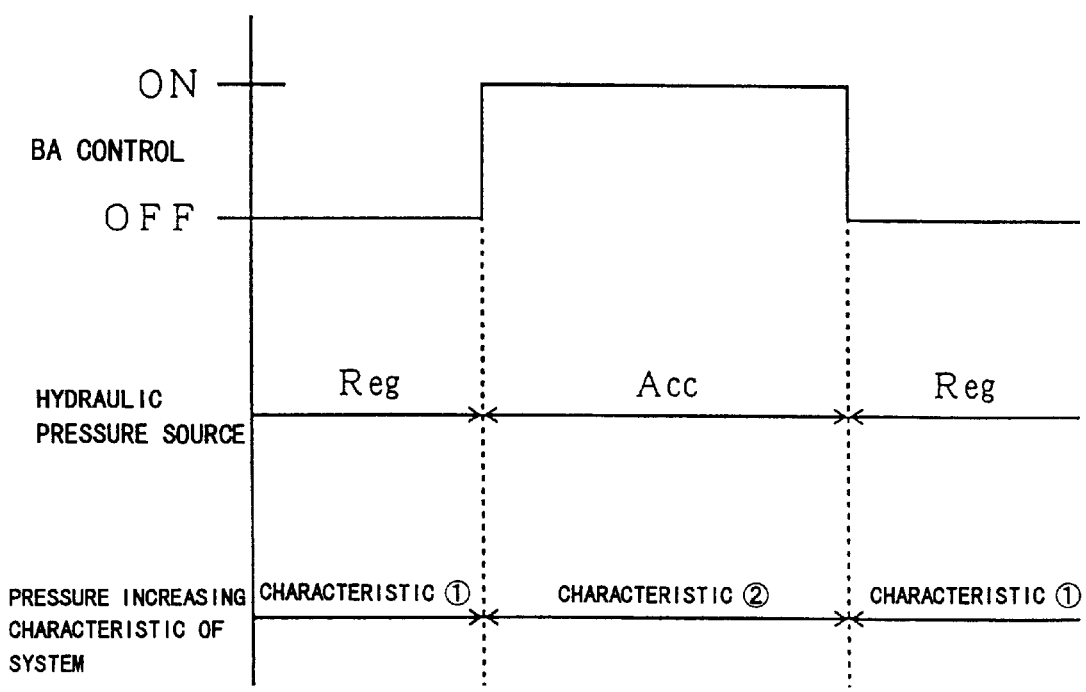
FIG. 10 is a diagram showing a change of a hydraulic pressure source and an increased pressure characteristic caused by an execution and a stop of the BA control.

FIG. 10 shows a change of the hydraulic pressure source and the pressure increase characteristic in accordance with an execution and stop of the BA control in the system shown in FIG. 1. As shown in FIG. 10, while the BA control is not executed in the system of the present embodiment, the regulator 27 serves as a hydraulic pressure source at a time of the ABS control. At this time, in the system of the present embodiment, the hydraulic pressure discharging capacity of the regulator 27, the characteristic of the passage connecting the regulator 27 and the third hydraulic pressure passage 42 and the pressure increasing characteristic in accordance with the characteristic in the downstream of the third hydraulic pressure passage 42 (hereinafter, the pressure increase characteristic is referred to as a characteristic $\hat{1}$ can be realized.

Further, as shown in FIG. 10, while the BA control is executed in the system of the present embodiment, the accumulator 25 serves as a hydraulic pressure source at a time of the ABS control. At this time, in the system of the present embodiment, the hydraulic pressure discharging capacity of the pump 21 and the accumulator 25, the characteristic of the passage from the accumulator 25 to the third hydraulic pressure passage 42 and the pressure increase characteristic in accordance with the characteristic in the downstream of the third hydraulic pressure passage 42 (hereinafter, the pressure increase characteristic is referred to as a characteristic $\hat{2}$ can be realized.

Figure 11:
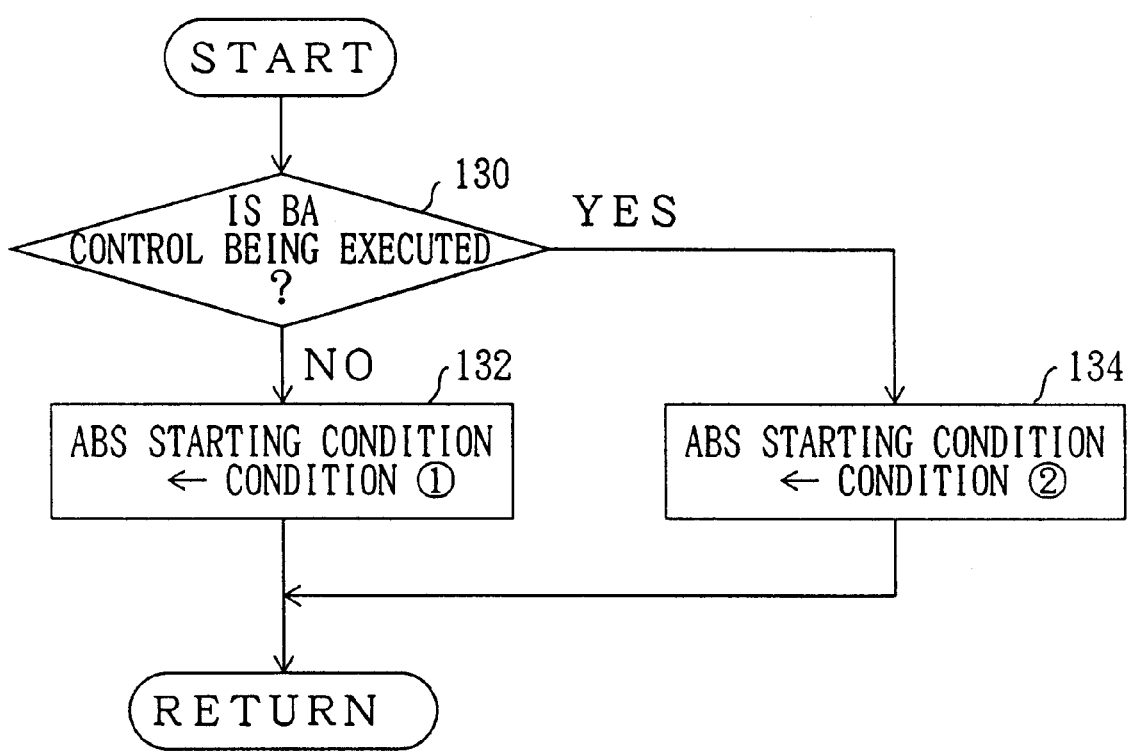
FIG. 11 is a flow chart of a control routine executed in the braking force control apparatus in accordance with the third embodiment of the present invention.

FIG. 11 shows a flow chart of an embodiment of a control routine executed by the ECU 20 so as to make the characteristic $\hat{1}$ and $\hat{2}$ the same. The present routine is a fixed interrupt routine which is activated every predetermined time. When the present routine is activated, a processing in step 130 is at first executed.

In step 130, it is determined whether or not the BA control is being executed. In step 130, the determination mentioned above is made on the basis of the state of the STR 28. In particular, it is determined that the BA control is not executed in the case that the STR 28 is in the OFF-state, and that the BA control is executed in the case that the STR 28 is in the ON-state. In the case that it is determined that the BA control is not executed, a processing in step 132 is then executed. On the other hand, in the case that it is determined that the BA control is executed, a processing in step 134 is then executed.

In step 132, a processing setting a driving condition for the ABS control as a condition $\hat{1}$ is executed. The condition $\hat{1}$ is a condition for setting the characteristic $\hat{1}$ to a desired increased pressure slope in the case that the regulator 27 is communicated with the third hydraulic pressure passage 42 via the control hydraulic pressure passage 30 and the STR 28. When the processing in step 132 is terminated, the current routine is terminated. When the processing in step 132 mentioned above is executed, thereafter, the ABS control is executed in accordance with the condition $\hat{1}$.

In step 134, a processing setting a driving condition for the ABS control as a condition $\hat{2}$ is executed. The condition $\hat{2}$ is a condition for setting the characteristic $\hat{2}$ to a desired increased pressure slope in the case that the accumulator 25 is communicated with the third hydraulic pressure passage 42 via the high pressure passage 26 and the STR 28. When the processing in step 134 is terminated, the current routine is terminated. When the processing in step 134 mentioned above is executed, thereafter, the ABS control is executed in accordance with the condition $\hat{2}$.

In accordance with the processing mentioned above, it is possible to always increase the wheel cylinder pressure $P_{W/C}$ in accordance with the same desired pressure increase characteristic together with an execution of the ABS control regardless of whether or not the BA control is being executed. Therefore, in accordance with the braking force control apparatus of the present embodiment, it is possible to avoid a disadvantage that the controllability of the ABS control is deteriorated together with an execution of the BA control.

In the present embodiment, it is structured such that the driving pattern of the holding solenoids SH is determined in accordance with the conditions $\hat{1}$ and $\hat{2}$. In more particular, two kinds of maps for determining the driving pattern of the holding solenoids SH are prepared, and it is determined which map is used in the conditions $\hat{1}$ and $\hat{2}$. A method for switching the driving pattern of the holding solenoids S**H is not limited to this, and it may be structured such that the driving pattern is switched in accordance with that whether or not a correction is applied to a standard map.

Further, in the embodiment mentioned above, the contents to be determined by the conditions $\hat{1}$ and $\hat{2}$ are limited to the driving pattern of the holding solenoids S**H, however, the contents to be determined by the conditions $\hat{1}$ and $\hat{2}$ are not limited to this, and, for example, it may be structured such that the same increased pressure slope is realized during an execution of the BA control and during a non-execution thereof by changing the characteristic of the hydraulic pressure source.

Next, a braking force control apparatus in accordance with a fourth embodiment of the present invention will be mentioned below with reference to FIGS. 12 to 22.

Figure 12:
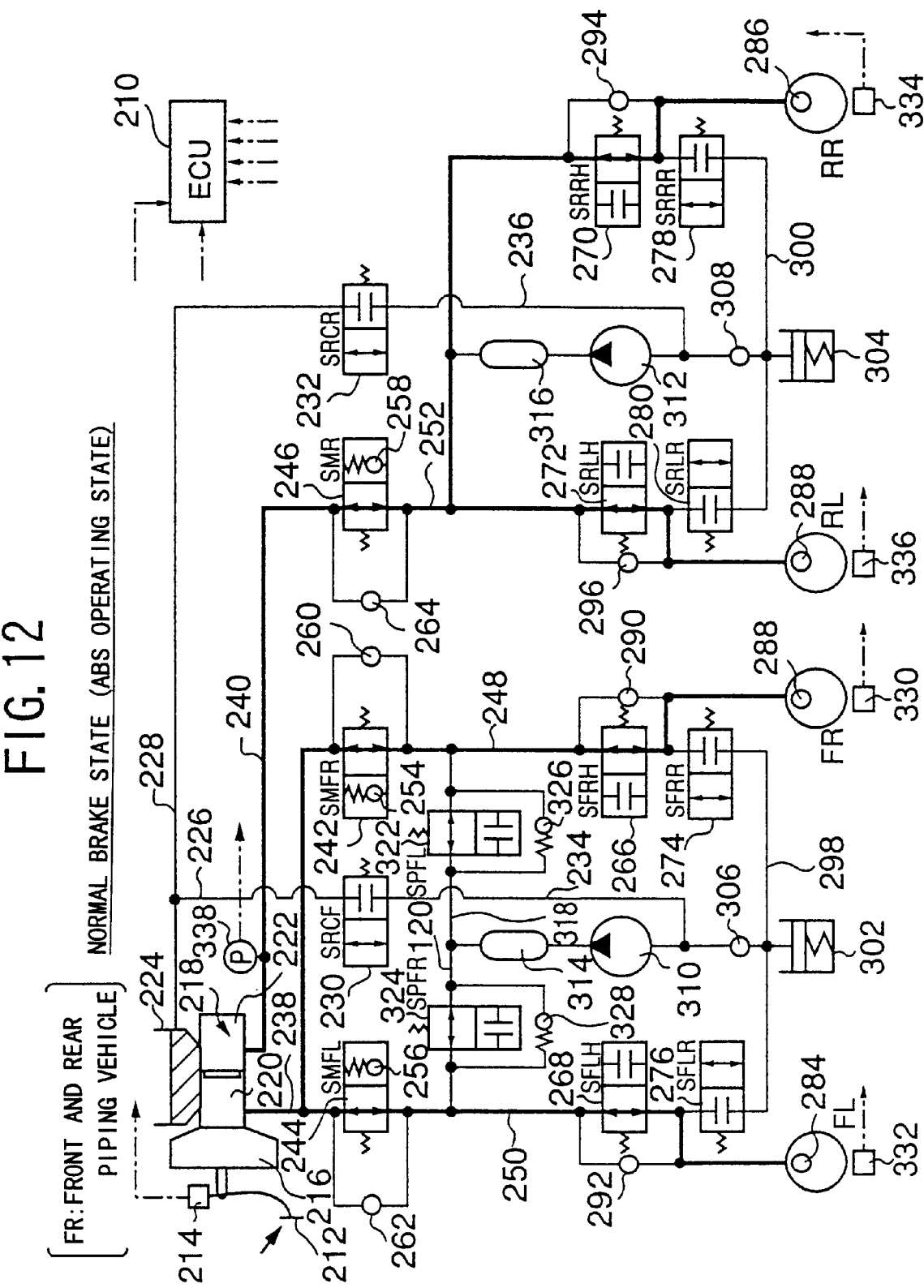
FIG. 12 is a system configuration diagram showing a normal braking state and an ABS operation state of a braking force control apparatus in accordance with a fourth embodiment of the present invention.

FIG. 12 shows a system configuration diagram of a braking force control apparatus of a pump-up type (hereinafter, simply refer to as a braking force control apparatus) in accordance with the fourth embodiment of the present invention. The braking force control apparatus of the present embodiment is an apparatus suitable for a braking force control apparatus for a front engine and rear drive type vehicle (FR vehicle). The braking force control apparatus of the present embodiment is controlled by an electronic control unit 210 (hereinafter, refer to as an ECU 210).

The braking force control apparatus is provided with a brake pedal 212. A brake switch 214 is arranged in the vicinity of the brake pedal 212. The brake switch 214 outputs an ON signal in accordance that the brake pedal 212 is stepped down. The output signal of the brake switch 214 is supplied to the ECU 210. The ECU 210 determines whether or not the brake pedal 212 is stepped down on the basis of the output signal of the brake switch 214.

The brake pedal 212 is connected to a vacuum booster 216. The vacuum booster 216 is fixed to a master cylinder 218. The vacuum booster 216 generates an assist force Fa having a predetermined times of ratio with respect to the brake pedaling force F in the case that the brake pedal 212 is stepped down. The master cylinder 218 is a center valve conventional type master cylinder, and is provided with a first hydraulic chamber 220 and a second hydraulic chamber 222 therewithin. A master cylinder pressure $P_{M/C}$ in accordance with a resultant force of the brake pedaling force F and the assist force Fa is generated in the first hydraulic chamber 220 and the second hydraulic chamber 222.

A reservoir tank 224 is arranged in an upper portion of the master cylinder 218. A front reservoir passage 226 and a rear reservoir passage 228 are communicated with the reservoir tank 224. A front reservoir cut solenoid 230 (hereinafter, refer to as an SRCF 230) is communicated with the front reservoir passage 226. Similarly, a rear reservoir cut solenoid 232 (hereinafter, refer to as an SRCR 232) is communicated with the rear reservoir passage 228.

A front pump passage 234 is further communicated with the SRCF 230. Similarly, a rear pump passage 236 is communicated with the SRCR 232. The SRCF 230 is a two-positional solenoid valve structured such as to shut off the front reservoir passage 226 and the front pump passage 234 by being set to the OFF-state and conduct them by being set to the ON-state. Further, the SRCR 232 is a two-positional solenoid valve structured such as to shut off the rear reservoir passage 228 and the rear pump passage 236 by being set to the OFF-state and conduct them by being set to the ON-state.

A first hydraulic pressure passage 238 and a second hydraulic pressure passage 240 are respectively communicated with the first hydraulic chamber 220 and the second hydraulic chamber 222 of the master cylinder 218. A front right master cut solenoid 242 (hereinafter, refer to as an SMFR 242) and a front left master cut solenoid 244 (hereinafter, refer to as an SMFL 244) are communicated with the first hydraulic pressure passage 238. On the other hand, a rear master cut solenoid 246 (hereinafter, refer to as an SMR 246) is communicated with the second hydraulic pressure passage 240.

A hydraulic pressure passage 248 provided in correspondence to the front right wheel FR is communicated with the SMFR 242. Similarly, a hydraulic pressure passage 250 provided in correspondence to the front left wheel FL is communicated with the SMFL 244. Further, a hydraulic pressure passage 252 provided in correspondence to the rear left and right wheels RL and RR is communicated with the SMR 246.

Constant pressure releasing valves 254, 256 and 258 are respectively provided within the SMFR 242, the SMFL 244 and the SMR 246. The SMFR 242 is a two-positional solenoid valve structured such as to make the first hydraulic pressure passage 238 and the hydraulic pressure passage 248 in the conductive state in the case of being set to the OFF-state and communicate the first hydraulic pressure passage 238 with the hydraulic pressure passage 248 via the constant pressure releasing valve 254 by being set to the ON-state. Further, the SMFL 242 is a two-positional solenoid valve structured such as to make the first hydraulic pressure passage 238 and the hydraulic pressure passage 250 in the conductive state in the case of being set to the OFF-state and communicate the first hydraulic pressure passage 238 with the hydraulic pressure passage 250 via the constant pressure releasing valve 256 in the case of being set to the ON-state. Similarly, the SMR 246 is a two-positional solenoid valve structured such as to make the second hydraulic pressure passage 240 and the hydraulic pressure passage 252 in the conductive state in the case of being set to the OFF-state and communicate the second hydraulic pressure passage 240 with the hydraulic pressure passage 252 via the constant pressure releasing valve 258 in the case of being set to the ON-state.

A check valve 260 for enabling only a flow of a fluid toward the side of the hydraulic pressure passage 248 from the side of the first hydraulic pressure passage 238 is arranged between the first hydraulic pressure passage 238 and the hydraulic pressure passage 248. Similarly, a check valve 262 for enabling only a flow of a fluid toward the side of the hydraulic pressure passage 250 from the side of the first hydraulic pressure passage 238 and a check valve 264 for enabling only a flow of a fluid toward the side of the hydraulic pressure passage 252 from the side of the second hydraulic pressure passage 240 are respectively arranged between the first hydraulic pressure passage 238 and the hydraulic pressure passage 250 and between the second hydraulic pressure passage 240 and the hydraulic pressure passage 252.

A front right wheel holding solenoid 266 (hereinafter, refer to as an SFRH 266) is communicated with the hydraulic pressure passage 248 corresponding to the front right wheel FR. Similarly, a front left wheel holding solenoid 268 (hereinafter, refer to as an SFLH 268) is communicated with the hydraulic pressure passage 250 corresponding to the front left wheel FL, and a rear right wheel holding solenoid 270 (hereinafter, refer to as an SRRH 270) and a rear left wheel holding solenoid 272 (hereinafter, refer to as an SRLH 272) are communicated with the hydraulic pressure passage 252 corresponding to the rear left and right wheels RL and RR, respectively. Hereinafter, these solenoids are totally called as "holding solenoids S**H" in the case of being referred as a whole.

A front right wheel pressure reducing solenoid 274 (hereinafter, refer to as an SFRR 274) is communicated with the SFRH 266. Similarly, a front left wheel pressure reducing solenoid 276 (hereinafter, refer to as an SFLR 276), a rear right wheel pressure reducing solenoid 278 (hereinafter, refer to as an SRRR 278) and a rear left wheel pressure reducing solenoid 280 (hereinafter, refer to as an SRLR 280) are communicated with the SFLH 268, SRRH 270 and SRLH 272, respectively. Hereinafter, these solenoids are totally called as "pressure reducing solenoids S**R" in the case of being referred as a whole.

Further, a wheel cylinder 282 in the front right wheel FR is communicated with the SFRH 266. Similarly, a wheel cylinder 284 in the front left wheel FL, a wheel cylinder 286 in the rear right wheel RR and a wheel cylinder 288 in the rear left wheel RL are communicated with the SFLH 268, SRRH 270 and SRLH 272, respectively.

Further, a check vale 290 for enabling a flow of a fluid toward the hydraulic pressure passage 248 from the side of the wheel cylinder 282 by bypassing the SFRH 266 is arranged between the hydraulic pressure passage 248 and the wheel cylinder 282. Similarly, check vales 292, 294 and 296 for enabling a flow of a fluid by bypassing the SFLH 268, SRRH 270 and SRLH 272 are arranged between the hydraulic pressure passage 250 and the wheel cylinder 284, between the hydraulic pressure passage 252 and the wheel cylinder 286 and between the hydraulic pressure passage 252 and the wheel cylinder 288, respectively.

The SFRH 266 is a two-positional solenoid valve structured such as to make the hydraulic pressure passage 248 and the wheel cylinder 282 in the conductive state by being set to the OFF-state and make the hydraulic pressure passage 248 and the wheel cylinder 282 in the shut-off state by being set to the ON-state. Similarly, the SFLH 268, SRRH 270 and SRLH 272 respectively correspond to two-positional solenoid valves structured such as to make a passage connecting the hydraulic pressure passage 250 and the wheel cylinder 284, a passage connecting the hydraulic pressure passage 252 and the wheel cylinder 286 and a passage connecting the hydraulic pressure passage 252 and the wheel cylinder 288 in the shut-off state by being set to the ON-state.

A front pressure reducing passage 298 is communicated with the pressure reducing solenoids SFRR 274 and SFLR 276 in the front left and right wheels. Further, a rear pressure reducing passage 300 is communicated with the pressure reducing solenoids SRRR 278 and SRLR 280 in the rear left and right wheels. A front reservoir 302 and a rear reservoir 304 are respectively communicated with the front pressure reducing passage 298 and the rear pressure reducing passage 300.

Further, the front pressure reducing passage 298 and the rear pressure reducing passage 300 are respectively communicated with the suction side of the front pump 310 and the suction side of the rear pump 312 via the check valves 306 and 308. The discharge side of the front pump 310 and the discharge side of the rear pump 312 are communicated with dampers 314 and 316 for absorbing a pulsation of the discharged pressure. The damper 314 is communicated with a front right pump passage 318 provided in correspondence to the front right wheel FR and a front left pump passage 320 provided in correspondence to the front left wheel FL. On the other hand, the damper 316 is communicated with the hydraulic pressure passage 252.

The front right pump passage 318 is communicated with the hydraulic pressure passage 248 via a front right pump solenoid 322 (hereinafter, refer to as an SPFL 322). Further, the front left pump 320 is communicated with the hydraulic pressure passage 250 via a front left pump solenoid 324 (hereinafter, refer to as an SPFR 324). The SPFL 322 is a two-positional solenoid valve structured such as to make the front right pump passage 318 and the hydraulic pressure passage 248 in the conductive state by being set to the OFF-state and make them in the shut-off state by being set to the ON-state. Similarly, the SPFR 324 is a two-positional solenoid valve structured such as to make the front left pump passage 320 and the hydraulic pressure passage 250 in the conductive state by being set to the OFF-state and make them in the shut-off state by being set to the ON-state.

A constant pressure releasing valve 326 for enabling only a flow of a fluid toward the side of the front right pump passage 318 from the side of the hydraulic pressure passage 248 is arranged between the hydraulic pressure passage 248 and the front right pump passage 318. Similarly, a constant pressure releasing valve 328 for enabling only a flow of a fluid toward the side of the front left pump passage 320 from the side of the hydraulic pressure passage 250 is arranged between the hydraulic pressure passage 250 and the front left pump passage 320.

The wheel speed sensors 330, 332, 334 and 336 are arranged in the vicinity of each wheel. The ECU 210 detects a revolution speed Vw of each wheel on the basis of the output signal of each of the wheel speed sensor 330 to 336. Further, the hydraulic pressure sensor 338 is arranged in the second hydraulic pressure passage 240 communicated with the master cylinder 218. The ECU 210 detects the master cylinder pressure $P_{M/C}$ on the basis of the output signal of the hydraulic pressure sensor 338.

Next, an operation of the braking force control apparatus of the present embodiment will be mentioned below. The braking force control apparatus of the present embodiment realizes ① a normal brake function, ② an ABS function and ③ a BA function by switching a state of various kinds of solenoid valves arranged within a hydraulic pressure circuit.

① the normal brake function can be realized, as shown in FIG. 12, by making all the solenoid valves provided in the braking force control apparatus in the OFF-state. Hereinafter, the state shown in FIG. 12 is referred to as a normal brake state. Further, a control for realizing the normal brake function in the braking force control apparatus is referred to as a normal brake control.

In the normal brake state shown in FIG. 12, the wheel cylinders 282 and 284 of the front left and right wheels FL and FR are both communicated with the first hydraulic chamber 220 of the master cylinder 218 via the first hydraulic pressure passage 238. Further, the wheel cylinders 286 and 288 of the rear left and right wheels RL and RR are communicated with the second hydraulic chamber 222 of the master cylinder 218 via the second hydraulic pressure passage 240. In this case, the wheel cylinder pressure $P_{W/C}$ of the wheel cylinders 282 to 288 is always controlled to be equal to the master cylinder pressure $P_{M/C}$. Accordingly, in accordance with the state shown in FIG. 12, the normal brake function can be realized.

② the ABS function can be realized by making the front pump 310 and the rear pump 312 in the ON-state and suitably driving the holding solenoids SH and the pressure reducing solenoids SR in response to the requirement of the ABS, in a state shown in FIG. 12. Hereinafter, a control for realizing the ABS function in the braking force control apparatus is referred to as an ABS control.

The ECU 210 starts the ABS control in the case that the vehicle is in a braking state and an excess slip ratio is detected in any one of the wheels. The ABS control is started under a situation in which the brake pedal 212 is stepped down, that is, the master cylinder 218 generates a high master cylinder pressure $P_{M/C}$.

During an execution of the ABS control, the master cylinder pressure $P_{M/C}$ is introduced to the hydraulic pressure passages 248 and 250 respectively provided in correspondence to the front left and right wheels and the hydraulic pressure passage 252 provided in correspondence to the rear left and right wheels through the first hydraulic pressure passage 238 and the second hydraulic pressure passage 240. Accordingly, under the above situation, when the holding solenoids SH is made in the valve-opened state and the pressure reducing solenoids SR is made in the valve-closed state, the wheel cylinder pressure $P_{W/C}$ of each the wheels can be increased. Hereinafter, the state is referred to as (i) a pressure increasing mode.

Further, the wheel cylinder pressure $P_{W/C}$ of each wheel can be held by making both of the holding solenoids SH and the pressure reducing solenoids SR in the valve-closed state during an execution of the ABS control. Hereinafter, the state is referred to as (ii) a holding mode. Further, the wheel cylinder pressure $P_{W/C}$ of each wheel can be reduced by setting the holding solenoids SH in the valve-closed state during an execution of the ABS control and setting the pressure reducing solenoids SR in the valve-opened state. Hereinafter, the state is referred to as (iii) a pressure reducing mode.

The ECU 210 controls the holding solenoids SH and the pressure reducing solenoids SR in accordance with a slip state of each wheel during the ABS control so that (i) the pressure increasing mode, (ii) the holding mode and (iii) the pressure reducing mode can be suitably realized at each wheel. When the holding solenoids SH and the pressure reducing solenoids SR are controlled in the above manner, the wheel cylinder pressures $P_{W/C}$ of all the wheels are controlled to a suitable pressure which does not generate an excess slip ratio in the corresponding wheels. As mentioned above, in accordance with the above control, the ABS function can be realized in the braking force control apparatus.

When the pressure reducing mode is executed in each wheel during an execution of the ABS control, the brake fluid within the wheel cylinders 282 to 288 is flowed into the front reservoir 302 and the rear reservoir 304 via the front pressure reducing passage 298 and the rear pressure reducing passage 300. The brake fluid flowing into the front reservoir 302 and the rear reservoir 304 is pumped up to the front pump 310 and the rear pump 312 so as to be supplied to the hydraulic pressure passages 248, 250 and 252.

A part of the brake fluid supplied to the hydraulic pressure passages 248, 250 and 252 flows into the wheel cylinders 282 to 288 when the pressure increasing mode is executed in each wheel. Further, the remainder of the brake fluid flows into the master cylinder 218 for compensating the flowing-out portion of the brake fluid. Therefore, in accordance with the present embodiment, no excessive stroke is generated in the brake pedal 212 during an execution of the ABS control.

Figure 13:
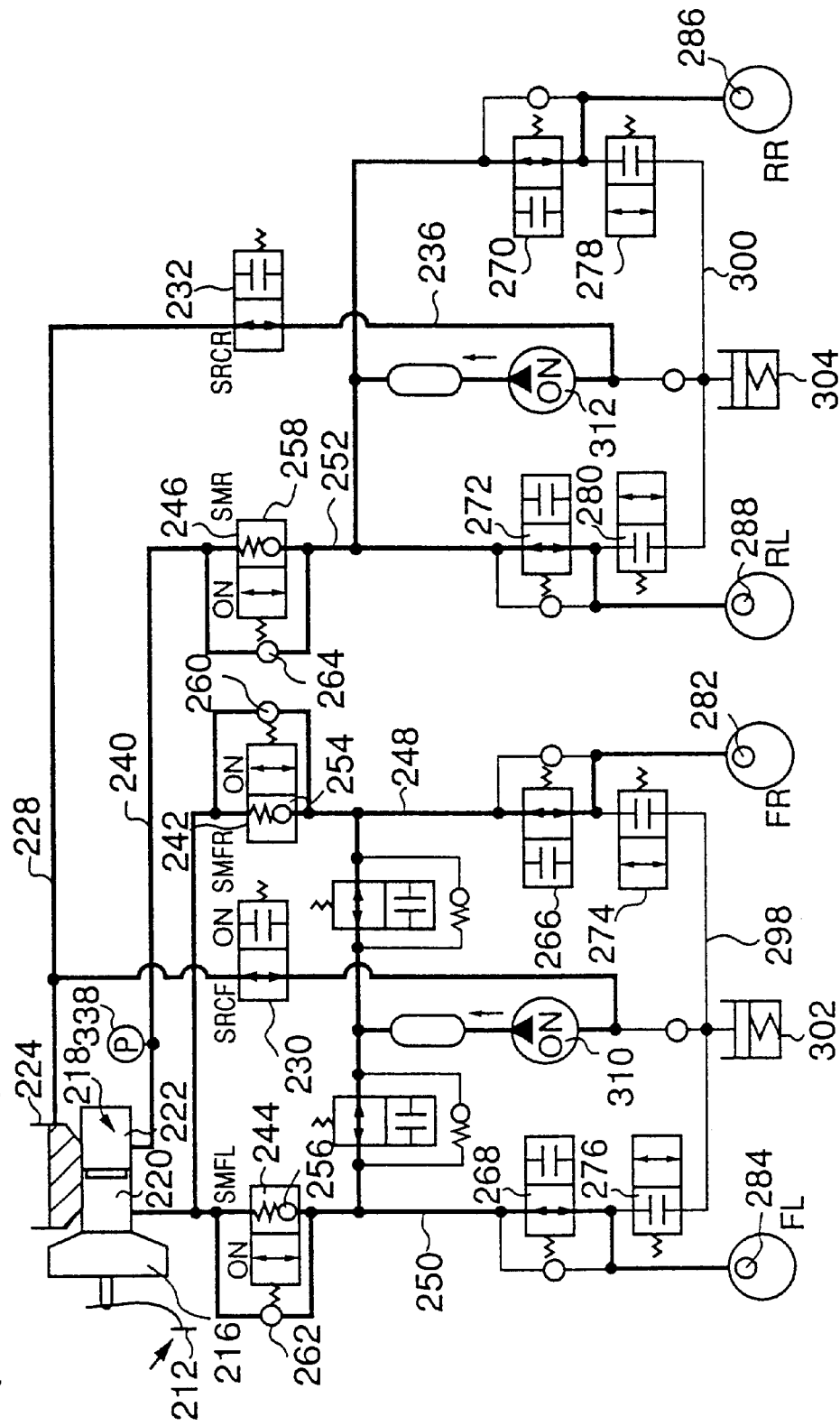
FIG. 13 is a diagram showing an increased assist pressure state realized during a BA control in the braking force control apparatus shown in FIG. 12.
Figure 14:
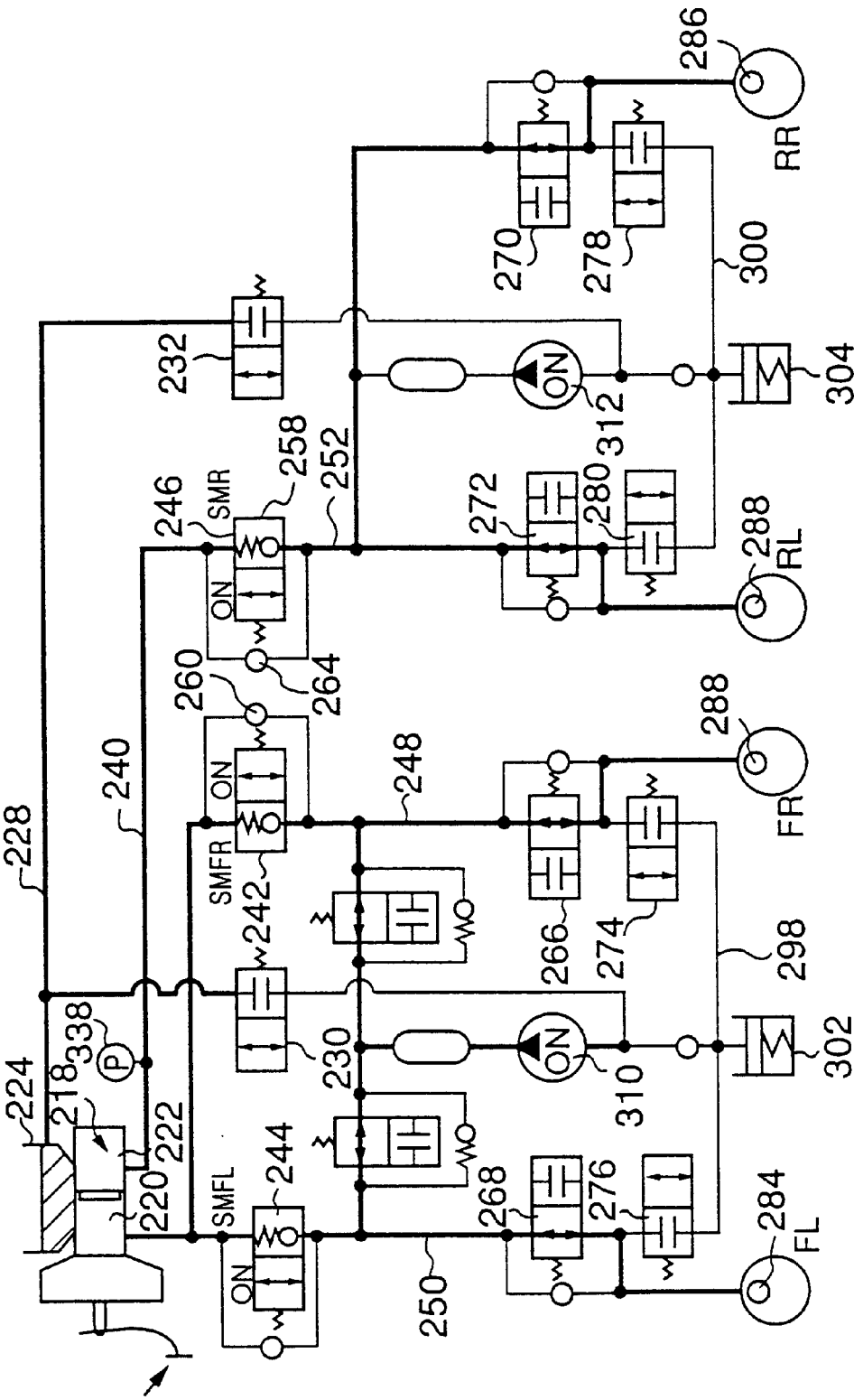
FIG. 14 is a diagram showing a held assist pressure state realized during the BA control in the braking force control apparatus shown in FIG. 12.
Figure 15:
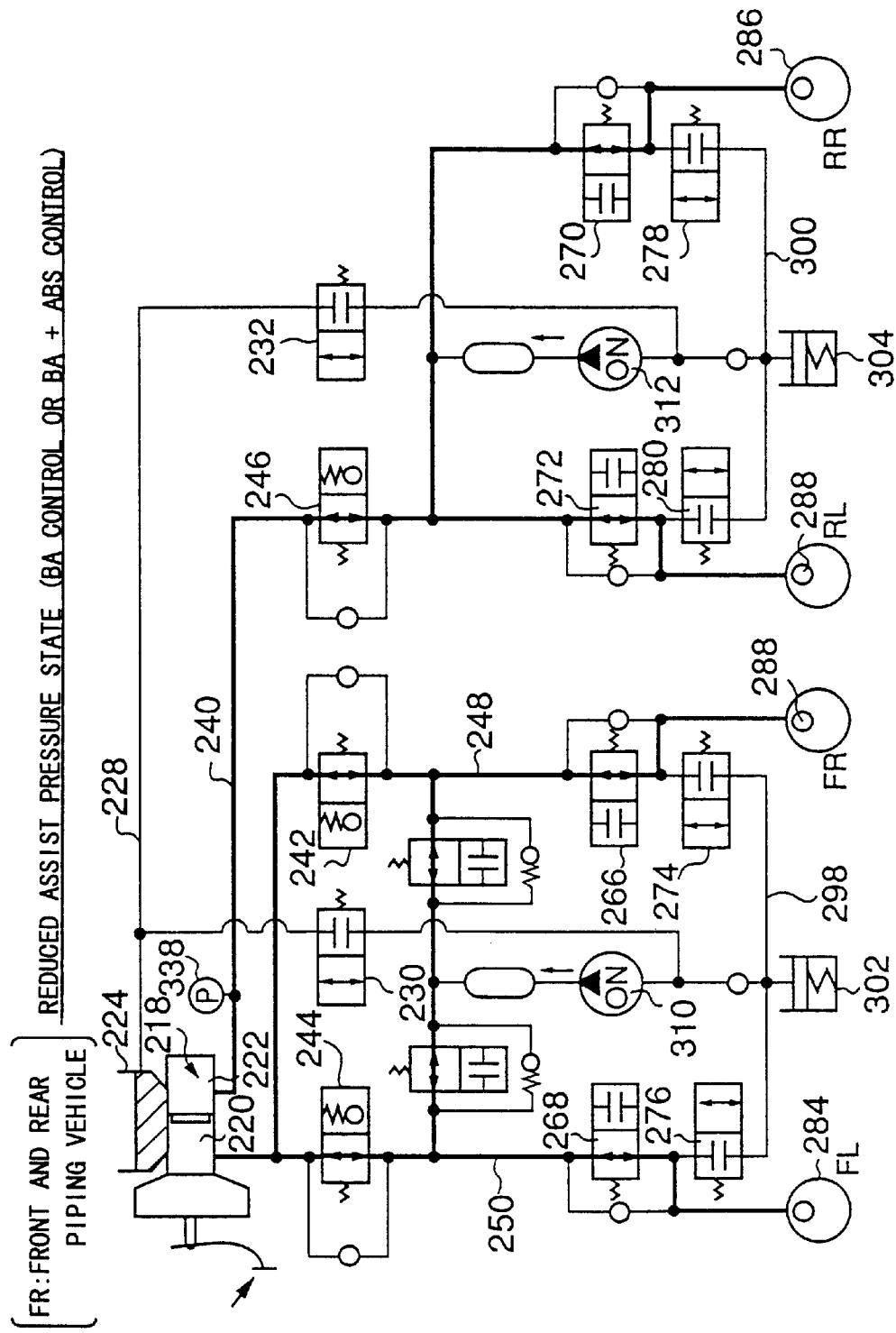
FIG. 15 is a diagram showing a reduced assist pressure state realized during the BA control or a BA+ABS control in the braking force control apparatus shown in FIG. 12.

FIGS. 13 to 15 show a state of the braking force control apparatus for realizing ③ the BA function. The ECU 210 realizes the BA function by suitably realizing a state shown in FIGS. 13 to 15 after the braking operation for requiring a quick start of the braking force, that is, an emergency braking operation is executed by a driver. Hereinafter, a control for realizing the BA function in the braking force control apparatus is referred to as a BA control.

FIG. 13 shows an increased assist pressure state realized during an execution of the BA control. The increased assist pressure state can be realized In the case that it is required to increase the wheel cylinder pressure $P_{W/C}$ in each wheel during an execution of the BA control. In the system of the present embodiment, the increased assist pressure state during the BA control can be realized, as shown in FIG. 13, by setting the reservoir cut solenoids SRCF 230 and SRCR 232 and the master cut solenoids SMFR 242, SMFL 244 and SMR 246 in the ON-state and setting the front pump 310 and the rear pump 312 in the ON-state.

When the increased assist pressure state shown in FIG. 13 is realized, the brake fluid stored in the reservoir tank 224 is pumped up to the front pump 310 and the rear pump 312 and supplied to the hydraulic pressure passages 248, 250 and 252. In the increased assist pressure state, the flow of the brake fluid from the hydraulic pressure passages 248, 250 and 252 into the master cylinder 218 is restricted by the SMFR 242, SMFL 244 and SMR 246 until the internal pressure of the hydraulic pressure passages 248, 250 and 252 is over the opening valve pressure of the constant pressure releasing valves 254, 256 and 258 to a pressure higher than the master cylinder pressure $P_{M/C}$.

Accordingly, when the increased assist pressure state shown in FIG. 13 is realized, a hydraulic pressure higher than the master cylinder pressure $P_{M/C}$ is generated in the hydraulic pressure passages 248, 250 and 252. In the increased assist pressure state, the wheel cylinders 282 to 288 and the hydraulic pressure passages 248, 250 and 252 corresponding thereto are maintained in a conductive state. Accordingly, when the increased assist pressure state is realized, the wheel cylinder pressure $P_{W/C}$ in all the wheels is quickly increased to a pressure over the master cylinder pressure $P_{M/C}$ by setting the front pump 310 and the rear pump 312 as a hydraulic pressure source, thereafter.

In the increased assist pressure state shown in FIG. 13, the hydraulic pressure passages 248, 250 and 252 are communicated with the master cylinder 218 via the check valves 260, 262 and 264, respectively. Accordingly, in the case that the master cylinder pressure $P_{M/C}$ is greater than the wheel cylinder pressure $P_{W/C}$ in each wheel, the wheel cylinder pressure $P_{W/C}$ can be increased by setting the master cylinder 218 as a hydraulic pressure source even in the increased assist pressure state.

FIG. 14 shows a held assist pressure state realized during an execution of the BA control. The held assist pressure state is realized in the case that it is necessary to hold the wheel cylinder pressure $P_{W/C}$ in each wheel during an execution of the BA control. The held assist pressure state can be realized, as shown in FIG. 14, by setting the SRCF 230 and the SRCR 232 in the OFF-state, setting the master cut solenoids SMFR 242, SMFL 242 and SMR 246 in the ON-state, and setting the front pump 310 and the rear pump 312 in the ON-state.

In the held assist pressure state as shown in FIG. 14, the front pump 310 and the reservoir tank 224, and the rear pump 312 and the reservoir tank 224 are respectively made in the shut-off state by the SRCF 230 and the SRCR 232. Accordingly, in the held assist pressure state, the fluid is not discharged to the hydraulic pressure passages 248, 250 and 252 from the front pump 310 and the rear pump 312. Further, in the held assist pressure state as shown in FIG. 14, the hydraulic pressure passages 248, 250 and 252 are substantially separated from the master cylinder 218 by the SMFR 242, SMFL 244 and SMR 246. Therefore, in accordance with the held assist pressure state as shown in FIG. 14, it is possible to hold the wheel cylinder pressure $P_{W/C}$ in all the wheels to a constant value.

FIG. 15 shows a reduced assist pressure state realized during an execution of the BA control. The reduced assist pressure state is realized in the case that it is necessary to reduce the wheel cylinder pressure $P_{W/C}$ in each wheel during an execution of the BA control. The reduced assist pressure state can be realized, as shown in FIG. 15, by setting the front pump 310 and the rear pump 312 in the ON-state.

In the reduced assist pressure state as shown in FIG. 15, the front pump 310 and the rear pump 312 are separated from the reservoir tank 224. Accordingly, the fluid is not discharged to the hydraulic pressure passages 248. 250 and 252 from the front pump 310 and the rear pump 312. Further, in the reduced assist pressure state, the wheel cylinders 282 to 288 in each wheel and the master cylinder 218 are set in a conductive state. Accordingly, when the reduced assist pressure state is realized, it is possible to reduce the wheel cylinder pressure $P_{W/C}$ in all the wheels by setting the master cylinder pressure $P_{M/C}$ to be a lower limit value.

When the BA control is started in the braking force control apparatus of the present embodiment, at first (I) a start pressure increasing mode is executed. (I) the start pressure increasing mode can be realized by maintaining an increased assist pressure state shown in FIG. 13 for a predetermined pressure increasing time $T_{STA}$. As mentioned above, when the increased assist pressure state is realized, the wheel cylinder pressure $P_{W/C}$ in each wheel can be increased by the front pump 310 or the rear pump 312 as a hydraulic pressure source to a pressure over the master cylinder pressure $P_{M/C}$. Therefore, the wheel cylinder pressure $P_{W/C}$ in each wheel can be quickly increased to a pressure over the master cylinder pressure $P_{W/C}$ after an execution of the BA control is started.

When (I) the start pressure increasing mode mentioned above is terminated, any one of (II) an assist pressure increasing mode, (III) an assist pressure reducing mode, (IV) an assist pressure holding mode, (V) an assist pressure gradual increasing mode and (VI) an assist pressure gradual reducing mode is executed in accordance with the braking operation by a driver, thereafter.

In the case that the master cylinder pressure $P_{M/C}$ is steeply increased during an execution of the BA control, it can be determined that a driver requires a greater braking force. In accordance with the braking force control apparatus of the present embodiment, in this case, (II) the assist pressure increasing mode is executed. (II) the assist pressure increasing mode can be realized by maintaining an increased assist pressure state shown in FIG. 13 in the same manner as that of (I) the start pressure increasing mode mentioned above. In accordance with the increased assist pressure state, it is possible to quickly increase the wheel cylinder pressure $P_{W/C}$ in each wheel by the front pump 310 and the rear pump 312 as a hydraulic pressure source. Therefore, in accordance with the processing mentioned above, it is possible to accurately reflect an intention of a driver to the wheel cylinder pressure $P_{W/C}$.

In the case that the master cylinder pressure $P_{M/C}$ is steeply reduced during an execution of the BA control, it can be determined that a driver intends to quickly reduce the braking force. In accordance with the present embodiment, in this case, (III) the assist pressure reducing mode is executed. (III) the assist pressure reducing mode can be realized by maintaining the reduced assist pressure state shown in FIG. 15. In accordance with the reduced assist pressure state, as mentioned above, it is possible to quickly reduce the wheel cylinder pressure $P_{W/C}$ in each wheel to the master cylinder pressure $P_{M/C}$. Therefore, in accordance with the processing mentioned above, it is possible to accurately reflect an intention of a driver to the wheel cylinder pressure $P_{W/C}$.

In the case that the master cylinder pressure $P_{M/C}$ is maintained at a substantially constant value during an execution of the BA control, it can be determined that a driver intends to hold the braking force. In accordance with the present embodiment, in this case, (IV) the assist pressure holding mode is executed. (IV) the assist pressure holding mode can be realized by maintaining the held assist pressure state shown in FIG. 14. In accordance with the held assist pressure state, as mentioned above, it is possible to maintain the wheel cylinder pressure $P_{W/C}$ in each wheel at a constant value. Therefore, in accordance with the processing mentioned above, it is possible to accurately reflect an intention of a driver to the wheel cylinder pressure $P_{W/C}$.

In the case that the master cylinder pressure $P_{M/C}$ is gradually increased during an execution of the BA control, it can be determined that a driver intends to gradually start the braking force. In accordance with the present embodiment, in this case, (V) the assist pressure gradual increasing mode is executed. (V) the assist pressure gradual increasing mode can be realized by repeating the increased assist pressure state shown in FIG. 13 and the held assist pressure state shown in FIG. 14. In accordance with (V) the assist pressure gradual increasing mode, it is possible to increase the wheel cylinder pressure $P_{W/C}$ in each wheel by serving the front pump 310 and the rear pump 312 as a hydraulic pressure source step by step. Therefore, in accordance with the processing mentioned above, it is possible to accurately reflect an intention of a driver to the wheel cylinder pressure $P_{W/C}$.

In the case that the master cylinder pressure $P_{M/C}$ is gradually reduced during an execution of the BA control, it can be determined that a driver intends to gradually reduce the braking force. In accordance with the present embodiment, in this case, (VI) the assist pressure gradual reducing mode is executed. (VI) the assist pressure gradual reducing mode can be realized by repeating the reduced assist pressure state shown in FIG. 15 and the held assist pressure state shown in FIG. 14. In accordance with (VI) the assist pressure gradual reducing mode, it is possible to reduce the wheel cylinder pressure $P_{W/C}$ in each wheel toward the master cylinder pressure $P_{M/C}$ step by step. Therefore, in accordance with the processing mentioned above, it is possible to accurately reflect an intention of a driver to the wheel cylinder pressure $P_{W/C}$.

In accordance with the processing mentioned above, it is possible to quickly increase the wheel cylinder pressure $P_{W/C}$ to a pressure higher than the master cylinder pressure $P_{M/C}$ after an emergency braking operation is executed by a driver, and to increase and reduce the increased wheel cylinder pressure $P_{W/C}$ in accordance with the braking operation by a driver In the braking force control apparatus of the present embodiment, when the BA control mentioned above is started, there is a case that an excessive slip ratio is generated in any one of the wheels due to a quick pressure increase of the wheel cylinder pressure $P_{W/C}$ in each wheel. The ECU 210 starts a control (BA+ABS control) for realizing both of the BA function and the ABS function. A description will be given of an operation of the braking force control apparatus together with an execution of the BA+ABS control with reference to FIGS. 16 to 21 in addition to FIGS. 13 to 15.

In the braking force control apparatus of the present embodiment, in the case that the braking operation intending a pressure reduction of the braking force is executed by a driver during an execution of the BA+ABS control, it is required to reduce the wheel cylinder pressure $P_{W/C}$ of the ABS non-subject wheel toward the master cylinder pressure $P_{M/C}$ while controlling the wheel cylinder pressure $P_{W/C}$ of the ABS subject wheel to a pressure in response to the requirement of the ABS control. Hereinafter, this requirement is referred to as an assist pressure reducing ABS requirement.

The assist pressure reducing ABS requirement can be realized by suitably controlling the solenoids corresponding to the ABS subject wheel among the holding solenoids SH and the pressure reducing solenoids SR in response to the requirement of the ABS control while realizing the reduced assist pressure state shown in FIG. 15. Hereinafter, a state in which the control mentioned above is executed in the braking force control apparatus is referred to as an assist pressure reducing ABS state.

The assist pressure reducing ABS requirement is generated in the case that a driver intends to reduce the braking force, that is, it is not required to increase the wheel cylinder pressure $P_{W/C}$ in any one of the wheels. Accordingly, under the situation in which the assist pressure reducing ABS requirement is generated, it is necessary to hold and reduce the wheel cylinder pressure $P_{W/C}$ of the ABS subject wheel while reducing the wheel cylinder pressure $P_{W/C}$ of the ABS non-subject wheel.

In the assist pressure reducing ABS state mentioned above, all of the holding solenoids S**H are communicated with the master cylinder 218. Therefore, in accordance with the assist pressure reducing ABS state, it is possible to properly reduce the wheel cylinder pressure $P_{W/C}$ of the ABS non-subject wheel toward the master cylinder pressure $P_{M/C}$. Further, under the situation mentioned above, when (i) the holding mode or (iii) the pressure reducing mode is realized with respect to the ABS subject wheel, it is possible to hold or reduce the wheel cylinder pressure $P_{W/C}$ of the ABS subject wheel. As mentioned above, in accordance with the assist pressure reducing ABS state, it is possible to properly realize the function to be realized when the assist pressure reducing ABS requirement Is generated.

In the braking force control apparatus of the present embodiment, in the case that the braking operation intending to increase the braking force is executed by a driver during an execution of the BA+ABS control, a requirement for increasing the wheel cylinder pressure $P_{W/C}$ of the ABS non-subject wheel in a range over the master cylinder pressure $P_{M/C}$ while controlling the wheel cylinder pressure $P_{W/C}$ of the ABS subject wheel to the pressure in response to the requirement of the ABS control is generated. Hereinafter, this requirement is referred to as an assist pressure increasing ABS requirement.

The assist pressure increasing ABS requirement can be also realized by controlling the solenoids corresponding to the ABS subject wheel among the holding solenoids SH and the pressure reducing solenoids SR in response to the requirement of the ABS control while realizing the increased assist pressure state shown in FIG. 13 mentioned above. That is, for example, in the case that the front left wheel FL is the ABS subject wheel, it is possible to control the wheel cylinder pressure $P_{W/C}$ of the front left wheel FL to a pressure in response to the requirement of the ABS control and increase the wheel cylinder pressure $P_{W/C}$ of the other wheels FR, RL and RR in a range higher than the master cylinder pressure $P_{M/C}$ by realizing the increased assist pressure state shown in FIG. 13 and controlling the SFLH 268 and the SFLR 276 in response to the requirement of the ABS control.

However, when the ABS control is started with respect to the front left wheel FL, the holding solenoid SFLH 268 corresponding to the front left wheel FL is set in the valve-closed state except a little time at which (i) the pressure increasing mode is executed with respect to the front left wheel FL thereafter. Accordingly, after the ABS control is started with respect to the front left wheel FL, almost all of the brake fluid discharged from the front pump 310 flows into the wheel cylinder 282 of the front right wheel FR corresponding to the ABS non-subject wheel.

The discharging capacity of the front pump 310 is set such as to simultaneously increase the wheel cylinder pressure $P_{W/C}$ of the front left and right wheels FL and FR in accordance with a proper increased pressure slope. Accordingly, under the situation in which almost all of the brake fluid discharged from the front pump 310 flows into the wheel cylinder 282 of the front right wheel FR corresponding to the ABS non-subject wheel, an excessive increased pressure slope is generated in the wheel cylinder pressure $P_{W/C}$ of the front right wheel FR.

Further, under the situation in which an excessive increased pressure slope is generated in the wheel cylinder pressure $P_{W/C}$ of the front right wheel FR as mentioned above, it is possible to generate a case that the wheel cylinder pressure $P_{W/C}$ of the front left wheel FL is excessively increased when (i) the pressure increasing mode is executed with respect to the front left wheel FL. When the wheel cylinder pressure $P_{W/C}$ of the ABS subject wheel is excessively increased together with an execution of (i) the pressure increasing mode, an execution of (ii) the pressure reducing mode is again required with respect to the wheel, so that there is generated a disadvantage that a hunting is easily generated in the ABS control.

In this point, the method for satisfying the assist pressure increasing ABS requirement by realizing the increased assist pressure state shown in FIG. 13 and controlling the solenoids corresponding to the ABS subject wheel among the holding solenoids SH and the pressure reducing solenoids SR in response to the requirement of the ABS control is not always an optimum method as a method for realizing the BA+ABS control in the braking force control apparatus of the present embodiment.

Figure 16:
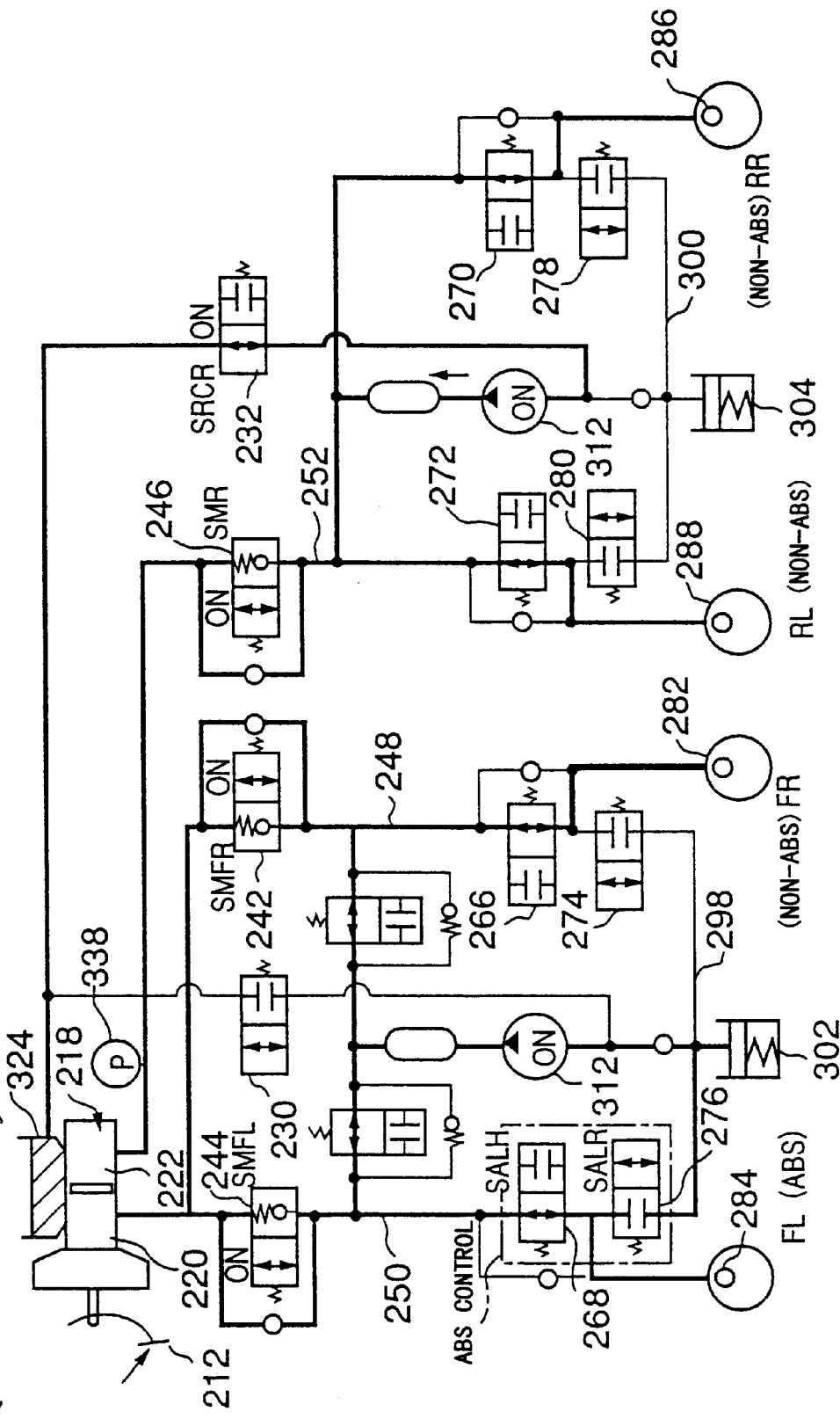
FIG. 16 is a diagram showing an increased assist pressure state realized during the BA+ABS control in the braking force control apparatus shown in FIG. 12.

FIG. 16 shows an embodiment of a state realized in the braking force control apparatus in the case that the assist pressure increasing ABS requirement setting the front left wheel FL as the ABS subject wheel is generated (hereinafter, refer to as an assist pressure increasing ABS state). The assist pressure increasing ABS state setting the front left wheel FL as the ABS subject wheel can be realized by controlling the braking force control apparatus so that conditions (a) to (d) mentioned below are satisfied.

(a) the front reservoir cut solenoid SRCF 230 set in the ON-state in the increased assist pressure state shown in FIG. 13 is set to the OFF-state. In particular, (a-1) the rear reservoir cut solenoid SRCR 232 and the master cut solenoids SMFR 242, SMFL 244 and SMR 246 are set to the ON-state, and (a-2) the front pump 310 and the rear pump 312 are set to the ON-state.

(b) the holding solenoid SFLH 268 and the pressure reducing solenoid SFLR 276 of the front left wheel FL corresponding to the ABS subject wheel are controlled in response to the requirement of the ABS control in a manner mentioned below. (b-1) in the case that (ii) the holding mode and (iii) the pressure reducing mode are required by the ABS control, it is controlled by the same method as the case that the ABS control is executed alone. (b-2) in the case that (i) an execution of the pressure increasing mode is required by the ABS control, the pressure increasing mode is executed only for a predetermined time shorter than the case that the ABS control is executed alone.

(c) the holding solenoid SFRH 266 of the front right wheel FR belonging to the same system as the ABS subject wheel is repeatedly turned on and off at a predetermined duty ratio.

(d) the master cut solenoids SMFR 242 and the SMFL 244 belonging to the system including the front left wheel FL corresponding to the ABS subject wheel are set to the OFF-state (opened-valve state) in synchronous with a period at which (iii) the pressure reducing mode is executed with respect to the front left wheel FL.

In accordance with the condition (a) mentioned above, it is possible to set the front pump 310 and the reservoir tank 224 belonging to the system including the ABS subject wheel to the shut-off state at the same time when the assist pressure increasing ABS requirement is generated. In this case, since the brake fluid sucked to the front pump 310 is limited only to the fluid flowing out from the wheel cylinder 284, the hydraulic pressure generated in the discharge side of the front pump 310 is restricted to a relatively low pressure. As a result, there is formed an advantageous state for preventing the hunting of the ABS control and restricting the increased pressure slope of the wheel cylinder pressure $P_{W/C}$ of the front right wheel FR corresponding to the ABS non-subject wheel.

In accordance with the condition (b) mentioned above, a time for which (i) the pressure increasing mode is executed in the front left wheel FL corresponding to the ABS subject wheel is shortened in comparison with the case that the ABS control is executed alone. When the time for executing (i) the pressure increasing mode is shortened, the increased pressure amount generated in the wheel cylinder pressure $P_{W/C}$ of the front left wheel FL together with an execution of (i) the pressure increasing mode is restricted. Under the situation mentioned above, even when the hydraulic pressure higher than the normal time is generated in the upstream side of the SFLH 268, it is hard to generate a hunting in the ABS control.

In accordance with the condition (c) mentioned above, with respect to the front right wheel FR belonging to the same system as the ABS subject wheel, the state in which the brake fluid flows into the wheel cylinder 282 and the state in which the flowing is restricted are repeated at a predetermined duty ratio. In this case, even when the hydraulic pressure higher than the normal time is generated in the upstream side of the SFRH 266, the wheel cylinder pressure $P_{W/C}$ of the front right wheel FR is increased in accordance with a proper increased pressure slope.

In accordance with the condition (d) mentioned above, in synchronous with the timing at which the brake fluid flowing out from the wheel cylinder 284 is pressurized and fed by the front pump 310, the discharge side of the front pump 310 and the master cylinder 218 are set in the conductive state. In this case since the brake fluid can flow into the master cylinder 218, the hydraulic pressure generated in the discharge side of the front pump 310 is restricted to a relatively low pressure. As a result, there is formed an advantageous state for preventing a hunting of the ABS control and restricting the increased pressure slope of the wheel cylinder pressure $P_{W/C}$ of the front right wheel FR corresponding to the ABS non-subject wheel.

Therefore, in accordance with the assist pressure increasing ABS state mentioned above, it is possible to increase the wheel cylinder pressure $P_{W/C}$ in all of the ABS non-subject wheels in accordance with the same increased pressure slope as the case that the pressure increase of the wheel cylinder pressure $P_{W/C}$ is required under the situation in which the BA control is executed alone as well as control the wheel cylinder pressure $P_{W/C}$ of the ABS subject wheel in the same manner as the case that the ABS control is executed alone. As mentioned above, in accordance with the assist pressure increasing ABS state mentioned above, it is possible to properly realize the function to be realized when the assist pressure increasing ABS requirement is generated.

In the braking force control apparatus of the present embodiment, in the case that the braking operation intending to maintain the braking force is executed by a driver during an execution of the BA+ABS control, there is generated a necessity of intending to maintain the wheel cylinder pressure $P_{W/C}$ of the ABS non-subject wheel while controlling the wheel cylinder pressure $P_{W/C}$ of the ABS subject wheel to the pressure in response to the requirement of the ABS control. Hereinafter, this requirement is referred to as an assist pressure holding ABS requirement.

In the case that the assist pressure holding ABS requirement is generated, by controlling the solenoids corresponding to the ABS subject wheel among the holding solenoids SH and the pressure reducing solenoids SR in response to the requirement of the ABS control while realizing the held assist pressure state shown in FIG. 14, it is possible to control the wheel cylinder pressure $P_{W/C}$ of the ABS subject wheel to the pressure in response to the requirement of the ABS control and to hold the wheel cylinder pressure $P_{W/C}$ of the ABS non-subject wheel belonging to the system in which the ABS subject wheel is not included within the same system.

That is, for example, in the case that the assist pressure holding ABS requirement setting the front left wheel FL as the ABS subject wheel is generated, it is possible to realize (ii) the holding mode, (iii) the pressure reducing mode and (i) the pressure increasing mode serving the front pump 319 as a hydraulic pressure source with respect to the front left wheel FL by controlling the SFLH 268 and the SFLR 276 in response to the requirement of the ABS control while realizing the assist pressure holding state shown in FIG. 14. Accordingly, the wheel cylinder pressure $P_{W/C}$ of the front left wheel FL can be controlled in response to the requirement of the ABS control. Further, under the situation mentioned above, the system of the rear wheels in which the ABS subject wheel is not included is maintained in the same state as that shown in FIG. 14. Accordingly, with respect to the rear left and right wheels RL and RR, the wheel cylinder pressure $P_{W/C}$ thereof can be held in the same manner as that of the case that the BA control is executed alone.

However, in accordance with the method mentioned above, after (iii) the pressure reducing mode is executed with respect to the front left wheel FL, the brake fluid flowing out from the wheel cylinder 284 is pressurized and fed by the front pump 310 and flows into the wheel cylinder 282 of the front right wheel FR. Accordingly, with respect to the front right wheel FR belonging to the system of the front wheels provided with the ABS subject wheel within the same system, it is impossible to respond to the requirement of the BA control, that is, to hold the wheel cylinder pressure $P_{W/C}$.

Figure 17:
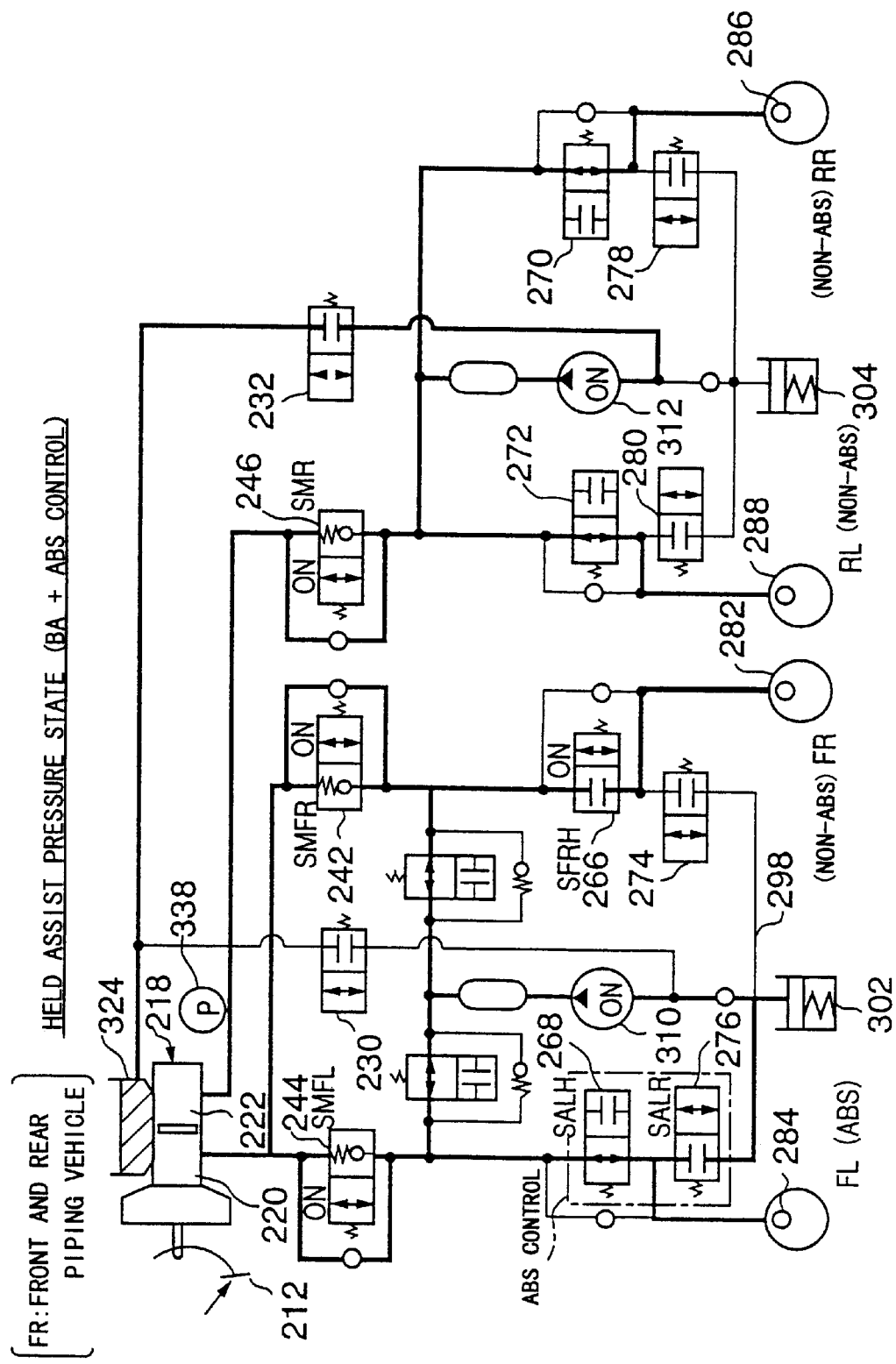
FIG. 17 is a diagram showing a held assist pressure state realized during the BA+ABS control in the braking force control apparatus shown in FIG. 12.

FIG. 17 shows an embodiment of a state realized in the braking force control apparatus in the case that the assist pressure holding ABS requirement setting the front left wheel FL as the ABS subject wheel is generated (hereinafter, refer to as an assist pressure holding ABS state). The assist pressure holding ABS state setting the front left wheel FL as the ABS subject wheel can be realized by controlling the braking force control apparatus so that conditions (e) to (g) mentioned below are satisfied.

(e) the holding solenoid SFRH 266 of the front right wheel FR corresponding to the ABS non-subject wheel having the ABS subject wheel within the same system among the holding solenoids SH set in the OFF-state in the held assist pressure state shown in FIG. 14 is set to the ON-state (valve-opened state). In particular, (e-1) the master cut solenoids SMFR 242, SMFL 244 and SMR 246 are set to the ON-state, (e-2) the front pump 310 and the rear pump 312 are set to the ON-state, and (e-3) the SFRH 266** is set to the ON-state.

(f) the holding solenoid SFLH 268 and the pressure reducing solenoid SFLR 276 of the front left wheel FL corresponding to the ABS subject wheel are controlled in response to the requirement of the ABS control by the same method as that of the condition (b) mentioned above, that is, in accordance with a pattern having the time for maintaining (i) the pressure increasing mode shorter than the normal time.

(g) the master cut solenoids SMFR 242 and the SMFL 244 belonging to the system including the front left wheel FL corresponding to the ABS subject wheel are controlled by the same method as that of the condition (c), that is, such as to set to the OFF-state (valve-opened state) in synchronous with a timing at which (iii) the pressure reducing mode is executed with respect to the front left wheel FL.

In accordance with the condition (e) mentioned above, it is possible to separate the wheel cylinder 282 of the front right wheel corresponding to the ABS non-subject wheel belonging to the system including the ABS subject wheel from the front pump 310 at the same time when the assist pressure increasing ABS requirement is generated. In this case, since the brake fluid discharged from the front pump 310 does not flow into the wheel cylinder 282, the wheel cylinder pressure $P_{W/C}$ of the front right wheel FR is properly held in response to the requirement of the BA control.

In accordance with the condition (f) mentioned above, it is possible to restrict the increased pressure amount generated in the wheel cylinder pressure $P_{W/C}$ when (i) the pressure increasing mode is executed in the front left wheel FL corresponding to the ABS subject wheel, in the same manner as that of the case in which the condition (b) mentioned above is realized.

Further, in accordance with the condition (g) mentioned above, in synchronous with the timing at which the brake fluid flowing out from the wheel cylinder 284 is pressurized and fed by the front pump 310, the discharge side of the front pump 310 and the master cylinder 218 can be set in the conductive state, in the same manner as that of the case in which the condition (d) mentioned above is realized.

Therefore, in accordance with the assist pressure holding ABS state mentioned above, it is possible to properly hold the wheel cylinder pressure $P_{W/C}$ in all of the ABS non-subject wheels in the same manner as that of the case in which the BA control is executed alone as well as control the wheel cylinder pressure $P_{W/C}$ of the ABS subject wheel in the same manner as the case that the ABS control is executed alone. As mentioned above, in accordance with the assist pressure holding ABS state, it is possible to properly realize the function to be realized when the assist pressure holding ABS requirement is generated.

The braking force control apparatus of the present embodiment 1 restricts the wheel cylinder pressure $P_{W/C}$ of the ABS subject wheel to a pressure required by the ABS control and 2 controls the wheel cylinder pressure $P_{W/C}$ of the ABS non-subject wheel to a pressure required by the BA control by properly realizing the assist pressure increasing ABS state, the assist pressure holding ABS state and the assist pressure reducing ABS state mentioned above in the case that an excessive slip ratio is generated in any one of the wheels after the BA control is started.

Figure 18:
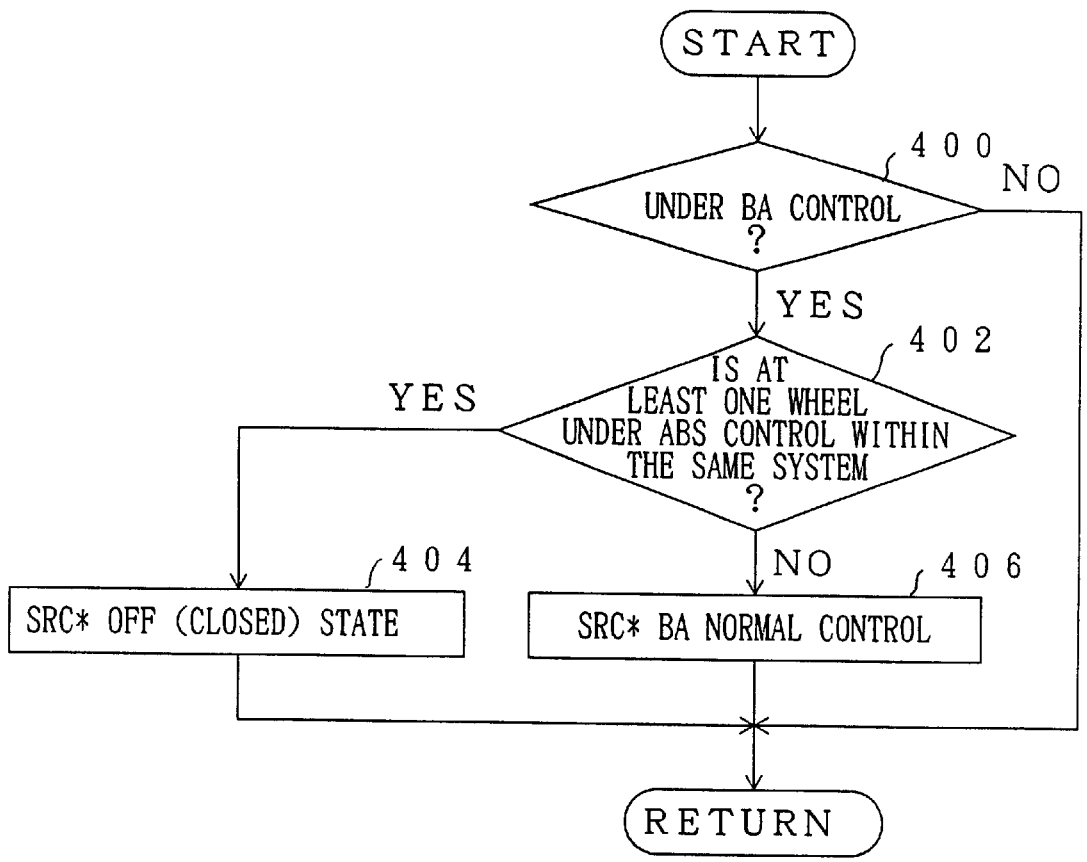
FIG. 18 is a flow chart of a control routine executed for controlling a state of a reservoir cut solenoid in the braking force control apparatus shown in FIG. 12.

FIG. 18 shows a flow chart of an embodiment of a reservoir cut solenoid control routine executed by the ECU 210 so as to realize both of the BA control and the BA+ABS control mentioned above. The ECU 210 executes the routine shown in FIG. 18 with respect to each front wheel system to which the front left and right wheels FL and FR belong and the rear wheel system to which the rear left and right wheels RL and RR belong. The ECU 210 controls the state of the reservoir cut solenoids SRCF 230 and the SRCR 232 (hereinafter, these are referred to as a reservoir cut solenoids SRC* as a whole) by executing the routine shown in FIG. 18. The routine shown in FIG. 18 is a fixed interrupt routine which is activated every predetermined time. When the routine shown in FIG. 18 is activated, a processing in step 400 is at first executed.

In step 400, it is determined whether or not the BA control is executed in the braking force control apparatus. As a result, in the case that it is determined that the BA control is not being executed, the current routine is terminated without any further processings, thereafter. On the other hand, in the case it is determined that that the BA control is executed, a processing in step 402 is then executed.

In step 402, it is determined whether or not one or more ABS subject wheel exists within the system to be controlled by the present routine. As a result, in the case that it is determined that one or more ABS subject wheel exists, a processing in step 404 is then executed. On the other hand, in the case that it is determined that the ABS subject wheel does not exist within the system to be controlled, a processing in step 406 is then executed.

In step 404, the solenoids belonging to the system to be controlled among the reservoir cut solenoids SRC* are set to the OFF-state (valve-closed state). When the processing in step 404 is terminated, the current routine is terminated.

In step 406, the solenoids belonging to the system to be controlled among the reservoir cut solenoids SRC* are normally controlled in accordance with the requirement of the BA control. When the processing in step 406 is terminated, the current routine is terminated.

As shown in FIGS. 13 to 15 mentioned above, during an execution of the BA control, it is required to set the reservoir cut solenoids SRC* to the ON-state (valve-opened state) in the case that the increased assist pressure state shown in FIG. 13 is required. On the other hand, as shown in FIGS. 15 to 17 mentioned above, during an execution of the BA+ABS control, it is required to control the solenoids belonging to the system in which no ABS subject wheel exists among the reservoir cut solenoids SRC* in the same manner as that during the BA control, and to always set the solenoids belonging to the system in which at least one ABS subject wheel is included to the OFF-state (valve-closed state). In accordance with the control routine shown in FIG. 18 mentioned above, the above requirement can be properly satisfied.

Further, in accordance with the control routine shown in FIG. 18 mentioned above, it is possible to restrict an amount of the brake fluid flowing out from the reservoir tank 224 during an execution of the BA control. When a large amount of brake fluid is flowed out from the reservoir tank 224 during an execution of the BA control, an amount of the brake fluid inversely flowing into the master cylinder 218 is increased, so that there is generated disadvantages such that a cup constituting the check valve is damaged, the brake pedal 212 is improperly returned toward the original position and the like. To the contrary, in accordance with the control routine shown in FIG. 18, it Is possible to prevent the disadvantages from generating.

Figure 19:
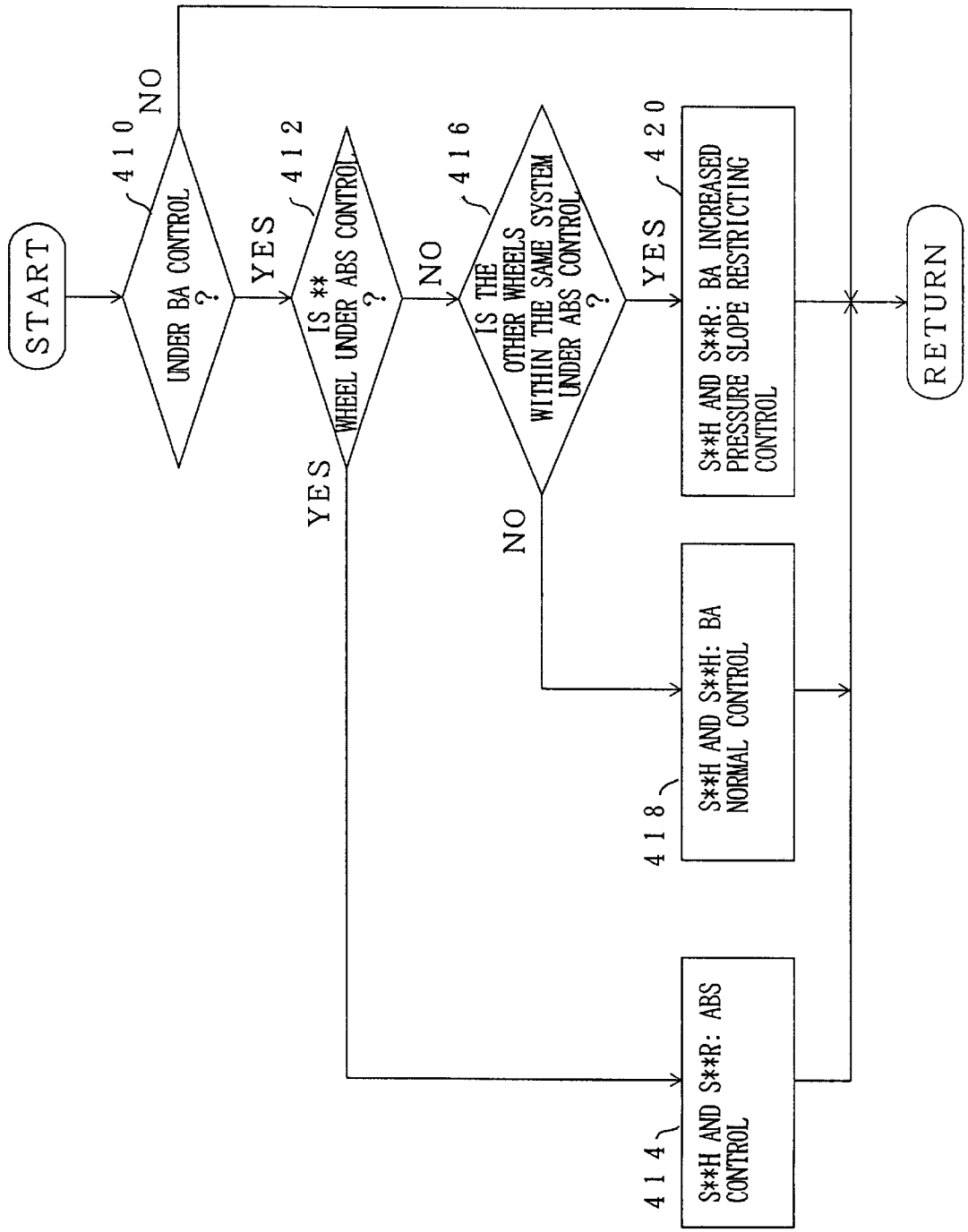
FIG. 19 is a flow chart of a control routine executed for selecting a control method of a holding solenoid and a pressure reducing solenoid in the braking force control apparatus shown in FIG. 12.

FIG. 19 shows a flow chart of an embodiment of a control method selecting routine executed by the ECU 210 so as to realize both of the BA control and the BA+ABS control mentioned above. The ECU 210 executes the routine shown in FIG. 19 with respect to each wheel. The ECU 210 selects the control method for the holding solenoids SH and the pressure reducing solenoids SR every wheels by executing the routine shown in FIG. 19. The routine shown in FIG. 19 is a fixed interrupt routine which is activated every predetermined time. When the routine shown in FIG. 19 is activated, a processing in step 410 is at first executed.

In step 410, it is determined whether or not the BA control is being executed in the braking force control apparatus. As a result, in the case that it is determined that the BA control is not being executed, the current routine is terminated without any further processings, thereafter. On the other hand, in the case that the BA control is being executed, a processing in step 412 is then executed.

In step 412, it is determined whether or not the wheel to be controlled in accordance with the present routine (hereinafter, the wheel is designated by adding a symbol ) is an ABS subject wheel. As a result, in the case that it is determined that the wheel to be controlled  is the ABS subject wheel, a processing in step 414 is then executed. On the other hand, in the case that it is determined that the wheel to be controlled ** is not the ABS subject wheel, a processing in step 416 is then executed.

In step 414, the control method for the holding solenoids SH and the pressure reducing solenoids SR provided in correspondence to the wheel to be controlled  are determined as the ABS control. The SH and the S**R in which the control method is determined as the ABS control are controlled in such a manner that (i) the pressure increasing mode, (ii) the holding mode and (iii) the pressure reducing mode can be properly realized in accordance with the slip state of the wheel to be controlled, thereafter. When the processing in step 414 is terminated, the current routine is terminated.

In step 416, it is determined whether or not the other wheels belonging to the same system as the wheel to be controlled ** are the ABS subject wheels. As a result, in the case that it is determined that the other wheels are not the ABS subject wheels, a processing in step 418 is then executed. On the other hand, in the case that it is determined that the other wheels are the ABS subject wheels, a processing in step 420 is then executed.

In step 418, the control method for the holding solenoids SH and the pressure reducing solenoids SR provided in correspondence to the wheel to be controlled  are determined as the BA control. The SH and the S**R in which the control method is determined as the BA control in step 418 are controlled in such a manner as shown in FIGS. 13 to 15 in response to the requirement of the BA control, in particular, in such a manner as to be always in the OFF-state.

When the processing in step 418 is terminated, the current routine is terminated.

In step 420, the control method for the holding solenoids SH and the pressure reducing solenoids SR provided in correspondence to the wheel to be controlled  are determined as the BA increased pressure slope restricting control. The SH and the SR in which the control method is determined as the BA control in step 420** are properly controlled in such a manner as shown in response to the requirement of the BA+ABS control, thereafter.

In particular, in the case that the assist pressure increasing ABS requirement is generated by the BA+ABS control, the holding solenoids SH is turned on and off at a predetermined duty ratio while the pressure reducing solenoids SR are maintained in the OFF-state. Further, in the case that the assist pressure holding ABS requirement is generated by the BA+ABS control, the holding solenoids SH is maintained in the ON-state and the pressure reducing solenoids SR is maintained in the OFF-state. Still further, in the case that the assist pressure reducing requirement is generated by the BA+ABS control, both of the holding solenoids SH and the pressure reducing solenoids SR are maintained in the OFF-state. When the processing in step 420 is terminated, the current routine is terminated.

As shown in FIGS. 13 to 15 mentioned above, in the case that the BA control is executed alone, that is, in the case that no ABS subject wheel exists in the front and rear systems, it is necessary to always set all of the holding solenoids SH and the pressure reducing solenoids SR to the OFF-state. Further, as shown in FIGS. 15 to 17 mentioned above, during an execution of the BA+ABS control, it is required to control the solenoids provided in correspondence to the ABS subject wheel among the holding solenoids SH and the pressure reducing solenoids SR in response to the requirement of the ABS, to always set the solenoids provided in correspondence to the ABS non-subject wheel belonging to the system in which no ABS subject wheel exists to the OFF-state, and to control the solenoids provided in correspondence to the ABS non-subject wheel belonging to the same system as the ABS subject wheel so that the above condition (c) is satisfied when the assist pressure increasing ABS requirement is generated, the above condition (e) is satisfied when the assist pressure holding ABS requirement is generated and the OFF-state is set when the assist pressure reducing ABS requirement is generated. In accordance with the control routine shown in FIG. 19, such requirements can be properly satisfied.

Figure 20:
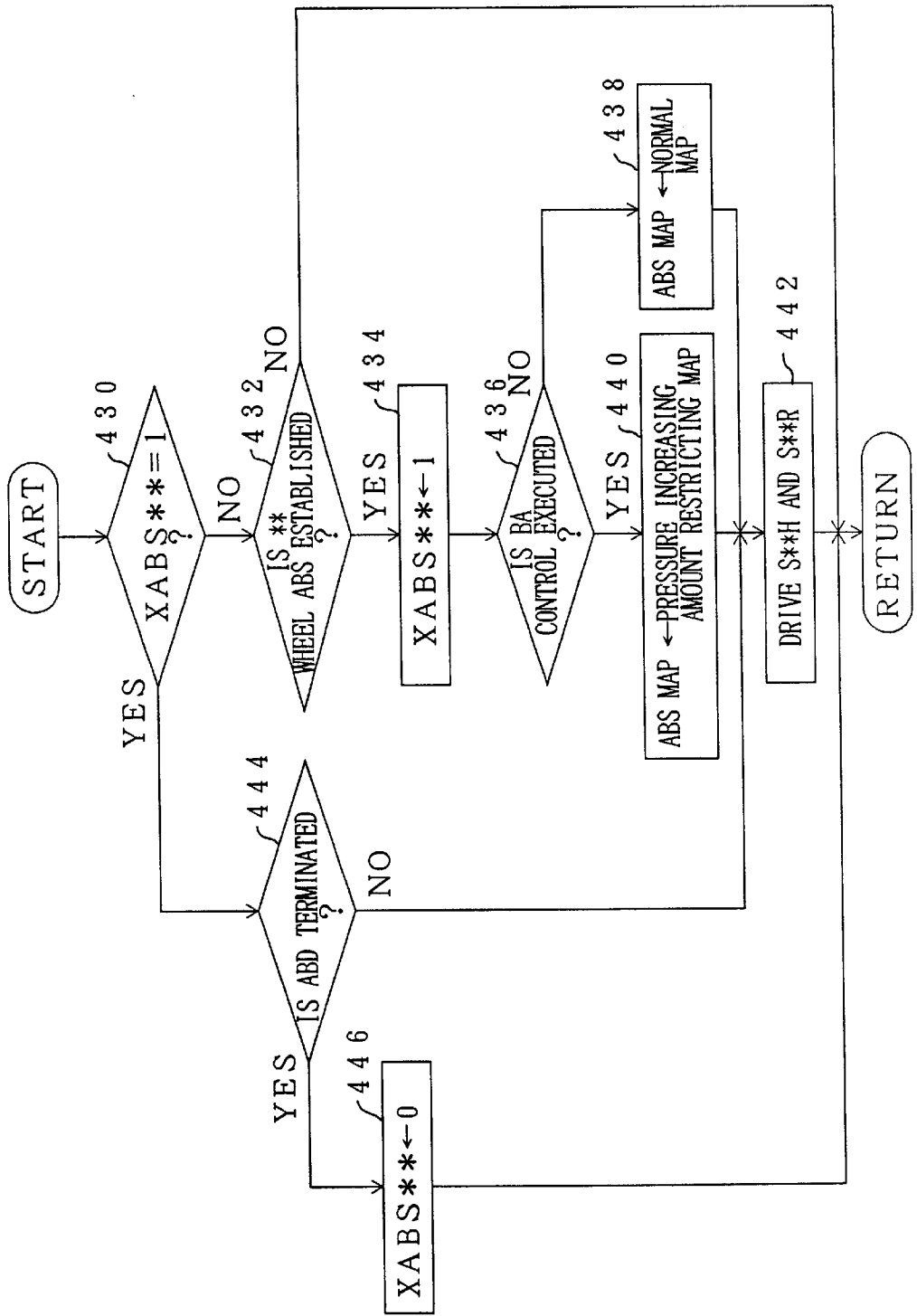
FIG. 20 is a flow chart of a control routine executed for realizing the ABS control in the braking force control apparatus shown in FIG. 12.

FIG. 20 shows a flow chart of an embodiment of the ABS control method selecting routine executed by the ECU 210 so as to set an increased pressure amount generated in the wheel cylinder pressure $P_{W/C}$ of the ABS subject wheel when (i) the pressure increasing mode is executed during an execution of the BA+ABS control, and an increased pressure amount generated in the wheel cylinder pressure $P_{W/C}$ of the ABS subject wheel when (i) the pressure increasing mode is executed in the case that the ABS control is executed alone to substantially the equivalent amount.

The ECU 210 executes the routine shown in FIG. 20 every wheels. The ECU 210 drives the holding solenoids SH and the pressure reducing solenoids SR provided in correspondence to the ABS subject wheel by executing the routine shown in FIG. 20. The routine shown in FIG. 20 is a fixed interrupt routine which is activated every predetermined time. When the routine shown in FIG. 20 is activated, a processing in step 430 is at first executed.

In step 430, it is determined whether or not a flag XABS is set to "1". The flag XABS is a flag which is set to "1" in the case that the wheel to be controlled  of the present routine is the ABS subject wheel. Accordingly, in the case that the wheel to be controlled  is not the ABS subject wheel, it is determined in step 430 that a formula XABS=1 is not established. In this case, a processing in step 432** is then executed.

In step 432, it is determined whether or not the executing condition for the ABS control is established with respect to the wheel to be controlled . As a result, in the case that it is determined that the executing condition for the ABS control is not established, the current routine is terminated without advancing the processing any more. On the other hand, in the case that the executing condition for the ABS control is established, a processing in step 434** is then executed.

In step 434, the flag XABS is set to "1" so as to express that the wheel to be controlled  is the ABS subject wheel. When the processing in step 434 is terminated, a processing in step 436 is then executed.

In step 436, it is determined whether or not the BA control is being executed. As a result, in the case that the BA control is not being executed, it can be determined that the ABS control is executed alone after the executing condition for the ABS control is established with respect to the wheel to be controlled . In this case, a processing in step 438 is then executed. On the other hand, in the case that it is determined in step 436 that the BA control is being executed, it can be determined that the BA+ABS control is executed after the executing condition for the ABS control is established with respect to the wheel to be controlled . In this case, a processing in step 440 is then executed.

In step 438, a processing for setting a normal map in the ABS map is executed. The ABS map is a map referred at a time of driving the holding solenoids SH and the pressure reducing solenoids SR in response to the requirement of the ABS control. In the normal map set as the ABS map in step 438, a driving pattern generating a proper increased pressure slope in the wheel cylinder pressure $P_{W/C}$ of the ABS subject wheel in the case that the ABS control is executed alone is set. When the processing in step 438 is terminated, a processing in step 442 is then executed.

In step 440, a processing for setting an increased pressure amount restricting map in the ABS map is executed. In the increased pressure amount restricting map, there is set a driving pattern for generating a proper increased pressure slope in the wheel cylinder pressure $P_{W/C}$ of the ABS subject wheel during an execution of the BA+ABS control, that is, a driving pattern in which a maintaining time of (i) the pressure increasing mode is shortened in comparison with the normal map. When the processing in step 440 is terminated, a processing in step 442 is then executed.

In step 442. the holding solenoids SH and the pressure reducing solenoids SR are controlled on the basis of the ABS map selected by the step 438 or 440 mentioned above and the slip state of the wheel to be controlled . (i) the pressure increasing mode, (ii) the holding mode and (iii) the pressure reducing mode are properly realized with respect to the ABS subject wheel by an execution in step 442. When the processing in step 442** is terminated, the current routine is terminated.

In the case that it is determined in step 430 mentioned above that the formula XSBS =1 is established, a processing in step 444** is then executed.

In step 444, it is determined whether or not a termination condition for the ABS control is established. As a result. in the case that it is determined that the termination condition for the ABS control is not established, the processing in step 442 mentioned above is then executed. In step 442, the holding solenoids SH and the pressure reducing solenoids SR are driven in accordance with the ABS map set before the preceding processing cycle. On the other hand, in the case that it is determined in step 444 that the termination condition for the ABS control is established, a processing in step 446 is then executed.

In step 446, a processing for setting the flag XABS to "0" is executed. When the processing in step 446 is executed, the ABS control is not executed with respect to the wheel to be controlled  until the execution condition for the ABS control is again established with respect to the wheel to be controlled **, thereafter. When the processing in step 446 is terminated, the current routine is terminated.

In accordance with the processing mentioned above, in the case that the ABS control is executed alone, it is possible to execute the ABS control by the driving pattern in accordance with the normal map with respect to each wheel. Further, in the case that the BA+ABS control is executed, it is possible to execute the ABS control by the driving pattern in accordance with the increased pressure amount restricting map in each wheel. Therefore, in accordance with the braking force control apparatus of the present embodiment, in both of the case that the ABS control Is executed alone and the case that the BA+ABS control is executed, it is possible to properly control the wheel cylinder pressure $P_{W/C}$ of the ABS subject wheel without the hunting on the control.

Figure 21:
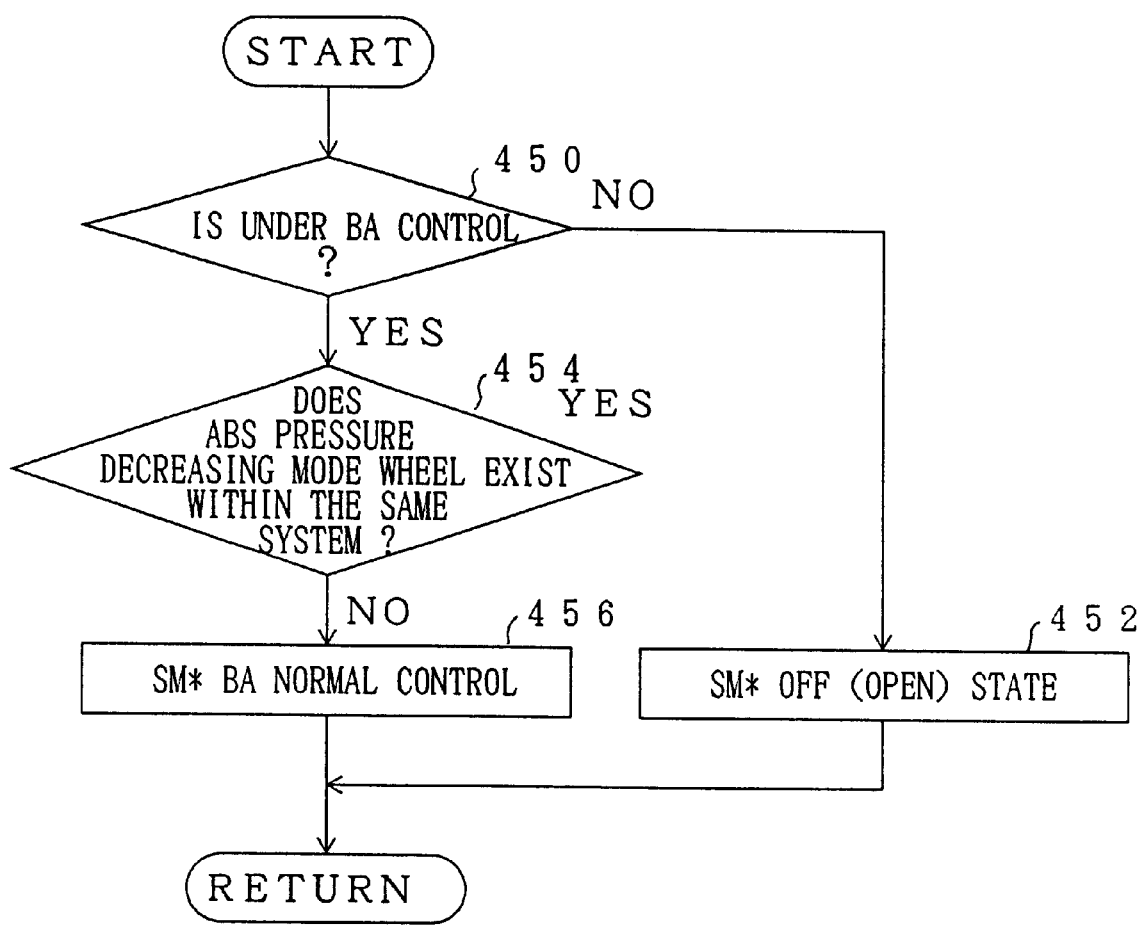
FIG. 21 is a flow chart of a control routine executed for controlling a state of a master cut solenoid in the braking force control apparatus shown in FIG. 12.

FIG. 21 shows a flow chart of an embodiment of a master cut solenoid control routine executed by the ECU 210 so as to prevent an improperly high hydraulic pressure from generating in a discharge side of a pump belonging to the system including the ABS subject wheel during an execution of the BA+ABS control. The ECU 210 executes a routine shown in FIG. 21 in each system for the front and rear wheels. The ECU 210 executes the routine shown in FIG. 21, thereby driving the master cut solenoids SMFR 242, SMFL 244 and SMR 246 (hereinafter, they are referred to as a master cut solenoids SM** as a whole) belonging to the system having the ABS subject wheel. The routine shown in FIG. 21 is a fixed interrupt routine which is activated at each predetermined time. When the routine shown in FIG. 21 is activated, a processing in step 450 is at first executed.

In step 450, it is determined whether or not the BA control is being executed. As a result, in the case that it is determined that the BA control is being executed, a processing in step 452 is then executed. On the other hand, in the case that it is determined that the BA control is not being executed, a processing in step 454 is then executed.

In step 452, a processing for setting the master cut solenoids SM** belonging to the system to be controlled by the present routine to the OFF-state (valve-opened state) is executed. When the processing in step 452 is terminated, the current routine is terminated.

In step 454, it is determined whether or not the wheel in which (iii) the pressure reducing mode is realized in response to the requirement of the ABS control exists in the system to be controlled by the present routine. As a result, in the case that it is determined that the wheel in which (iii) the pressure reducing mode is realized does not exist, a processing in step 456 is then executed.

In step 456, the master cut solenoids SM belonging to the system to be controlled by the present routine is controlled in the same manner as that at the BA control. In particular, it is controlled in the ON-state (valve-closed state) in the case that the pressure increasing or the holding of the wheel cylinder pressure $P_{W/C}$ is required by the BA control, and it is controlled in the OFF-state (valve-opened state) in the case that the pressure reducing of the wheel cylinder pressure $P_{W/C}$ is required by the BA control (refer to the SM in FIGS. 13 to 15 and the SMR 246 in FIGS. 16 and 17). When the processing in step 456 is terminated, the current routine is terminated.

On the other hand, in the case that it is determined that the wheel set as (ii) the pressure reducing mode exists in the system to be controlled, the processing in step 452 mentioned above, that is, the processing for setting the master cut solenoids SM** belonging to the system to the OFF-state is executed.

In accordance with the processing mentioned above, in the case that (iii) the pressure reducing mode is executed in the ABS subject wheel during an execution of the BA+ABS control, that is, in the case that the pump belonging to the same system as that of the ABS subject wheel pressurizes and feeds the brake fluid, the discharge side of the pump and the master cylinder 218 are always set in the conductive state. In this case, since the brake fluid discharged from the pump can flow into the master cylinder 218, an improperly high hydraulic pressure is not generated in the discharge side of the pump in spite that the brake fluid discharged from the pump can not flow into the wheel cylinder of the ABS subject wheel. Therefore, in accordance with the braking force control apparatus of the present embodiment, the hunting on the control is not generated in the ABS subject wheel, and it is possible to securely prevent the wheel cylinder pressure $P_{W/C}$ of the ABS non-subject wheel belonging to the same system as that of the ABS subject wheel from being increased in accordance with an excessive increased pressure slope.

Here, in the embodiment mentioned above, it is structured such that only in the case that (iii) the pressure reducing mode is executed in the ABS subject wheel during an execution of the BA+ABS control, the master cut solenoid SM belonging to the same system as that of the wheel is set to the valve-opened state, however, the present invention is not limited to this, and it may be structured such that the master cut solenoids SM are always set in the valve-opened state during an execution of the BA+ABS control.

Here, in the embodiment mentioned above, the master cylinder 218 corresponds to "operation hydraulic pressure generating means", the front pump 310 and the rear pump 312 correspond to "assist pressure generating means", the hydraulic pressure passages 248, 250 and 252 correspond to "a high pressure passage", the master cut solenoids SM correspond to "operation hydraulic pressure cut mechanism", the front pressure reducing passage 298 and the rear pressure reducing passage 300 correspond to "low pressure passage", the holding solenoids SH and the pressure reducing solenoids S**R correspond to conductive state control mechanism, the front reservoir 302 and the rear reservoir 304 respectively correspond to "low pressure source" and "second low pressure source", and the reservoir tank 224 corresponds to "first low pressure source", respectively.

Further, in the embodiment mentioned above, the ECU 210 executes the routine shown in FIG. 20, whereby "ABS control means" and "ABS pattern selecting means" are realized, the ECU 210 executes the routine shown in FIG. 19, whereby "BA increased pressure slope restricting means" is realized, and the ECU 210 executes the routine shown in FIG. 18, whereby "low pressure source cutting means" is realized, respectively.

Further, in the embodiment mentioned above, the ECU 210 always sets the master cut solenoids SM** in the OFF-state (valve-opened state) during an execution of the BA+ABS control, whereby "high pressure passage releasing means" is realized.

Figure 22:
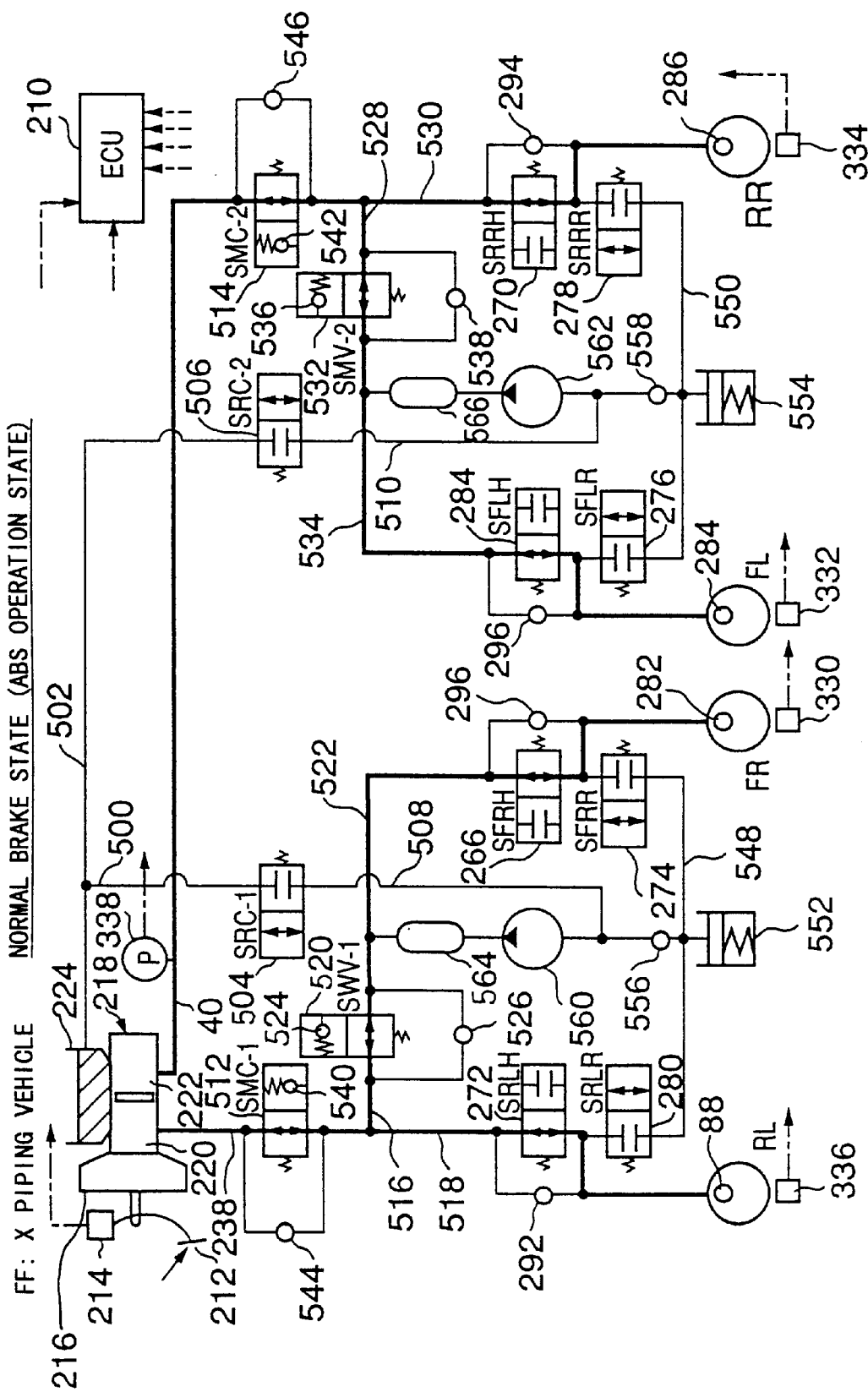
FIG. 22 is a system configuration diagram showing a normal braking state and an ABS operation state of a braking force control apparatus in accordance with a fifth embodiment of the present invention.

Next, a fifth embodiment in accordance with the present invention will be mentioned below with reference to FIGS. 22 to 27. FIG. 22 shows a system configuration diagram of a braking force control apparatus of a pump-up type (hereinafter, simply refer to as a braking force control apparatus) corresponding to the fifth embodiment in accordance with the present invention. Here, in FIG. 22, the same reference numerals are attached to the same elements as those shown in FIG. 12, and an explanation thereof will be omitted or simply given.

The braking force control apparatus of the present embodiment corresponds to an apparatus suitable for a braking force control apparatus for a front engine and front drive type vehicle (FF vehicle). The braking force control apparatus of the present embodiment is controlled by the ECU 210. The ECU 210 controls an operation of the braking force control apparatus by executing a control routine shown in FIGS. 18 to 21 in the same manner as the case of the above fourth embodiment mentioned above with setting reservoir cut solenoids $SRC_{-1}$ and $SRC_{-2}$ mentioned above to the SRC* in steps 404 and 406 mentioned above and setting master cut solenoids $SMC_{-1}$ 512 and $SMC_{-2}$ 514 mentioned below to the SM** in steps 452 and 456 mentioned above.

The braking force control apparatus is provided with a brake pedal 212. A brake switch 214 is arranged in the vicinity of the brake pedal 212. The ECU 210 determines whether or not the brake pedal 212 is stepped down on the basis of the output signal from the brake switch 214.

The brake pedal 212 is connected to a vacuum booster 216. Further, the vacuum booster 216 is fixed to the master cylinder 218. The first hydraulic chamber 220 and the second hydraulic chamber 222 are formed within the master cylinder 218. A master cylinder pressure $P_{M/C}$ corresponding to a resultant force of the brake pedaling force F and the assist force Fa generated by the vacuum booster 216 is generated within the first hydraulic chamber 220 and the second hydraulic chamber 222.

The reservoir tank 224 is arranged in an upper portion of the master cylinder 218. A first reservoir passage 500 and a second reservoir passage 502 are communicated with the reservoir tank 224. A first reservoir cut solenoid 504 (hereinafter, refer to as an $SRC_{-1}$ 504) is communicated with the first reservoir passage 500. Similarly, a second reservoir cut solenoid 506 (hereinafter, refer to as an $SRC_{-2}$ 506) is communicated with the second reservoir passage 502.

A first pump passage 508 is further communicated with the $SRC_{-1}$ 504. Similarly, a second pump passage 510 is communicated with the $SRC_{-2}$ 506. The $SRC_{-1}$ 504 is a two-positional solenoid valve structured such as to shut off the first reservoir passage 500 and the first pump passage 508 by being set to the OFF-state and conduct them by being set to the ON-state. Further, the $SRC_{-2}$ 506 is a two-positional solenoid valve structured such as to shut off the second reservoir passage 502 and the second pump passage 510 by being set to the OFF-state and conduct them by being set to the ON-state.

A first hydraulic pressure passage 238 and a second hydraulic pressure passage 240 are respectively communicated with the first hydraulic chamber 218 and the second hydraulic chamber 220 of the master cylinder 218. A first master cut solenoid 512 (hereinafter, refer to as an $SMC_{-1}$ 512) is communicated with the first hydraulic pressure passage 238. On the other hand, a second master cut solenoid 514 (hereinafter, refer to as an $SMC_{-2}$ 514) is communicated with the second hydraulic pressure passage 240.

A first pump pressure passage 516 and a hydraulic pressure passage 518 provided in correspondence to the rear left wheel RL are communicated with the $SMC_{-1}$ 512. A first pump solenoid 520 (hereinafter, refer to as an $SMV_{-1}$ 520) is communicated with the first pump pressure passage 516. Further, a hydraulic pressure passage 522 provided in correspondence to the front right wheel FR is communicated with the $SMV_{-1}$ 520. A constant pressure releasing valve 524 is provided within the $SMV_{-1}$ 520. The $SMV_{-1}$ 520 is a two-positional solenoid valve structured such as to set the first pump pressure passage 516 and the hydraulic pressure passage 522 in the conductive state by being set to the OFF-state and communicate them via the constant pressure releasing valve 524 by being set to the ON-state. Further, a check valve 526 for enabling only a flow of a fluid toward the hydraulic pressure passage 522 from the side of the first pump pressure passage 516 is arranged between the first pump pressure passage 516 and the hydraulic pressure passage 522.

A second pump pressure passage 528 and a hydraulic pressure passage 530 provided in correspondence to the rear right wheel RR are communicated with the $SMC_{-2}$ 514. A second pump solenoid 532 (hereinafter, refer to as an $SMV_{-2}$ 532) is communicated with the second pump pressure passage 528. A hydraulic pressure passage 534 provided in correspondence to the front left wheel FL is further communicated with the $SMV_{-2}$ 532. A constant pressure releasing valve 536 is provided within the $SMV_{-2}$ 532. The $SMV_{-2}$ 532 is a two-positional solenoid valve structured such as to set the second pump pressure passage 528 and the hydraulic pressure passage 534 in the conductive state by being set to the OFF-state and communicate them via the constant pressure releasing valve 536 by being set to the ON-state. A check valve 538 for enabling only a flow of a fluid toward the side of the hydraulic pressure passage 536 from the side of the second pump pressure passage 528 is arranged between the first pump pressure passage 528 and the hydraulic pressure passage 534.

A constant pressure releasing valves 540 and 542 are provided within the $SMC_{-1}$ 512 and $SMC_{-2}$ 514. The $SMC_{-1}$ 512 is a two-positional solenoid valve structured such as to make the first hydraulic pressure passage 238 and the hydraulic pressure passage 518 (and the first pump pressure passage 516) in the conductive state by being set to the OFF-state and communicate them via the constant pressure releasing valve 540 by being set to the ON-state. Further, the $SMC_{-2}$ is a two-positional solenoid valve structured such as to set the second hydraulic pressure passage 240 and the hydraulic pressure passage 530 (and the second pump pressure passage 528) in the conductive state by being set to the OFF-state and communicate them via the constant pressure releasing valve 542 by being set to the ON-state A check valve 544 for enabling only a flow of a fluid toward the side of the hydraulic pressure passage 518 from the side of the first hydraulic pressure passage 238 is arranged between the first hydraulic pressure passage 238 and the hydraulic pressure passage 518. Similarly, a check valve 546 for enabling only a flow of a fluid toward the side of the hydraulic pressure passage 530 from the side of the second hydraulic pressure passage 240 is arranged between the second hydraulic pressure passage 240 and the hydraulic pressure passage 530.

The holding solenoids SH, the pressure reducing solenoids SR, the wheel cylinders 282 to 288 and the check valves 290 to 296 are communicated with four hydraulic pressure passages 516, 522, 528 and 534 provided in correspondence to the front left and right wheels and the rear left and right wheels in the same manner as that of the fourth and fifth embodiments. Further, a first pressure reducing passage 548 is communicated with the pressure reducing solenoids SFRR 274 and SRLR 280 in the front right wheel FR and the rear left wheel RL. Further, a second pressure reducing passage 550 is communicated with the pressure reducing solenoids SFLR 276 and SRRR 278 in the front left wheel FL and the rear right wheel RR.

A first reservoir 552 and a second reservoir 554 are respectively communicated with the first pressure reducing passage 548 and the second pressure reducing passage 550. Further, the first reservoir 552 and the second reservoir 554 are respectively communicated with a suction side of the first pump 560 and a suction side of the second pump 562 via the respective check valves 556 and 558. A discharge side of the first pump 560 and a discharge side of the second pump 562 are communicated with dampers 564 and 566 for absorbing a pulsation of the discharged pressure. The dampers 564 and 566 are respectively communicated with the hydraulic pressure passages 522 and 534.

The wheel speed sensors 330, 332, 334 and 336 are arranged in the vicinity of each wheel. The ECU 210 detects a revolution speed Vw of each wheel on the basis of the output signal from the wheel speed sensors 330 to 336. Further, the hydraulic pressure sensor 338 is arranged in the second hydraulic pressure passage 240 communicated with the master cylinder 218. The ECU 210 detects the master cylinder pressure $P_{M/C}$ on the basis of the output signal from the hydraulic pressure sensor 338.

Next, an operation of the braking force control apparatus of the present embodiment will be mentioned below. The braking force control apparatus of the present embodiment realizes 1̂ a normal brake function, 2̂ an ABS function and 3̂ a BA function by switching a state of various kinds of solenoid valves arranged within a hydraulic pressure circuit.

1̂ the normal brake function can be realized, as shown in FIG. 22, by setting all the solenoid valves provided in the braking force control apparatus in the OFF-state. Hereinafter, the state shown in FIG. 22 is referred to as a normal brake state. Further, a control for realizing the normal brake function in the braking force control apparatus is referred to as a normal brake control.

In the normal brake state shown in FIG. 22, the wheel cylinder 282 of the front right wheel FR and the wheel cylinder 288 of the rear left wheel RL are both communicated with the first hydraulic chamber 220 of the master cylinder 218 via the first hydraulic pressure passage 238. Further, the wheel cylinders 284 of the front left wheel FL and the wheel cylinder 286 of the rear right wheel RR are both communicated with the second hydraulic chamber 222 of the master cylinder 218 via the second hydraulic pressure passage 240. In this case, the wheel cylinder pressure $P_{W/C}$ of the wheel cylinders 282 to 288 is always controlled to be equal to the master cylinder pressure $P_{M/C}$. Accordingly, in the state shown in FIG. 22, the normal brake function can be realized.

2̂ the ABS function can be realized by setting the first pump 560 and the second pump 562 in the ON-state and suitably driving the holding solenoids SH and the pressure reducing solenoids SR in response to the requirement of the ABS, in a state shown in FIG. 22. Hereinafter, a control for realizing the ABS function in the braking force control apparatus is referred to as an ABS control.

During an execution of the ABS control, the high master cylinder pressure $P_{M/C}$ is introduced to all of four hydraulic pressure passages 518, 522, 528, 530 and 534 provided in correspondence to the front left and right wheels and the rear left and right wheels. Accordingly, under the above situation, when the holding solenoids SH is set in the valve-opened state and the pressure reducing solenoids SR is set in the valve-closed state, the wheel cylinder pressure $P_{W/C}$ of each wheel can be Increased. Hereinafter, the state is referred to as (i) a pressure increasing mode.

Further, the wheel cylinder pressure $P_{W/C}$ of each wheel can be held by setting both of the holding solenoids SH and the pressure reducing solenoids SR in the valve-closed state during the ABS control. Hereinafter, this state is referred to as (ii) a holding mode. Further, the wheel cylinder pressure $P_{W/C}$ of each wheel can be reduced by setting the holding solenoids SH in the valve-closed state during the ABS control and setting the pressure reducing solenoids SR in the valve-opened state. Hereinafter, this state is referred to as (iii) a pressure reducing mode.

The ECU 210 controls the holding solenoids SH and the pressure reducing solenoids SR in accordance with a slip state of each wheel during an execution of the ABS control so that (i) the pressure increasing mode, (ii) the holding mode and (iii) the pressure reducing mode can be suitably realized at each wheel. When the holding solenoids SH and the pressure reducing solenoids SR are controlled in the above manner, the wheel cylinder pressures $P_{W/C}$ of all the wheels are controlled to a suitable pressure which does not generate an excess slip ratio in the corresponding wheels. As mentioned above, in accordance with the above control, the ABS function can be realized in the braking force control apparatus.

When the pressure reducing mode is executed in each wheel during an execution of the ABS control, the brake fluid within the wheel cylinders 282 to 288 is flowed into the first reservoir 552 and the second reservoir 554 through the first pressure reducing passage 548 and the second pressure reducing passage 550. The brake fluid flowing into the first reservoir 552 and the second reservoir 554 is pumped up to the first pump 560 and the second pump 562 so as to be supplied to the hydraulic pressure passages 522 and 534.

A part of the brake fluid supplied to the hydraulic pressure passages 522 and 534 flows into the wheel cylinders 282 to 288 when (i) the pressure increasing mode is executed in each wheel. Further, the remainder of the brake fluid flows into the master cylinder 218 for compensating the flowing-out portion of the brake fluid. Therefore, in accordance with the system of the present embodiment, no excessive stroke is generated in the brake pedal 212 during an execution of the ABS control.

3̂ the BA function can be realized in accordance that the ECU 210 controls the braking force control apparatus so that (I) a start pressure increasing mode, (II) an assist pressure increasing mode, (III) an assist pressure reducing mode, (IV) an assist pressure holding mode, (V) an assist pressure gradual increasing mode and (VI) an assist pressure gradual reducing mode are suitably realized after an emergency braking operation is executed by a driver, in the same manner as that of the case of the fourth embodiment mentioned above. Hereinafter, a control for realizing the BA function in the braking force control apparatus is referred to as a BA control.

Figure 23:
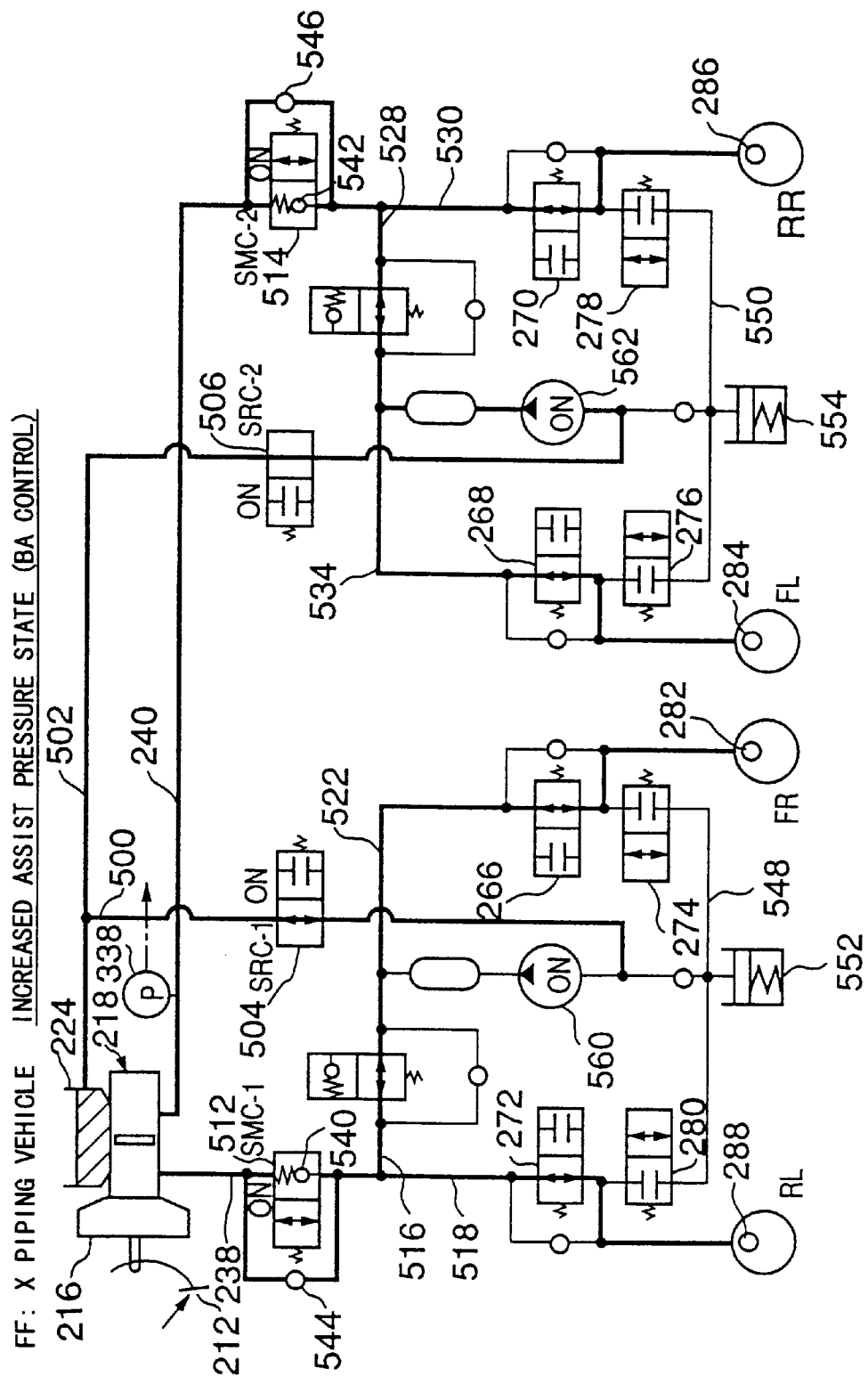
FIG. 23 is a diagram showing an increased assist pressure state realized during a BA control in the braking force control apparatus shown in FIG. 22.

FIG. 23 shows an increased assist pressure state realized during an execution of the BA control. The increased assist pressure state can be realized in the case that it is required to increase the wheel cylinder pressure $P_{W/C}$ in each wheel during an execution of the BA control, that is, an execution of (I) the start pressure increasing mode, (II) the assist pressure increasing mode and (III) the assist pressure gradual increasing mode is required during an execution of the BA control.

In the system of the present embodiment, the increased assist pressure state during the BA control can be realized, as shown In FIG. 23, by setting the reservoir cut solenoids $SRC_{-1}$ 504 and $SRC_{-2}$ 506 and the master cut solenoids $SMC_{-1}$ 512 and $SMC_{-2}$ 514 in the ON-state and setting the first pump 560 and the second pump 562 in the ON-state.

When the increased assist pressure state is realized during an execution of the BA control, the brake fluid stored in the reservoir tank 224 is pumped up to the first pump 560 and the second pump 562 and supplied to the hydraulic pressure passages 522 and 534. In the increased assist pressure state, the hydraulic pressure passage 522 and the wheel cylinder 282 of the front right wheel FR and the wheel cylinder 288 of the rear left wheel RL are maintained in the conductive state. Further, in the increased assist pressure state, the flow of the fluid from the side of the hydraulic pressure passages 522 into the master cylinder 218 is restricted by the $SMC_{-1}$ 512 until the pressure in the side of the hydraulic pressure passage 522 is over the releasing valve pressure of the constant pressure opening valve 540 to a pressure higher than the master cylinder pressure $P_{M/C}$.

Similarly, in the increased assist pressure state, the hydraulic pressure passage 534 and the wheel cylinder 284 of the front left wheel FL and the wheel cylinder 286 of the rear right wheel RR are maintained in the conductive state, and the flow of the fluid from the side of the hydraulic pressure passages 534 into the side of the master cylinder 218 is restricted by the $SMC_{-2}$ 514 until the internal pressure in the side of the hydraulic pressure passage 534 is over the releasing valve pressure of the constant pressure opening valve 542 to a pressure higher than the master cylinder pressure $P_{M/C}$.

Accordingly, when the increased assist pressure state shown in FIG. 23 is realized, the wheel cylinder pressure $P_{W/C}$ in each wheel is quickly increased to a pressure over the master cylinder pressure $P_{M/C}$ by serving the first pump 560 or the second pump 562 as a hydraulic pressure source. As mentioned above, in accordance with the increased assist pressure state shown in FIG. 23, it is possible to quickly raise the braking force.

In the increased assist pressure state shown in FIG. 23, the hydraulic pressure passages 518, 522, 534 and 530 are communicated with the master cylinder 218 via the check valves 544 and 546. Accordingly, in the case that the master cylinder pressure $P_{M/C}$ is greater than the wheel cylinder pressure $P_{W/C}$ in each wheel, the wheel cylinder pressure $P_{W/C}$ can be increased by serving the master cylinder 218 as a hydraulic pressure source even in the BA operation state.

Figure 24:
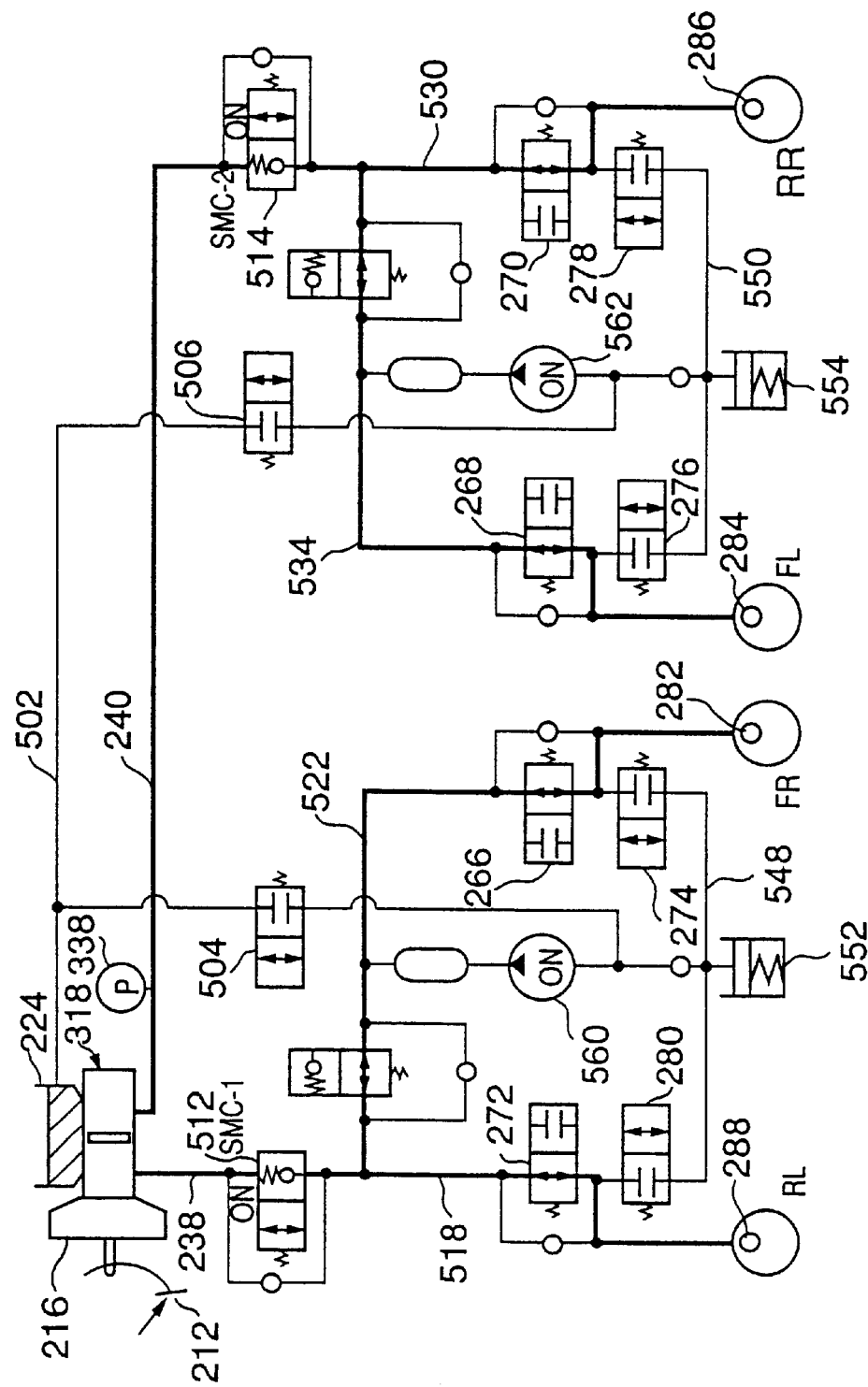
FIG. 24 is a diagram showing a held assist pressure state realized during the BA control in the braking force control apparatus shown in FIG. 22.

FIG. 24 shows a held assist pressure state realized during an execution of the BA control. The held assist pressure state is realized in the case that it is necessary to hold the wheel cylinder pressure $P_{W/C}$ in each wheel during an execution of the BA control, that is, in the case that (IV) the assist pressure holding mode is required during the BA control. The held assist pressure state can be realized, as shown in FIG. 24, by setting the master cut solenoids $SMC_{-1}$ 512 and $SMC_{-2}$ 514 in the ON-state and setting the first pump 560 and the second pump 562 in the ON-state.

In the held assist pressure state shown in FIG. 24, the first pump 560 and the reservoir tank 224, and the second pump 562 and the reservoir tank 224 are respectively made in the shut-off state by the $SRC_{-1}$ 504 and $SRC_{-2}$ 506. Accordingly, in the held assist pressure state, the fluid is not discharged to the hydraulic pressure passages 522 and 534 from the first pump 560 and the second pump 562. Further, in the held assist pressure state shown in FIG. 24, the hydraulic pressure passages 518 and 522 and the hydraulis pressure passages 530 and 534 are substantially separated from the master cylinder 218 by the $SMC_{-1}$ 512 and $SMC_{-2}$ 514. Therefore, in accordance with the held assist pressure state shown in FIG. 24, it is possible to hold the wheel cylinder pressure $P_{W/C}$ in all of the wheels to a constant value.

Figure 25:
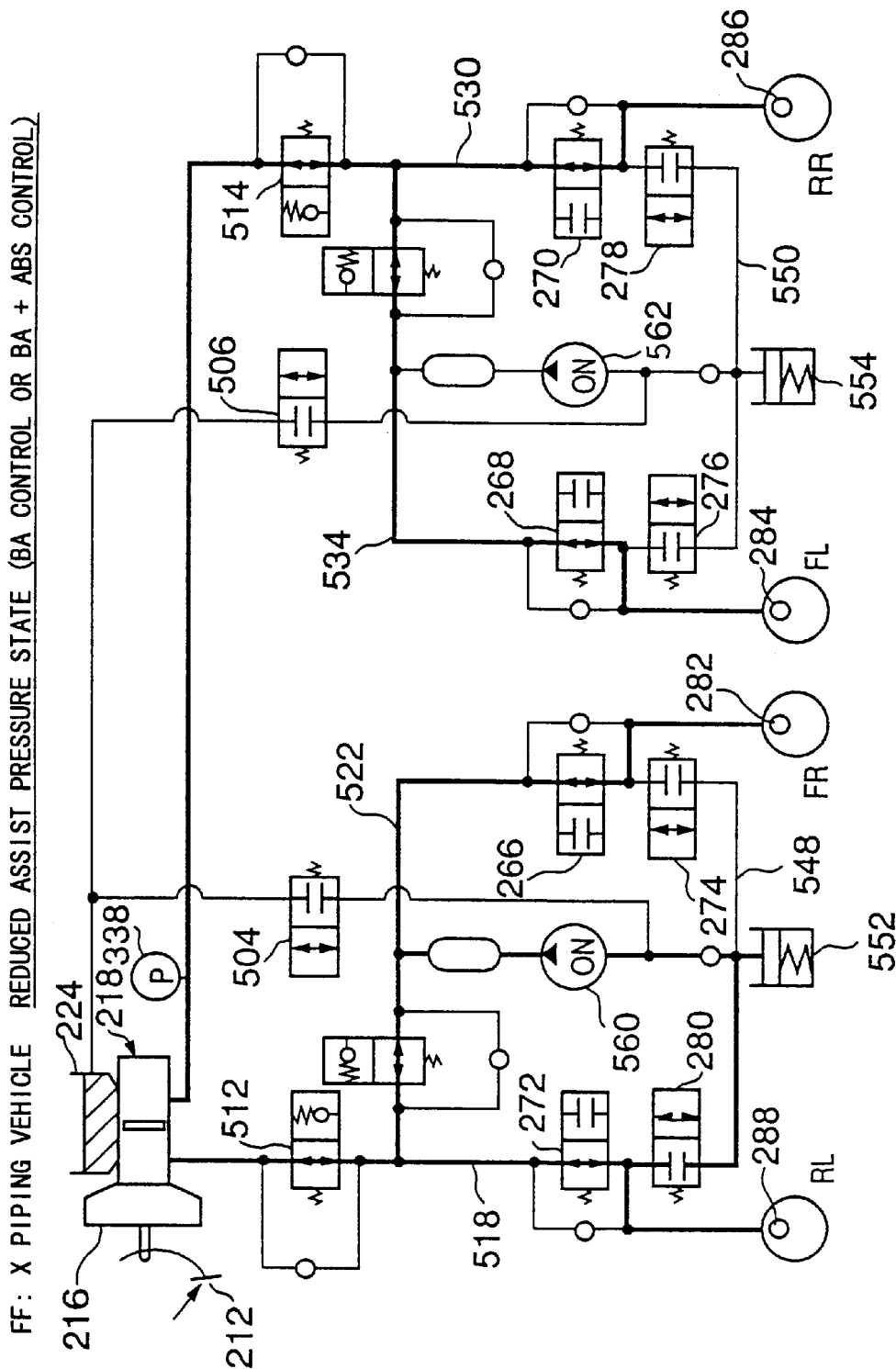
FIG. 25 is a diagram showing a reduced assist pressure state realized during the BA control or a BA +ABS control in the braking force control apparatus shown in FIG. 22.

FIG. 25 shows a reduced assist pressure state realized during an execution of the BA control. The reduced assist pressure state is realized in the case that it is necessary to reduce the wheel cylinder pressure $P_{W/C}$ in each wheel during an execution of the BA control, that is, in the case that an execution of (III) the assist pressure reducing mode and (VI) the assist pressure gradual reducing mode is required during the BA control. The reduced assist pressure state can be realized, as shown in FIG. 25, by setting the first pump 560 and the second pump 562 in the ON-state.

In the reduced assist pressure state as shown in FIG. 25, the first pump 560 and the second pump 562 are separated from the reservoir tank 224. Accordingly, the fluid is not discharged to the hydraulic pressure passages 522 and 534 from the first pump 560 and the second pump 562. Further, in the reduced assist pressure state, the wheel cylinders 282 to 288 in each wheel and the master cylinder 218 are in the conductive state. Accordingly, when the reduced assist pressure state is realized, it is possible to reduce the wheel cylinder pressure $P_{W/C}$ in all the wheels by setting the master cylinder pressure $P_{M/C}$ to be a lower limit value.

As mentioned above, in accordance with the increased assist pressure state, the held assist pressure state and the reduced assist pressure state shown in FIGS. 23 to 25, it is possible to properly intend to increase, hold and reduced the wheel cylinder pressure $P_{W/C}$ in response to the requirement of the BA control. Therefore, also in accordance with the braking force control apparatus of the present embodiment, it is possible to realize the BA function in the same manner as that of the case of the fourth embodiment mentioned above.

In the braking force control apparatus of the present embodiment, when the BA control mentioned above is started, there is a case that an excessive slip ratio is generated in any one of the wheels due to a quick pressure increase of the wheel cylinder pressure $P_{W/C}$ in each wheel. The ECU 210 starts the BA+ABS control in such a case. A description will be given of an operation of the braking force control apparatus together with an execution of the BA+ABS control with reference to FIGS. 26 and 27 in addition to FIGS. 23 to 25.

In the braking force control apparatus of the present embodiment, in the case that the braking operation intending a pressure reduction of the braking force is executed by a driver during an execution of the BA+ABS control, it is required to reduce the wheel cylinder pressure $P_{W/C}$ of the ABS non-subject wheel toward the master cylinder pressure $P_{M/C}$ while controlling the wheel cylinder pressure $P_{W/C}$ of the ABS subject wheel to a pressure in response to the requirement of the ABS control. Hereinafter, this requirement is referred to as an assist pressure reducing ABS requirement.

The assist pressure reducing ABS requirement can be realized by suitably controlling the solenoids corresponding to the ABS subject wheel among the holding solenoids SH and the pressure reducing solenoids SR in response to the requirement of the ABS control while realizing the reduced assist pressure state shown in FIG. 25. Hereinafter, a state in which the control mentioned above is executed in the braking force control apparatus is referred to as an assist pressure reducing ABS state.

The assist pressure reducing ABS requirement is generated in the case that a driver intends to reduce the braking force, that is, it is not required to Increase the wheel cylinder pressure $P_{W/C}$ in any one of the wheels. Accordingly, under the situation in which the assist pressure reducing ABS requirement is generated, it is necessary to hold and reduce the wheel cylinder pressure $P_{W/C}$ of the ABS subject wheel while reducing the wheel cylinder pressure $P_{W/C}$ of the ABS non-subject wheel.

In the assist pressure reducing ABS state mentioned above, all of the holding solenoids S**H are communicated with the master cylinder 218. Therefore, in accordance with the assist pressure reducing ABS state, it is possible to properly reduce the wheel cylinder pressure $P_{W/C}$ of the ABS non-subject wheel toward the master cylinder pressure $P_{W/C}$. Further, under the situation mentioned above, when (i) the holding mode or (iii) the pressure reducing mode is realized with respect to the ABS subject wheel it is possible to hold or reduce the wheel cylinder pressure $P_{W/C}$ of the ABS subject wheel. As mentioned above, in accordance with the assist pressure reducing ABS state, it is possible to properly realize the function to be realized when the assist pressure reducing ABS requirement is generated.

In the braking force control apparatus of the present embodiment, in the case that the braking operation intending to increase the braking force is executed by a driver during an execution of the BA+ABS control, a requirement for increasing the wheel cylinder pressure $P_{W/C}$ of the ABS non-subject wheel in a range over the master cylinder pressure $P_{M/C}$ while controlling the wheel cylinder pressure $P_{W/C}$ of the ABS subject wheel to a pressure in response to the requirement of the ABS control is generated. Hereinafter, this requirement is referred to as an assist pressure increasing ABS requirement.

The assist pressure increasing ABS requirement can be also realized by controlling the solenoids corresponding to the ABS subject wheel among the holding solenoids SH and the pressure reducing solenoids SR in response to the requirement of the ABS control while realizing the increased assist pressure state shown in FIG. 23 mentioned above. That is, for example, in the case that the rear left wheel RL is the ABS subject wheel, it is possible to control the wheel cylinder pressure $P_{W/C}$ of the rear left wheel RL to a pressure in response to the requirement of the ABS control and increase the wheel cylinder pressure $P_{W/C}$ of the other wheels FL, FR and RL in a region higher than the master cylinder pressure $P_{M/C}$ by realizing the increased assist pressure state shown in FIG. 23 and controlling the SRLH 272 and the SRLR 280 in response to the requirement of the ABS control.

However, when the ABS control is started with respect to the rear left wheel RL, the holding solenoid SRLH 272 corresponding to the rear left wheel RL is made in the valve-closed state except a little time at which (i) the pressure increasing mode is executed with respect to the rear left wheel RL thereafter. Accordingly, after the ABS control is started with respect to the rear left wheel RL, almost all of the brake fluid discharged from the first pump 560 flows into the wheel cylinder 282 of the front right wheel FR corresponding to the ABS non-subject wheel.

The discharging capacity of the first pump 560 is set such as to simultaneously increase the wheel cylinder pressure $P_{W/C}$ of the front right wheel FR and the wheel cylinder pressure $P_{W/C}$ of the rear left wheel RL in accordance with a proper increased pressure slope. Accordingly, under the situation in which almost all of the brake fluid discharged from the first pump 560 flows into the wheel cylinder 282 of the front right wheel FR corresponding to the ABS non-subject wheel, an excessive increased pressure slope is generated in the wheel cylinder pressure $P_{W/C}$ of the front right wheel FR.

Further, under the situation in which an excessive increased pressure slope is generated in the wheel cylinder pressure $P_{W/C}$ of the front right wheel FR as mentioned above, there is formed a case that the wheel cylinder pressure $P_{W/C}$ of the rear left wheel RL is excessively increased when (i) the pressure increasing mode is executed with respect to the rear left wheel RL, that is, a case that a hunting is easily generated in the ABS control.

In this point, the method for satisfying the assist pressure increasing ABS requirement by realizing the increased assist pressure state shown in FIG. 23 and controlling the solenoids corresponding to the ABS subject wheel among the holding solenoids SH and the pressure reducing solenoids SR in response to the requirement of the ABS control is not always an optimum method as a method for realizing the BA+ABS control in the braking force control apparatus of the present embodiment.

Figure 26:
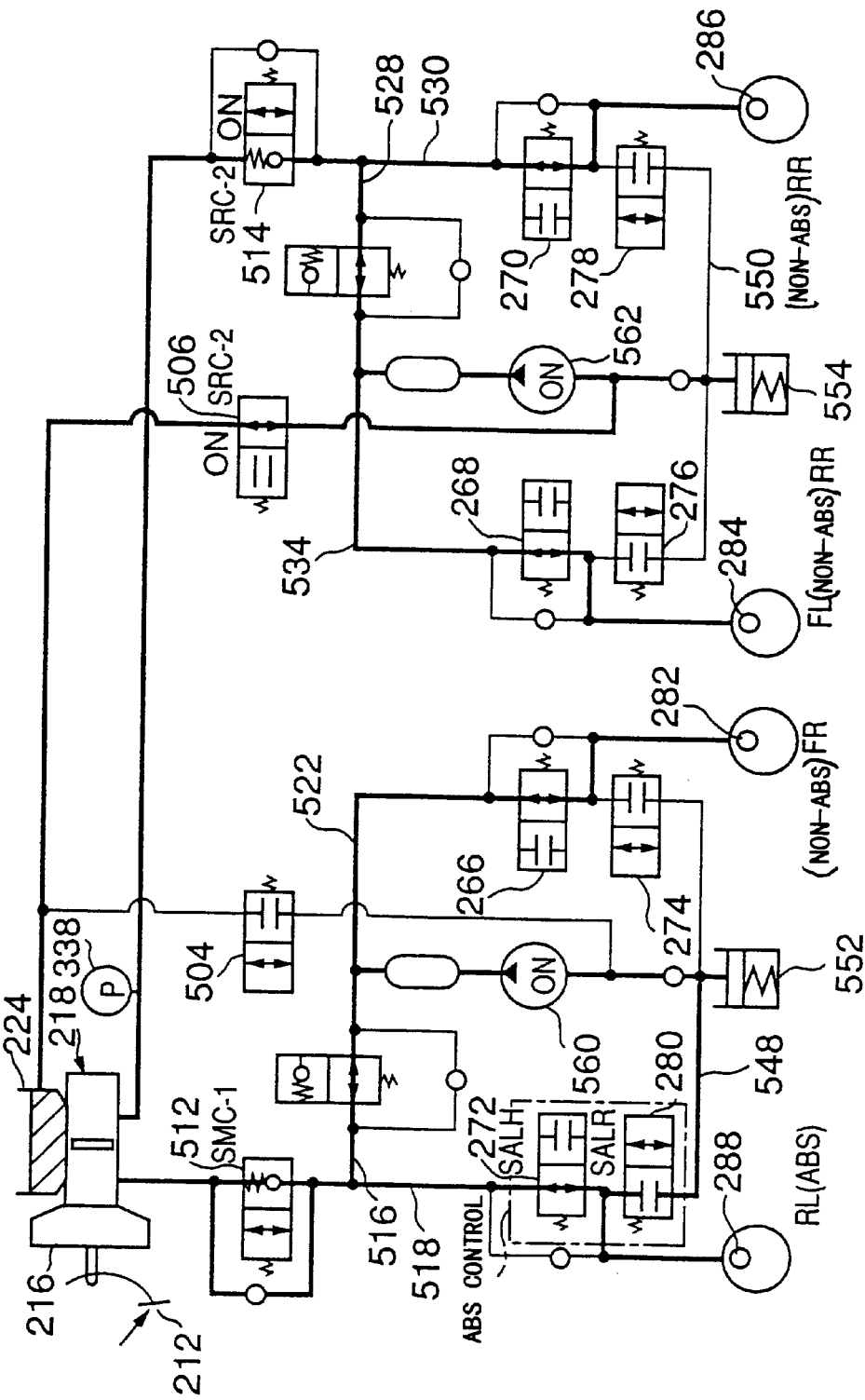
FIG. 26 is a diagram showing an increased assist pressure state realized during the BA+ABS control in the braking force control apparatus shown in FIG. 22.

FIG. 26 shows an embodiment of a state realized in the braking force control apparatus in the case that the assist pressure increasing ABS requirement setting the rear left wheel RL as the ABS subject wheel is generated (hereinafter, refer to as an assist pressure increasing ABS state). The assist pressure increasing ABS state setting the rear left wheel RL as the ABS subject wheel can be realized by controlling the braking force control apparatus so that conditions (a) to (d) mentioned below are satisfied.

(a) the first reservoir cut solenoid $SRC_{-1}$ 504 set in the ON-state in the increased assist pressure state shown in FIG. 23 is set to the OFF-state. In particular, (a-1) the second reservoir cut solenoid $SRC_{-2}$ 506 and the master cut solenoids $SMC_{-1}$ 512 and $SMC_{-2}$ 514 are set to the ON-state, and (a-2) the front pump 310 and the rear pump 312 are set to the ON-state.

(b) the holding solenoid SRLH 272 and the pressure reducing solenoid SRLR 280 of the rear left wheel RL corresponding to the ABS subject wheel are controlled in response to the requirement of the ABS control in a manner mentioned below. (b-1) in the case that (ii) the holding mode and (iii) the pressure reducing mode are required by the ABS control, it is controlled by the same method as the case that the ABS control is executed alone. (b-2) in the case that (i) an execution of (i)the pressure increasing mode is required by the ABS control, the pressure increasing mode is executed only for a predetermined time shorter than the case that the ABS control is executed alone.

(c) the holding solenoid SFRH 266 of the front right wheel FR belonging to the same system as the ABS subject wheel is repeatedly turned on and off at a predetermined duty ratio.

(d) the master cut solenoid $SMC_{-1}$ 512 belonging to the system including the rear left wheel RL corresponding to the ABS subject wheel are set to the OFF-state (valve-opened state) in synchronous with a timing at which (iii) the pressure reducing mode is executed with respect to the rear left wheel RL.

In accordance with the condition (a) mentioned above, it is possible to set the first pump 560 and the reservoir tank 224 belonging to the system including the ABS subject wheel to the shut-off state at the same time when the assist pressure increasing ABS requirement is generated. In this case, since the brake fluid sucked into the first pump 560 is limited only to the fluid flowing out from the wheel cylinder 288, the hydraulic pressure generated in the discharge side of the first pump 560 is restricted to a relatively low pressure. As a result, there is formed an advantageous state for preventing the hunting of the ABS control and restricting the increased pressure slope of the wheel cylinder pressure $P_{W/C}$ of the front right wheel FR corresponding to the ABS non-subject wheel.

In accordance with the condition (b) mentioned above, a time for which (i) the pressure increasing mode is executed in the rear left wheel RL corresponding to the ABS subject wheel is shortened in comparison with the case that the ABS control is executed alone. When the time for executing (i) the pressure increasing mode is shortened, the increased pressure amount generated in the wheel cylinder pressure $P_{W/C}$ of the rear left wheel RL together with an execution of (i)the pressure increasing mode is restricted. Under the situation mentioned above, even when the hydraulic pressure higher than the normal time is generated in the upstream side of the SRLH 272, it is hard to generate a hunting in the ABS control.

In accordance with the condition (c) mentioned above, with respect to the front right wheel FR belonging to the same system as the ABS subject wheel, the state in which the brake fluid flows into the wheel cylinder 282 and the state in which the flowing is restricted are repeated at a predetermined duty ratio. In this case, even when the hydraulic pressure higher than the normal time is generated in the upstream side of the SFRH 266, the wheel cylinder pressure $P_{W/C}$ of the front right wheel FR is increased in accordance with a proper increased pressure slope.

In accordance with the condition (d) mentioned above, in synchronous with the timing at which the brake fluid flowing out from the wheel cylinder 288 is pressurized and fed by the first pump 560, the discharge side of the first pump 560 and the master cylinder 218 are set in the conductive state. In this case, since the brake fluid can flow into the master cylinder 218, the hydraulic pressure generated in the discharge side of the first pump 560 is restricted to a relatively low pressure. As a result, there is formed an advantageous state for preventing the hunting of the ABS control and restricting the increased pressure slope of the wheel cylinder pressure $P_{W/C}$ of the front right wheel FR corresponding to the ABS non-subject wheel.

Therefore, in accordance with the assist pressure increasing ABS state mentioned above, it is possible to increase the wheel cylinder pressure $P_{W/C}$ in all of the ABS non-subject wheels in accordance with the same increased pressure slope as the case that the pressure increase of the wheel cylinder pressure $P_{W/C}$ is required under the situation in which the BA control is executed alone as well as control the wheel cylinder pressure $P_{W/C}$ of the ABS subject wheel in the same manner as the case that the ABS control is executed alone. As mentioned above, in accordance with the assist pressure increasing ABS state, it is possible to properly realize the function to be realized when the assist pressure increasing ABS requirement is generated.

In the braking force control apparatus of the present embodiment, in the case that the braking operation for intending to hold the braking force is executed by a driver during an execution of the BA+ABS control, there is generated a necessity of intending to hold the wheel cylinder pressure $P_{W/C}$ of the ABS non-subject wheel while controlling the wheel cylinder pressure $P_{W/C}$ of the ABS subject wheel to a pressure in response to the requirement of the ABS control. Hereinafter, this requirement is referred to as an assist pressure holding ABS requirement.

In the case that the assist pressure holding ABS requirement is generated, by controlling the solenoids corresponding to the ABS subject wheel among the holding solenoids SH and the pressure reducing solenoids SR in response to the requirement of the ABS control while realizing the held assist pressure state shown in FIG. 24, it is possible to control the wheel cylinder pressure $P_{W/C}$ of the ABS subject wheel to a pressure in response to the requirement of the ABS control and to hold the wheel cylinder pressure $P_{W/C}$ of the ABS non-subject wheel belonging to the system in which the ABS subject wheel is not included within the same system.

That is, for example, in the case that the assist pressure holding ABS requirement setting the rear left wheel RL as the ABS subject wheel is generated, it is possible to realize (ii) the holding mode, (iii) the pressure reducing mode and (i) the pressure increasing mode serving the first pump 560 as a hydraulic pressure source with respect to the rear left wheel RL by controlling the SRLH 272 and the SRLR 280 in response to the requirement of the ABS control while realizing the held assist state shown in FIG. 24. Accordingly, the wheel cylinder pressure $P_{W/C}$ of the rear left wheel RL can be controlled in response to the requirement of the ABS control. Further, under the situation mentioned above, the system in the rear wheels in which the ABS subject wheel is not included is maintained in the same state as that shown in FIG. 24. Accordingly, with respect to the front left wheel FL and the rear right wheel RR, the wheel cylinder pressure $P_{W/C}$ thereof can be held in the same manner as that of the case that the BA control is executed alone.

However, in accordance with the method mentioned above, after (iii) the pressure reducing mode is executed with respect to the rear left wheel RL, the brake fluid flowing out from the wheel cylinder 288 is pressurized and fed by the first pump 560 and flows into the wheel cylinder 282 of the front right wheel FR. Accordingly, with respect to the front right wheel FR belonging to the system of the front wheels provided with the ABS subject wheel within the same system, it is impossible to respond to the requirement of the BA control, that is, to hold the wheel cylinder pressure $P_{W/C}$.

Figure 27:
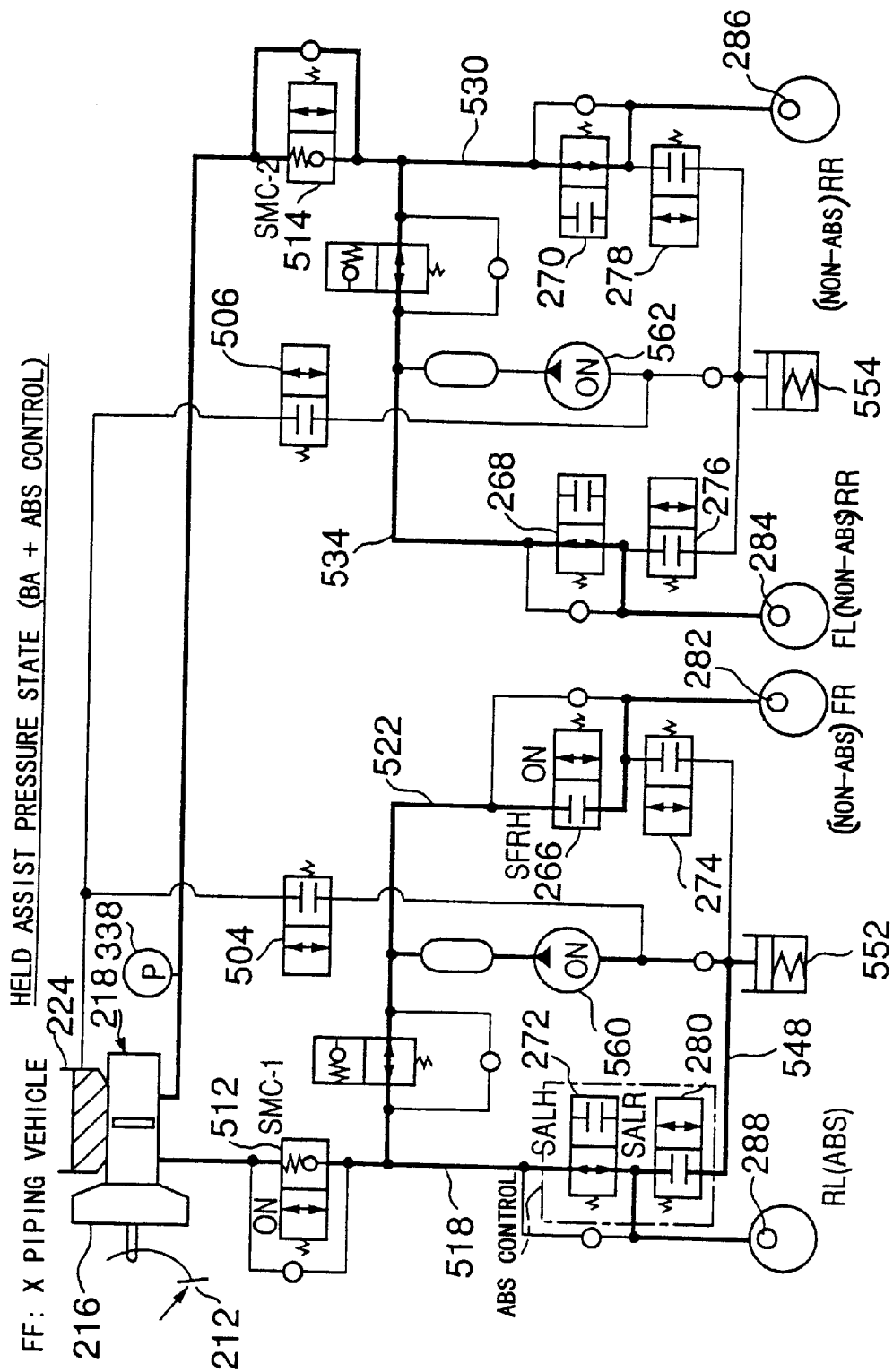
FIG. 27 is a diagram showing a held assist pressure state realized during the BA+ABS control In the braking force control apparatus shown in FIG. 22.

FIG. 27 shows an embodiment of a state realized in the braking force control apparatus in the case that the assist pressure holding ABS requirement setting the rear left wheel RL as the ABS subject wheel is generated (hereinafter, refer to as an assist pressure holding ABS state). The assist pressure holding ABS state setting the rear left wheel RL as the ABS subject wheel can be realized by controlling the braking force control apparatus so that conditions (e) to (g) mentioned below are satisfied.

(e) the holding solenoid SFRH 266 of the front right wheel FR corresponding to the ABS non-subject wheel having the ABS subject wheel within the same system among the holding solenoids S**H set in the OFF-state in the held assist pressure state shown in FIG. 24 is set to the ON-state (valve-opened state). In particular, (e-1) the master cut solenoids $SMC_{-1}$ 512 and $SMC_{-2}$ 514 are set to the ON-state, (e-2) the first pump 560 and the second pump 562 are set to the ON-state, and (e-3) the SFRH 266 is set to the ON-state.

(f) the holding solenoid SRLH 272 and the pressure reducing solenoid SRLR 280 of the rear left wheel RL corresponding to the ABS subject wheel are controlled in response to the requirement of the ABS control by the same method as that of the condition (b) mentioned above, that is, in accordance with a pattern having the time for maintaining (i) the pressure increasing mode shorter than the normal time.

(g) the first master cut solenoid SMC$_{-1}$ 512 belonging to the system including the rear left wheel RL corresponding to the ABS subject wheel are controlled by the same method as that of the condition (c), that is, such as to set to the OFF-state (valve-opened state) in synchronous with a period at which (iii) the pressure reducing mode is executed with respect to the rear left wheel RL.

In accordance with the condition (e) mentioned above, it is possible to separate the wheel cylinder 282 of the front right wheel corresponding to the ABS non-subject wheel belonging to the system including the ABS subject wheel from the first pump 560 at the same time when the assist pressure increasing ABS requirement is generated. In this case, since the brake fluid discharged from the first pump 560 does not flow into the wheel cylinder 282, the wheel cylinder pressure $P_{W/C}$ of the front right wheel FR is properly held in response to the requirement of the BA control.

In accordance with the condition (f) mentioned above, it is possible to restrict the increased pressure amount generated in the wheel cylinder pressure $P_{W/C}$ when (i) the pressure increasing mode is executed in the rear left wheel RL corresponding to the ABS subject wheel, in the same manner as that of the case in which the condition (b) mentioned above is realized.

Further, in accordance with the condition (g) mentioned above, in synchronous with the timing at which the brake fluid flowing out from the wheel cylinder 288 is pressurized and fed by the first pump 560, the discharge side of the first pump 560 and the master cylinder 218 can be set in the conductive state, in the same manner as that of the case In which the condition (d) mentioned above is realized.

Therefore, in accordance with the assist pressure holding ABS state mentioned above, it is possible to properly hold the wheel cylinder pressure $P_{W/C}$ in all of the ABS non-subject wheels in the same manner as that of the case in which the BA control is executed alone as well as control the wheel cylinder pressure $P_{W/C}$ of the ABS subject wheel in the same manner as the case that the ABS control is executed alone. As mentioned above, in accordance with the assist pressure holding ABS state, it is possible to properly realize the function to be realized when the assist pressure holding ABS requirement is generated.

In accordance with the braking force control apparatus of the present embodiment, in correspondence to the case that the ABS control is executed alone, the case that the BA control is executed alone, and the BA+ABS control is executed, respectively, the states shown in FIGS. 22 to 27 can be suitably realized. Therefore, in accordance with the braking force control apparatus of the present embodiment, in the case that the ABS control or the BA control is executed alone, it is possible to control the wheel cylinder pressure $P_{W/C}$ to a proper hydraulic pressure in response to the requirement thereof, and in the case that the BA+ABS control is executed, it is possible to accurately control 1̂ the wheel cylinder pressure $P_{W/C}$ of the ABS subject wheel to a pressure required by the ABS control and 2̂ the wheel cylinder pressure $P_{W/C}$ of the ABS non-subject wheel to a pressure required by the BA control, respectively.

In the embodiment mentioned above, it is structured such that only in the case that (iii) the pressure reducing mode is executed in the ABS subject wheel during an execution of the BA+ABS control, the master cut solenoids SMC$_{-1}$ 512 and SMC$_{-2}$ 514 belonging to the same system as the wheel is set to the valve-opened state, however, the present invention is not limited to this, and it may be structured such that these are always set in the valve-opened state during an execution of the BA+ABS control.

In the embodiment mentioned above, the first pump 560 and the second pump 562 correspond to "assist pressure generating means", the hydraulic pressure passages 518, 522, 530 and 534 correspond to "high pressure passage", the first master cut solenoid SMC$_{-1}$ 512 and the second master cut solenoid SMC$_{-2}$ 514 correspond to "operation hydraulic pressure cut mechanism", the first pressure reducing passage 548 and the second pressure reducing passage 550 correspond to "low pressure passage". and the first reservoir 552 and the second reservoir 554 correspond to "low pressure source" and "second low pressure source", respectively.

What is claimed is:

1. A braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

a hydraulic pressure inlet restricting means for restricting, at a time of starting the brake assist control, an inlet of braking hydraulic pressure to at least one of the plurality of wheel cylinders in which the braking hydraulic pressure control is not executed when braking hydraulic pressure control is executed in at least one of the other of the plurality of wheel cylinders.

2. A braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

a pressure reducing tendency changing means for increasing, at a time of starting the brake assist control, a reduction in pressure in at least one of the plurality of wheel cylinders in which the braking hydraulic pressure control is not executed when braking hydraulic pressure control is executed in at least one of the other of the plurality of wheel cylinders.

3. A braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source in the case that a slip amount of the wheel is over a predetermined threshold, comprising:

a threshold changing means for setting, at a time of executing the brake assist control, and when hydraulic pressure control is executed in at least one of the plurality of wheel cylinders, the slip amount threshold with respect to at least one of the other wheel cylinders in which braking hydraulic pressure control is not executed to be smaller than that at a normal time.

4. A braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

a brake assist control mode changing means for changing said brake assist control to a mode different from a normal mode when said brake hydraulic pressure control is being executed in any one of the plurality of wheel cylinders at a time of start of said brake assist control.

5. A braking force control apparatus for executing a brake assist control for causing a braking hydraulic pressure greater than that at a normal time to flow into a plurality of wheel cylinders from a high pressure source via an independent hydraulic pressure inlet passage when an emergency braking operation is executed by a driver and a braking hydraulic pressure control for executing a pressure reducing control for reducing a wheel cylinder pressure in a state of shutting off a hydraulic pressure inlet passage which communicates a wheel cylinder to be controlled and the high pressure source, comprising:

a pressure reducing control mode changing means for changing, when said brake hydraulic pressure control is being executed in one of the plurality of wheel cylinders during execution of said brake assist control, said pressure reducing control executed in the wheel cylinders other than said one of the plurality of wheel cylinders to a mode different from a normal mode.

\* \* \* \* \*